(12) United States Patent
Shimezawa

(10) Patent No.: US 10,813,113 B2
(45) Date of Patent: Oct. 20, 2020

(54) TERMINAL DEVICE, BASE STATION DEVICE, AND COMMUNICATION METHOD

(71) Applicant: SONY CORPORATION, Tokyo (JP)

(72) Inventor: Kazuyuki Shimezawa, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 170 days.

(21) Appl. No.: 16/073,884

(22) PCT Filed: Jan. 24, 2017

(86) PCT No.: PCT/JP2017/002263
§ 371 (c)(1),
(2) Date: Jul. 30, 2018

(87) PCT Pub. No.: WO2017/169003
PCT Pub. Date: Oct. 5, 2017

(65) Prior Publication Data
US 2019/0045527 A1    Feb. 7, 2019

(30) Foreign Application Priority Data

Mar. 31, 2016    (JP) ................................. 2016-070602

(51) Int. Cl.
*H04W 72/12*    (2009.01)
*H04W 72/04*    (2009.01)
(Continued)

(52) U.S. Cl.
CPC ....... *H04W 72/1263* (2013.01); *H04L 1/1812* (2013.01); *H04L 1/1854* (2013.01);
(Continued)

(58) Field of Classification Search
CPC ........... H04W 72/042; H04W 72/0413; H04W 72/1263; H04L 5/0053
See application file for complete search history.

(56) References Cited

U.S. PATENT DOCUMENTS

2014/0334397 A1* 11/2014 Chen ............... H04L 5/0064
                                                                370/329
2014/0376424 A1* 12/2014 Seo ................. H04L 5/0057
                                                                370/280

FOREIGN PATENT DOCUMENTS

WO    2016/040290 A1    3/2016

OTHER PUBLICATIONS

International Search Report dated Apr. 18, 2017, in PCT/JP2017/002263, filed Jan. 24, 2017.
(Continued)

*Primary Examiner* — Shukri Taha
(74) *Attorney, Agent, or Firm* — Xsensus LLP

(57) ABSTRACT

[Object] To provide a terminal device capable of efficiently performing communication in a communication system in which a base station device and the terminal device communicate with each other.

[Solution] A terminal device that communicates with a base station device includes: a receiving unit configured to receive a first PDSCH that is transmitted on a basis of a sub frame which is defined by a predetermined number of symbols, and a second PDSCH that is transmitted on a basis of an extended sub frame which has a smaller number of symbols than a number of symbols corresponding to the sub frame; and a transmitting unit configured to transmit a first HARQ-ACK that is a feedback for reception of the first PDSCH after a predetermined sub frame, and transmit a second HARQ-ACK that is a feedback for reception of the second PDSCH after a predetermined extended sub frame.

17 Claims, 18 Drawing Sheets

(51) Int. Cl.
  *H04W 28/04* (2009.01)
  *H04L 1/18* (2006.01)
  *H04L 5/00* (2006.01)
(52) U.S. Cl.
  CPC .......... *H04L 1/1861* (2013.01); *H04L 5/0055* (2013.01); *H04W 28/04* (2013.01); *H04W 72/04* (2013.01); *H04W 72/0446* (2013.01)

(56) References Cited

OTHER PUBLICATIONS

"3rd Generation Partnership Project; Technical Specification Group Radio Access Network; Evolved Universal Terrestrial Radio Access (E-UTRA); Physical channels and modulation (Release 12)", 3GPP TS 36.211 V12.7.0, Sep. 2015, pp. 1-136.

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12)", 3GPP TS 36.300 V12.7.0, Sep. 2015, pp. 1-254.

3rd Generation Partnership Project; Technical Specification Group Radio Access Network; Evolved Universal Terrestrial Radio Access (E-UTRA); Physical layer procedures (Release 12), 3GPP TS 36.213 V12.7.0, Sep. 2015, pp. 1-241.

Huawei, et al., "Short TTI for DL transmissions", R1-160292, 3GPP TSG RAN WG1 Meeting #84, Feb. 15-19, 2016, pp. 1-7.

InterDigital Communications, "Support for Short TTIs in UL", R1-161092, 3GPP TSG-RAN WG1 #84, Feb. 15-19, 2016, pp. 1-3.

Ericsson, "DCI for short TTI uplink transmissions", R1-160938, 3GPP TSG RAN WG1 Meeting #84, Feb. 15-19, 2016, pp. 1-7.

Nokia Networks, et al., "Considerations of FDD DL HARQ for Supporting Latency Reduction", R1-160798, 3GPP TSG RAN WG1 Meeting #84, Feb. 15-19, 2016, pp. 1-4.

Nokia Networks, et al., "Considerations on required downlink physical layer enhancements for shorter TTI", R1-160786, 3GPP TSG RAN WG1 Meeting #84, Feb. 15-19, 2016, pp. 1-7.

ZTE, "Downlink control channels for short TTI", R1-160983, 3GPP TSG RAN WG1 Meeting #84, Feb. 15-19, 2016, pp. 1-5.

Extended European Search Report dated Mar. 7, 2019 in European Application No. 17773553.7-1219.

* cited by examiner

FIG. 11

TERMINAL DEVICE, BASE STATION DEVICE, AND COMMUNICATION METHOD

TECHNICAL FIELD

The present disclosure relates to a terminal device, a base station device, and a communication method.

BACKGROUND ART

Wireless access schemes and wireless networks of cellular mobile communication (hereinafter also referred to as LTE-Advanced (LTE-A), LTE-Advanced Pro (LTE-A Pro), or Evolved Universal Terrestrial Radio Access (EUTRA)) are under review in 3rd Generation Partnership Project (3GPP). Further, in the following description, LTE includes LTE-A, LTE-A Pro, and EUTRA. In LTE, a base station device (base station) is also referred to as an evolved Node B (eNodeB), and a terminal device (a mobile station, a mobile station device, or a terminal) is also referred to as a user equipment (UE). LTE is a cellular communication system in which a plurality of areas covered by a base station device are arranged in a cell form. A single base station device may manage a plurality of cells.

LTE is compatible with frequency division duplex (FDD) and time division duplex (TDD). LTE employing the FDD scheme is also referred to as FD-LTE or LTE FDD. TDD is a technology which enables full duplex communication to be performed in at least two frequency bands by performing frequency division multiplexing on an uplink signal and a downlink signal. LTE employing the TDD scheme is also referred to as TD-LTE or LTE TDD. TDD is a technology that enables full duplex communication to be performed in a single frequency band by performing time division multiplexing on an uplink signal and a downlink signal. The details of FD-LTE and TD-LTE are disclosed in Non-Patent Literature 1.

The base station device maps a physical channel and a physical signal to physical resources configured on the basis of a predefined frame configuration and transmits the physical channel and the physical signal. The terminal device receives the physical channel and the physical signal transmitted from the base station device. In LTE, a plurality of frame configuration types are specified, and data transmission is performed using physical resources of a frame configuration corresponding to each frame configuration type. For example, a frame configuration type 1 is applicable to FD-LTE, and a frame configuration type 2 is applicable to TD-LTE. The details of the frame structure are disclosed in Non-Patent Literature 1.

In LTE, a predetermined time interval is specified as a unit of time in which data transmission is performed. Such a time interval is referred to as a transmission time interval (TTI). For example, the TTI is one millisecond, and in this case, one TTI corresponds to one sub frame length. The base station device and the terminal device perform transmission and reception of the physical channel and/or the physical signal on the basis of the TTI. The details of the TTI are disclosed in Non-Patent Literature 2.

Further, the TTI is used as a unit specifying a data transmission procedure. For example, in the data transmission procedure, a hybrid automatic repeat request-acknowledgment (HARQ-ACK) report indicating whether or not received data has been correctly received is transmitted after a period of time specified as an integer multiple of the TTI after data is received. Therefore, a period of time (delay or latency) necessary for data transmission is decided depending on the TTI. Such a data transmission procedure is disclosed in Non-Patent Literature 3.

CITATION LIST

Non-Patent Literature

Non-Patent Literature 1: 3rd Generation Partnership Project; Technical Specification Group Radio Access Network; Evolved Universal Terrestrial Radio Access (E-UTRA); Physical Channels and Modulation (Release 12), 3GPP TS 36.211 V12.7.0 (2015-09).

Non-Patent Literature 2: 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12), 3GPP TS 36.300 V12.7.0 (2015-09).

Non-Patent Literature 3: 3rd Generation Partnership Project; Technical Specification Group Radio Access Network; Evolved Universal Terrestrial Radio Access (E-UTRA); Physical layer procedures (Release 12), 3GPP TS 36.213 V12.7.0 (2015-09).

DISCLOSURE OF INVENTION

Technical Problem

In LTE, only one millisecond is specified as the TTI, and the physical channel and the physical signal are specified on the basis of the TTI of 1 msec. Further, a period of time necessary for data transmission is an integral multiple of 1 millisecond. For this reason, in a use case in which the period of time necessary for data transmission is important, a size (length) of the TTI affects a characteristic. Further, in a case in which a plurality of physical resources are consecutively allocated to the terminal device in such a use case in order to reduce the period of time necessary for data transmission, transmission efficiency of the entire system greatly deteriorates.

The present disclosure was made in light of the above problem, and it is an object to provide a base station device, a terminal device, a communication system, a communication method, and an integrated circuit, which are capable of improving the transmission efficiency of the entire system in consideration of the period of time necessary for data transmission in a communication system in which a base station device and a terminal device communicate with each other.

Solution to Problem

According to the present disclosure, there is provided a terminal device that communicates with a base station device, the terminal device including: a receiving unit configured to receive a first PDSCH that is transmitted on a basis of a sub frame which is defined by a predetermined number of symbols, and a second PDSCH that is transmitted on a basis of an extended sub frame which has a smaller number of symbols than a number of symbols corresponding to the sub frame; and a transmitting unit configured to transmit a first HARQ-ACK that is a feedback for reception of the first PDSCH after a predetermined sub frame, and transmit a second HARQ-ACK that is a feedback for reception of the second PDSCH after a predetermined extended sub frame.

In addition, according to the present disclosure, there is provided a base station device that communicates with a terminal device, the base station device including: a transmitting unit configured to transmit a first PDSCH that is transmitted on a basis of a sub frame which is defined by a predetermined number of symbols, and a second PDSCH that is transmitted on a basis of an extended sub frame which has a smaller number of symbols than a number of symbols corresponding to the sub frame; and a receiving unit configured to receive a first HARQ-ACK that is a feedback for reception of the first PDSCH after a predetermined sub frame, and receive a second HARQ-ACK that is a feedback for reception of the second PDSCH after a predetermined extended sub frame.

In addition, according to the present disclosure, there is provided a communication method that is used by a terminal device which communicates with a base station device, the communication method including: a step of receiving a first PDSCH that is transmitted on a basis of a sub frame which is defined by a predetermined number of symbols, and a second PDSCH that is transmitted on a basis of an extended sub frame which has a smaller number of symbols than a number of symbols corresponding to the sub frame; and a step of transmitting a first HARQ-ACK that is a feedback for reception of the first PDSCH after a predetermined sub frame, and transmitting a second HARQ-ACK that is a feedback for reception of the second PDSCH after a predetermined extended sub frame.

In addition, according to the present disclosure, there is provided a communication method that is used by a base station device which communicates with a terminal device, the communication method including: a step of transmitting a first PDSCH that is transmitted on a basis of a sub frame which is defined by a predetermined number of symbols, and a second PDSCH that is transmitted on a basis of an extended sub frame which has a smaller number of symbols than a number of symbols corresponding to the sub frame; and a step of receiving a first HARQ-ACK that is a feedback for reception of the first PDSCH after a predetermined sub frame, and receiving a second HARQ-ACK that is a feedback for reception of the second PDSCH after a predetermined extended sub frame.

Advantageous Effects of Invention

As described above, according to the present disclosure, it is possible to improve the transmission efficiency in the wireless communication system in which the base station device and the terminal device communicate with each other.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 11 is a diagram illustrating an example of a configuration of an SREG in the present embodiment.

MODE(S) FOR CARRYING OUT THE INVENTION

Figure 1:
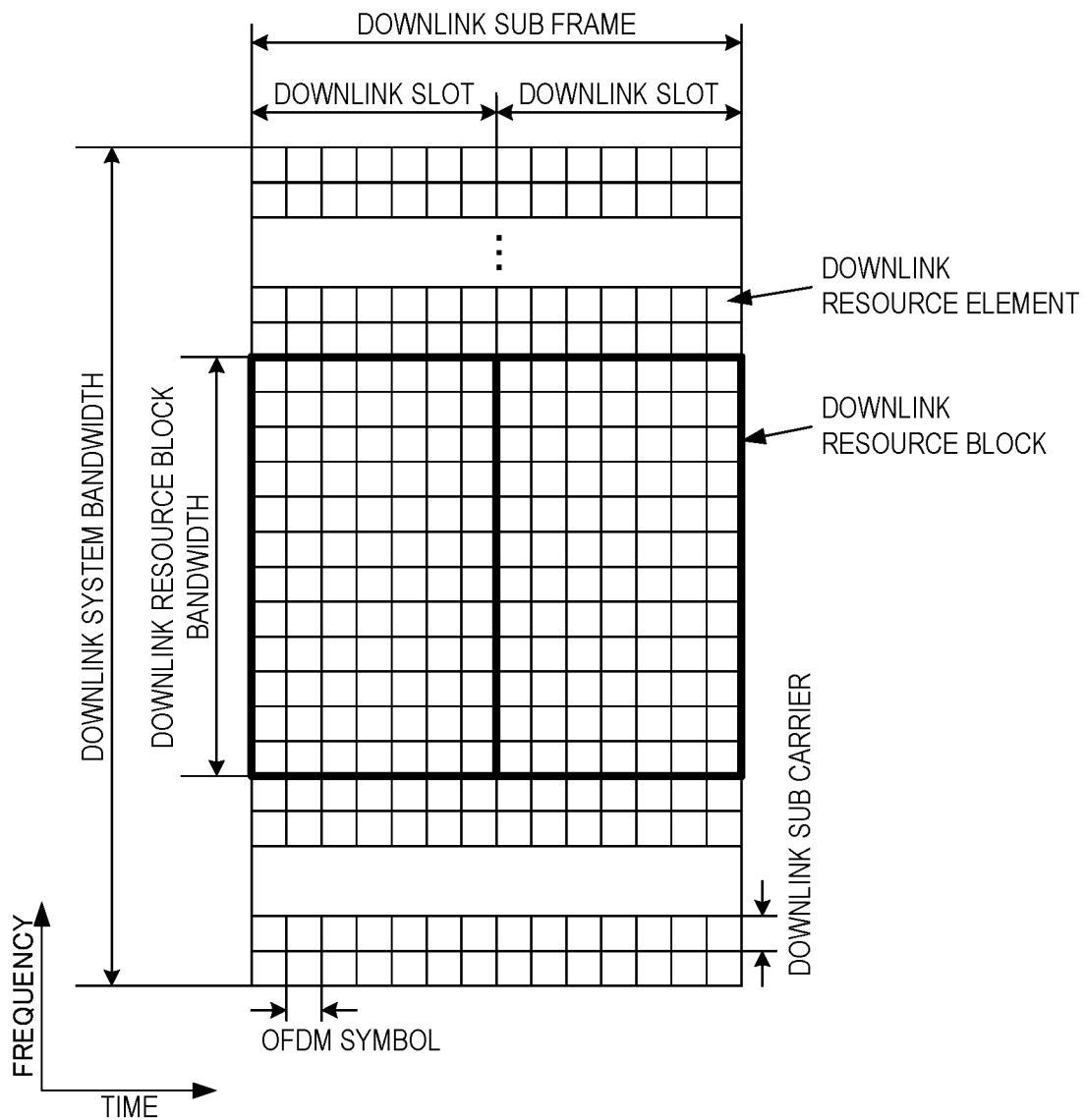
FIG. 1 is a diagram illustrating an example of a downlink sub frame of the present embodiment.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

<Wireless Communication System in the Present Embodiment>

In the present embodiment, a wireless communication system includes at least a base station device 1 and a terminal device 2. The base station device 1 can accommodate multiple terminal devices. The base station device 1 can be connected with another base station device by means of an X2 interface. Further, the base station device 1 can be connected to an evolved packet core (EPC) by means of an S1 interface. Further, the base station device 1 can be connected to a mobility management entity (MME) by means of an S1-MME interface and can be connected to a serving gateway (S-GW) by means of an S1-U interface. The S1 interface supports many-to-many connection between the MME and/or the S-GW and the base station device 1.

<Frame Configuration in Present Embodiment>

In the present embodiment, a radio frame configured with 10 ms (milliseconds) is specified. Each radio frame includes two half frames. A time interval of the half frame is 5 ms. Each half frame includes 5 sub frames. The time interval of the sub frame is 1 ms and is defined by two successive slots. The time interval of the slot is 0.5 ms. An i-th sub frame in the radio frame includes a (2×i)-th slot and a (2×i+1)-th slot. In other words, 10 sub frames are specified in each of the radio frames.

The sub frame includes a downlink sub frame (a first sub frame), an uplink sub frame (a second sub frame), a special sub frame (a third sub frame), and the like.

The downlink sub frame is a sub frame reserved for downlink transmission. The uplink sub frame is a sub frame reserved for uplink transmission. The special sub frame includes three fields. The three fields are a Downlink Pilot Time Slot (DwPTS), a Guard Period (GP), and an Uplink Pilot Time Slot (UpPTS). A total length of DwPTS, GP, and UpPTS is 1 ms. The DwPTS is a field reserved for downlink transmission. The UpPTS is a field reserved for uplink transmission. The GP is a field in which downlink transmission and uplink transmission are not performed. Further, the special sub frame may include only the DwPTS and the GP or may include only the GP and the UpPTS. The special sub frame is placed between the downlink sub frame and the uplink sub frame in TDD and used to perform switching from the downlink sub frame to the uplink sub frame.

A single radio frame includes a downlink sub frame, an uplink sub frame, and/or a special sub frame. Further, a single radio frame may include only a downlink sub frame, an uplink sub frame, or a special sub frame.

A plurality of radio frame configurations are supported. The radio frame configuration is specified by the frame configuration type. The frame configuration type 1 can be applied only to FDD. The frame configuration type 2 can be applied only to TDD. The frame configuration type 3 can be applied only to an operation of a licensed assisted access (LAA) secondary cell.

In the frame configuration type 2, a plurality of uplink-downlink configurations are specified. In the uplink-downlink configuration, each of 10 sub frames in one radio frame corresponds to one of the downlink sub frame, the uplink sub frame, and the special sub frame. The sub frame 0, the sub frame 5 and the DwPTS are constantly reserved for downlink transmission. The UpPTS and the sub frame just after the special sub frame are constantly reserved for uplink transmission.

In the frame configuration type 3, 10 sub frames in one radio frame are reserved for downlink transmission. The terminal device 2 treats each sub frame as an empty sub frame. Unless a predetermined signal, channel and/or downlink transmission is detected in a certain sub frame, the terminal device 2 assumes that there is no signal and/or channel in the sub frame. The downlink transmission is exclusively occupied by one or more consecutive sub frames. The first sub frame of the downlink transmission may be started from any one in that sub frame. The last sub frame of the downlink transmission may be either completely exclusively occupied or exclusively occupied by a time interval specified in the DwPTS.

Further, in the frame configuration type 3, 10 sub frames in one radio frame may be reserved for uplink transmission. Further, each of 10 sub frames in one radio frame may correspond to any one of the downlink sub frame, the uplink sub frame, and the special sub frame.

The base station device 1 may transmit a PCFICH, a PHICH, a PDCCH, an EPDCCH, a PDSCH, a synchronization signal, and a downlink reference signal in the DwPTS of the special sub frame. The base station device 1 can restrict transmission of a PBCH in the DwPTS of the special sub frame. The terminal device 2 may transmit a PRACH and an SRS in the UpPTS of the special sub frame. In other words, the terminal device 2 can restrict transmission of a PUCCH, a PUSCH, and a DMRS in the UpPTS of the special sub frame.

FIG. 1 is a diagram illustrating an example of the downlink sub frame of the present embodiment. The diagram illustrated in FIG. 1 is also referred to as a downlink resource grid. The base station device 1 can transmit a downlink physical channel and/or a downlink physical signal in the downlink sub frame from the base station device 1 to the terminal device 2.

The downlink physical channel includes a physical broadcast channel (PBCH), a physical control format indicator channel (PCFICH), a physical hybrid automatic repeat request indicator channel (PHICH), a physical downlink control channel (PDCCH), an enhanced physical downlink control channel (EPDCCH), a physical downlink shared channel (PDSCH), a physical multicast channel (PMCH), and the like. The downlink physical signal includes a synchronization signal (SS), a reference signal (RS), a discovery signal (DS), and the like. In FIG. 1, regions of the PDSCH and the PDCCH are illustrated for simplicity.

The synchronization signal includes a primary synchronization signal (PSS), a secondary synchronization signal (SSS), and the like. The reference signal in the downlink includes a cell-specific reference signal (CRS), a UE-specific reference signal associated with the PDSCH (PDSCH-DMRS), a demodulation reference signal associated with the EPDCCH (EPDCCH-DMRS), a positioning reference signal (PRS), a channel state information (CSI) reference signal (CSI-RS), a tracking reference signal (TRS), and the like. The PDSCH-DMRS is also referred to as a URS associated with the PDSCH or referred to simply as a URS. The EPDCCH-DMRS is also referred to as a DMRS associated with the EPDCCH or referred to simply as DMRS. The PDSCH-DMRS and the EPDCCH-DMRS are also referred to simply as a DL-DMRS or a downlink demodulation reference signal. The CSI-RS includes a non-zero power CSI-RS (NZP CSI-RS). Further, the downlink resources include a zero power CSI-RS (ZP CSI-RS), a channel state information-interference measurement (CSI-IM), and the like.

Figure 2:
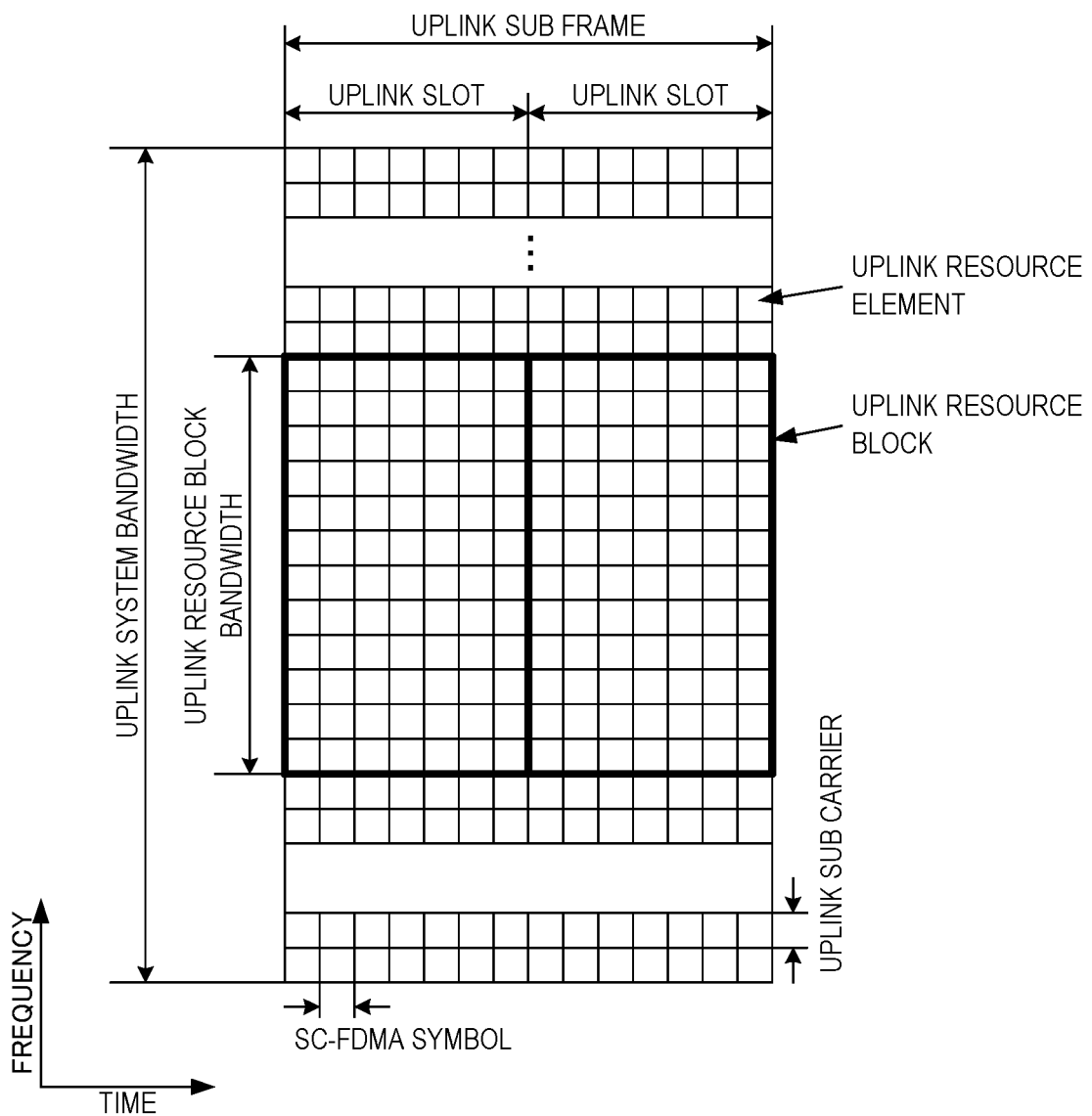
FIG. 2 is a diagram illustrating an example of an uplink sub frame of the present embodiment.

FIG. 2 is a diagram illustrating an example of the uplink sub frame of the present embodiment. The diagram illustrated in FIG. 2 is also referred to as an uplink resource grid. The terminal device 2 can transmit an uplink physical channel and/or an uplink physical signal in the uplink sub frame from the terminal device 2 to the base station device 1. The uplink physical channel includes a physical uplink shared channel (PUSCH), a physical uplink control channel (PUCCH), a physical random access channel (PRACH), and the like. The uplink physical signal includes a reference signal (RS).

The reference signal in the uplink includes an uplink demodulation signal (UL-DMRS), a sounding reference signal (SRS), and the like. The UL-DMRS is associated with transmission of the PUSCH or the PUCCH. The SRS is not associated with transmission of the PUSCH or the PUCCH.

The downlink physical channel and the downlink physical signal are referred to collectively as a downlink signal. The uplink physical channel and the uplink physical signal are referred to collectively as an uplink signal. The downlink physical channel and the uplink physical channel are referred to collectively as a physical channel. The downlink physical signal and the uplink physical signal are referred to collectively as a physical signal.

The BCH, the MCH, the UL-SCH, and the DL-SCH are transport channels. The channel used in the medium access control (MAC) layer is referred to as a transport channel. A unit of the transport channel used in the MAC layer is also referred to as a transport block (TB) or a MAC protocol data unit (MAC PDU). In the MAC layer, control of a hybrid automatic repeat request (HARQ) is performed for each transport block. The transport block is a unit of data that the MAC layer transfers (delivers) to the physical layer. In the physical layer, the transport block is mapped to a codeword, and an encoding process is performed for each codeword.

<Physical Resources in Present Embodiment>

In the present embodiment, one slot is defined by a plurality of symbols. The physical signal or the physical channel transmitted in each of the slots is represented by a resource grid. In the downlink, the resource grid is defined by a plurality of sub carriers in a frequency direction and a plurality of OFDM symbols in a time direction. In the uplink, the resource grid is defined by a plurality of sub carriers in the frequency direction and a plurality of SC-FDMA symbols in the time direction. The number of sub carriers or the number of resource blocks may be decided depending on a bandwidth of a cell. The number of symbols in one slot is decided by a type of cyclic prefix (CP). The type of CP is a normal CP or an extended CP. In the normal CP, the number of OFDM symbols or SC-FDMA symbols constituting one slot is 7. In the extended CP, the number of OFDM symbols or SC-FDMA symbols constituting one slot is 6. Each element in the resource grid is referred to as a resource element. The resource element is identified using an index (number) of a sub carrier and an index (number) of a symbol. Further, in the description of the present embodiment, the OFDM symbol or SC-FDMA symbol is also referred to simply as a symbol.

The resource blocks are used for mapping to resource elements of a certain physical channel (the PDSCH, the PUSCH, or the like). The resource blocks include virtual resource blocks and physical resource blocks. A certain physical channel is mapped to a virtual resource block. The virtual resource blocks are mapped to physical resource blocks. One physical resource block is defined by a predetermined number of consecutive symbols in the time domain. One physical resource block is defined from a predetermined number of consecutive sub carriers in the frequency domain. The number of symbols and the number of sub carriers in one physical resource block are decided on the basis of a parameter set in accordance with a type of CP, a sub carrier interval, and/or a higher layer in the cell. For example, in a case in which the type of CP is the normal CP, and the sub carrier interval is 15 kHz, the number of symbols in one physical resource block is 7, and the number of sub carriers is 12. In this case, one physical resource block includes (7×12) resource elements. The physical resource blocks are numbered from 0 in the frequency domain. Further, two resource blocks in one sub frame corresponding to the same physical resource block number are defined as a physical resource block pair (a PRB pair or an RB pair).

A resource element group (REG) is used to define mapping of the resource element and the control channel. For example, the REG is used for mapping of the PDCCH, the PHICH, or the PCFICH. The REG is constituted by four consecutive resource elements which are in the same OFDM symbol and not used for the CRS in the same resource block. Further, the REG is constituted by first to fourth OFDM symbols in a first slot in a certain sub frame.

An enhanced resource element group (EREG) is used to define mapping of the resource elements and the enhanced control channel. For example, the EREG is used for mapping of the EPDCCH. One resource block pair is constituted by 16 EREGs. Each EREG is assigned a number of 0 to 15 for each resource block pair. Each EREG is constituted by 9 resource elements excluding resource elements used for the DM-RS associated with the EPDCCH in one resource block pair.

<Antenna Port in Present Embodiment>

An antenna port is defined so that a propagation channel carrying a certain symbol can be inferred from a propagation channel carrying another symbol in the same antenna port. For example, different physical resources in the same antenna port can be assumed to be transmitted through the same propagation channel. In other words, for a symbol in a certain antenna port, it is possible to estimate and demodulate a propagation channel in accordance with the reference signal in the antenna port. Further, there is one resource grid for each antenna port. The antenna port is defined by the reference signal. Further, each reference signal can define a plurality of antenna ports.

In a case in which two antenna ports satisfy a predetermined condition, the two antenna ports can be regarded as being a quasi co-location (QCL). The predetermined condition is that a wide area characteristic of a propagation channel carrying a symbol in one antenna port can be inferred from a propagation channel carrying a symbol in another antenna port. The wide area characteristic includes a delay dispersion, a Doppler spread, a Doppler shift, an average gain, and/or an average delay.

<Downlink Physical Channel in Present Embodiment>

The PBCH is used to broadcast a master information block (MIB) which is broadcast information specific to a serving cell of the base station device 1. The PBCH is transmitted only through the sub frame 0 in the radio frame. The MIB can be updated at intervals of 40 ms. The PBCH is repeatedly transmitted with a cycle of 10 ms. Specifically, initial transmission of the MIB is performed in the sub frame 0 in the radio frame satisfying a condition that a remainder obtained by dividing a system frame number (SFN) by 4 is 0, and retransmission (repetition) of the MIB is performed in the sub frame 0 in all the other radio frames. The SFN is a radio frame number (system frame number). The MIB is system information. For example, the MIB includes information indicating the SFN.

The PCFICH is used to transmit information related to the number of OFDM symbols used for transmission of the PDCCH. A region indicated by PCFICH is also referred to as a PDCCH region. The information transmitted through the PCFICH is also referred to as a control format indicator (CFI).

The PHICH is used to transmit an HARQ-ACK (an HARQ indicator, HARQ feedback, and response information) indicating ACKnowledgment (ACK) or negative ACKnowledgment (NACK) of uplink data (an uplink shared channel (UL-SCH)) received by the base station device 1. For example, in a case in which the HARQ-ACK indicating ACK is received, corresponding uplink data is not retransmitted. For example, in a case in which the terminal device 2 receives the HARQ-ACK indicating NACK, the terminal device 2 retransmits corresponding uplink data through a predetermined uplink sub frame. A certain PHICH transmits the HARQ-ACK for certain uplink data. The base station device 1 transmits each HARQ-ACK to a plurality of pieces of uplink data included in the same PUSCH using a plurality of PHICHs.

The PDCCH and the EPDCCH are used to transmit downlink control information (DCI). Mapping of an information bit of the downlink control information is defined as a DCI format. The downlink control information includes a downlink grant and an uplink grant. The downlink grant is also referred to as a downlink assignment or a downlink allocation.

The PDCCH is transmitted by a set of one or more consecutive control channel elements (CCEs). The CCE includes 9 resource element groups (REGs). An REG includes 4 resource elements. In a case in which the PDCCH is constituted by n consecutive CCEs, the PDCCH starts with a CCE satisfying a condition that a remainder after dividing an index (number) i of the CCE by n is 0.

The EPDCCH is transmitted by a set of one or more consecutive enhanced control channel elements (ECCEs). The ECCE is constituted by a plurality of enhanced resource element groups (EREGs).

The downlink grant is used for scheduling of the PDSCH in a certain cell. The downlink grant is used for scheduling of the PDSCH in the same sub frame as a sub frame in which the downlink grant is transmitted. The uplink grant is used for scheduling of the PUSCH in a certain cell. The uplink grant is used for scheduling of a single PUSCH in a fourth sub frame from a sub frame in which the uplink grant is transmitted or later.

A cyclic redundancy check (CRC) parity bit is added to the DCI. The CRC parity bit is scrambled using a radio network temporary identifier (RNTI). The RNTI is an identifier that can be specified or set in accordance with a purpose of the DCI or the like. The RNTI is an identifier specified in a specification in advance, an identifier set as information specific to a cell, an identifier set as information specific to the terminal device 2, or an identifier set as information specific to a group to which the terminal device 2 belongs. For example, in monitoring of the PDCCH or the EPDCCH, the terminal device 2 descrambles the CRC parity bit added to the DCI with a predetermined RNTI and identifies whether or not the CRC is correct. In a case in which the CRC is correct, the DCI is understood to be a DCI for the terminal device 2.

The PDSCH is used to transmit downlink data (a downlink shared channel (DL-SCH)). Further, the PDSCH is also used to transmit control information of a higher layer.

The PMCH is used to transmit multicast data (a multicast channel (MCH)).

In the PDCCH region, a plurality of PDCCHs may be multiplexed according to frequency, time, and/or space. In the EPDCCH region, a plurality of EPDCCHs may be multiplexed according to frequency, time, and/or space. In the PDSCH region, a plurality of PDSCHs may be multiplexed according to frequency, time, and/or space. The PDCCH, the PDSCH, and/or the EPDCCH may be multiplexed according to frequency, time, and/or space.

<Downlink Physical Signal in Present Embodiment>

A synchronization signal is used for the terminal device 2 to obtain downlink synchronization in the frequency domain and/or the time domain. The synchronization signal includes a primary synchronization signal (PSS) and a secondary synchronization signal (SSS). The synchronization signal is placed in a predetermined sub frame in the radio frame. For example, in the TDD scheme, the synchronization signal is placed in the sub frames 0, 1, 5, and 6 in the radio frame. In the FDD scheme, the synchronization signal is placed in the sub frames 0 and 5 in the radio frame.

The PSS may be used for coarse frame/timing synchronization (synchronization in the time domain) or cell group identification. The SSS may be used for more accurate frame timing synchronization or cell identification. In other words, frame timing synchronization and cell identification can be performed using the PSS and the SSS.

The downlink reference signal is used for the terminal device 2 to perform propagation path estimation of the downlink physical channel, propagation path correction, calculation of downlink channel state information (CSI), and/or measurement of positioning of the terminal device 2.

The CRS is transmitted in the entire band of the sub frame. The CRS is used for receiving (demodulating) the PBCH, the PDCCH, the PHICH, the PCFICH, and the PDSCH. The CRS may be used for the terminal device 2 to calculate the downlink channel state information. The PBCH, the PDCCH, the PHICH, and the PCFICH are transmitted through the antenna port used for transmission of the CRS. The CRS supports the antenna port configurations of 1, 2, or 4. The CRS is transmitted through one or more of the antenna ports 0 to 3.

The URS associated with the PDSCH is transmitted through a sub frame and a band used for transmission of the PDSCH with which the URS is associated. The URS is used for demodulation of the PDSCH to which the URS is associated. The URS associated with the PDSCH is transmitted through one or more of the antenna ports 5 and 7 to 14.

The PDSCH is transmitted through an antenna port used for transmission of the CRS or the URS on the basis of the transmission mode and the DCI format. A DCI format 1A is used for scheduling of the PDSCH transmitted through an antenna port used for transmission of the CRS. A DCI format 2D is used for scheduling of the PDSCH transmitted through an antenna port used for transmission of the URS.

The DMRS associated with the EPDCCH is transmitted through a sub frame and a band used for transmission of the EPDCCH to which the DMRS is associated. The DMRS is used for demodulation of the EPDCCH with which the DMRS is associated. The EPDCCH is transmitted through an antenna port used for transmission of the DMRS. The DMRS associated with the EPDCCH is transmitted through one or more of the antenna ports 107 to 114.

The CSI-RS is transmitted through a set sub frame. The resources in which the CSI-RS is transmitted are set by the base station device 1. The CSI-RS is used for the terminal device 2 to calculate the downlink channel state information. The terminal device 2 performs signal measurement (channel measurement) using the CSI-RS. The CSI-RS supports setting of some or all of the antenna ports 1, 2, 4, 8, 12, 16, 24, and 32. The CSI-RS is transmitted through one or more of the antenna ports 15 to 46. Further, an antenna port to be supported may be decided on the basis of a terminal device capability of the terminal device 2, setting of an RRC parameter, and/or a transmission mode to be set.

Resources of the ZP CSI-RS are set by a higher layer. Resources of the ZP CSI-RS are transmitted with zero output power. In other words, the resources of the ZP CSI-RS are not transmitted. The ZP PDSCH and the EPDCCH are not transmitted in the resources in which the ZP CSI-RS is set. For example, the resources of the ZP CSI-RS are used for a neighbor cell to transmit the NZP CSI-RS. Further, for example, the resources of the ZP CSI-RS are used to measure the CSI-IM.

Resources of the CSI-IM are set by the base station device 1. The resources of the CSI-IM are resources used for measuring interference in CSI measurement. The resources of the CSI-IM can be set to overlap some of the resources of the ZP CSI-RS. For example, in a case in which the resources of the CSI-IM are set to overlap some of the resources of the ZP CSI-RS, a signal from a cell performing the CSI measurement is not transmitted in the resources. In other words, the base station device 1 does not transmit the PDSCH, the EPDCCH, or the like in the resources set by the CSI-IM. Therefore, the terminal device 2 can perform the CSI measurement efficiently.

The MBSFN RS is transmitted in the entire band of the sub frame used for transmission of the PMCH. The MBSFN RS is used for demodulation of the PMCH. The PMCH is transmitted through an antenna port used for transmission of the MBSFN RS. The MBSFN RS is transmitted through the antenna port 4.

The PRS is used for the terminal device 2 to measure positioning of the terminal device 2. The PRS is transmitted through the antenna port 6.

The TRS can be mapped only to predetermined sub frames. For example, the TRS is mapped to the sub frames 0 and 5. Further, the TRS can use a configuration similar to a part or all of the CRS. For example, in each resource block, a position of a resource element to which the TRS is mapped can be caused to coincide with a position of a resource element to which the CRS of the antenna port 0 is mapped. Further, a sequence (value) used for the TRS can be decided on the basis of information set through the PBCH, the PDCCH, the EPDCCH, or the PDSCH (RRC signaling). A sequence (value) used for the TRS can be decided on the basis of a parameter such as a cell ID (for example, a physical layer cell identifier), a slot number, or the like. A sequence (value) used for the TRS can be decided by a method (formula) different from that of a sequence (value) used for the CRS of the antenna port 0.

<Uplink Physical Signal in Present Embodiment>

The PUCCH is a physical channel used for transmitting uplink control information (UCI). The uplink control information includes downlink channel state information (CSI), a scheduling request (SR) indicating a request for PUSCH resources, and a HARQ-ACK to downlink data (a transport block (TB) or a downlink-shared channel (DL-SCH)). The HARQ-ACK is also referred to as ACK/NACK, HARQ feedback, or response information. Further, the HARQ-ACK to downlink data indicates ACK, NACK, or DTX.

The PUSCH is a physical channel used for transmitting uplink data (uplink-shared channel (UL-SCH)). Further, the PUSCH may be used to transmit the HARQ-ACK and/or the channel state information together with uplink data. Further, the PUSCH may be used to transmit only the channel state information or only the HARQ-ACK and the channel state information.

The PRACH is a physical channel used for transmitting a random access preamble. The PRACH can be used for the terminal device 2 to obtain synchronization in the time domain with the base station device 1. Further, the PRACH is also used to indicate an initial connection establishment procedure (process), a handover procedure, a connection re-establishment procedure, synchronization (timing adjustment) for uplink transmission, and/or a request for PUSCH resources.

In the PUCCH region, a plurality of PUCCHs are frequency, time, space, and/or code multiplexed. In the PUSCH region, a plurality of PUSCHs may be frequency, time, space, and/or code multiplexed. The PUCCH and the PUSCH may be frequency, time, space, and/or code multiplexed. The PRACH may be placed over a single sub frame or two sub frames. A plurality of PRACHs may be code-multiplexed.

<Uplink Physical Channel in Present Embodiment>

The uplink DMRS is associated with transmission of the PUSCH or the PUCCH. The DMRS is time-multiplexed with the PUSCH or the PUCCH. The base station device 1 may use the DMRS to perform the propagation path correction of the PUSCH or the PUCCH. In the description of the present embodiment, the transmission of the PUSCH also includes multiplexing and transmitting the PUSCH and DMRS. In the description of the present embodiment, the transmission of the PUCCH also includes multiplexing and transmitting the PUCCH and the DMRS. Further, the uplink DMRS is also referred to as an UL-DMRS. The SRS is not associated with the transmission of the PUSCH or the PUCCH. The base station device 1 may use the SRS to measure the uplink channel state.

The SRS is transmitted using the last SC-FDMA symbol in the uplink sub frame. In other words, the SRS is placed in the last SC-FDMA symbol in the uplink sub frame. The terminal device 2 can restrict simultaneous transmission of the SRS, the PUCCH, the PUSCH, and/or the PRACH in a certain SC-FDMA symbol of a certain cell. The terminal device 2 can transmit the PUSCH and/or the PUCCH using the SC-FDMA symbol excluding the last SC-FDMA symbol in a certain uplink sub frame of a certain cell in the uplink sub frame and transmit the SRS using the last SC-FDMA symbol in the uplink sub frame. In other words, the terminal device 2 can transmit the SRS, the PUSCH, and the PUCCH in a certain uplink sub frame of a certain cell.

In the SRS, a trigger type 0 SRS and a trigger type 1 SRS are defined as SRSs having different trigger types. The trigger type 0 SRS is transmitted in a case in which a parameter related to the trigger type 0 SRS is set by signaling of a higher layer. The trigger type 1 SRS is transmitted in a case in which a parameter related to the trigger type 1 SRS is set by signaling of the higher layer, and transmission is requested by an SRS request included in the DCI format 0, 1A, 2B, 2C, 2D, or 4. Further, the SRS request is included in both FDD and TDD for the DCI format 0, 1A, or 4 and included only in TDD for the DCI format 2B, 2C, or 2D. In a case in which the transmission of the trigger type 0 SRS and the transmission of the trigger type 1 SRS occur in the same sub frame of the same serving cell, a priority is given to the transmission of the trigger type 1 SRS.

<Configuration Example of Base Station Device 1 in Present Embodiment>

Figure 3:
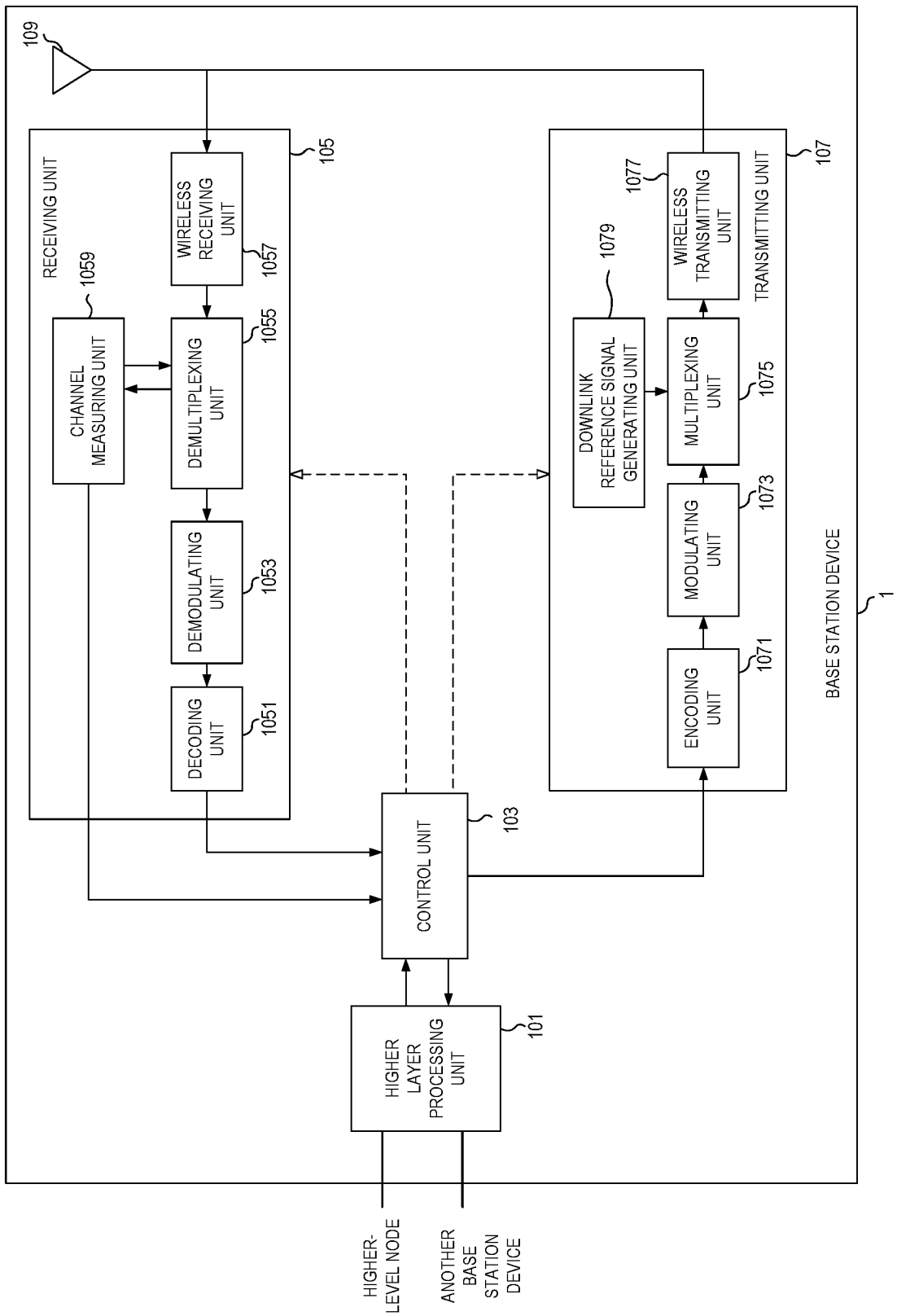
FIG. 3 is a schematic block diagram illustrating a configuration of a base station device 1 of the present embodiment.

FIG. 3 is a schematic block diagram illustrating a configuration of the base station device 1 of the present embodiment. As illustrated in FIG. 3, the base station device 1 includes a higher layer processing unit 101, a control unit 103, a receiving unit 105, a transmitting unit 107, and a transceiving antenna 109. Further, the receiving unit 105 includes a decoding unit 1051, a demodulating unit 1053, a demultiplexing unit 1055, a wireless receiving unit 1057, and a channel measuring unit 1059. Further, the transmitting unit 107 includes an encoding unit 1071, a modulating unit 1073, a multiplexing unit 1075, a wireless transmitting unit 1077, and a downlink reference signal generating unit 1079.

The higher layer processing unit 101 performs processes of a medium access control (MAC) layer, a packet data convergence protocol (PDCP) layer, a radio link control (RLC) layer, and a radio resource control (RRC) layer. Further, the higher layer processing unit 101 generates control information to control the receiving unit 105 and the transmitting unit 107 and outputs the control information to the control unit 103.

The control unit 103 controls the receiving unit 105 and the transmitting unit 107 on the basis of the control information from the higher layer processing unit 101. The control unit 103 generates control information to be transmitted to the higher layer processing unit 101 and outputs the control information to the higher layer processing unit 101. The control unit 103 receives a decoded signal from the decoding unit 1051 and a channel estimation result from the channel measuring unit 1059. The control unit 103 outputs a signal to be encoded to the encoding unit 1071. Further, the control unit 103 may be used to control the whole or a part of the base station device 1.

The higher layer processing unit 101 performs a process and management related to radio resource control, sub frame setting, scheduling control, and/or CSI report control. The process and the management in the higher layer processing unit 101 are performed for each terminal device or in common to terminal devices connected to the base station device. The process and the management in the higher layer processing unit 101 may be performed only by the higher layer processing unit 101 or may be acquired from a higher node or another base station device.

In the radio resource control in the higher layer processing unit 101, generation and/or management of downlink data (transport block), system information, an RRC message (RRC parameter), and/or a MAC control element (CE) are performed.

In a sub frame setting in the higher layer processing unit 101, management of a sub frame setting, a sub frame pattern setting, an uplink-downlink setting, an uplink reference UL-DL setting, and/or a downlink reference UL-DL setting is performed. Further, the sub frame setting in the higher layer processing unit 101 is also referred to as a base station sub frame setting. Further, the sub frame setting in the higher layer processing unit 101 can be decided on the basis of an uplink traffic volume and a downlink traffic volume. Further, the sub frame setting in the higher layer processing unit 101 can be decided on the basis of a scheduling result of scheduling control in the higher layer processing unit 101.

In the scheduling control in the higher layer processing unit 101, a frequency and a sub frame to which the physical channel (the PDSCH and the PUSCH) is allocated, a coding rate, a modulation scheme, and transmission power of the physical channels (the PDSCH and the PUSCH), and the like are decided on the basis of the received channel state information, an estimation value, a channel quality, or the like of a propagation path input from the channel measuring unit 1059, and the like. For example, the control unit 103 generates the control information (DCI format) on the basis of the scheduling result of the scheduling control in the higher layer processing unit 101.

In the CSI report control in the higher layer processing unit 101, the CSI report of the terminal device 2 is controlled. For example, a setting related to the CSI reference resources assumed to calculate the CSI in the terminal device 2 is controlled.

Under the control from the control unit 103, the receiving unit 105 receives a signal transmitted from the terminal device 2 via the transceiving antenna 109, performs a reception process such as demultiplexing, demodulation, and decoding, and outputs information which has undergone the reception process to the control unit 103. Further, the reception process in the receiving unit 105 is performed on the basis of a setting which is specified in advance or a setting notified from the base station device 1 to the terminal device 2.

The wireless receiving unit 1057 performs conversion into an intermediate frequency (down conversion), removal of an unnecessary frequency component, control of an amplification level such that a signal level is appropriately maintained, quadrature demodulation based on an in-phase component and a quadrature component of a received signal, conversion from an analog signal into a digital signal, removal of a guard interval (GI), and/or extraction of a signal in the frequency domain by fast Fourier transform (FFT) on the uplink signal received via the transceiving antenna 109.

The demultiplexing unit 1055 separates the uplink channel such as the PUCCH or the PUSCH and/or uplink reference signal from the signal input from the wireless receiving unit 1057. The demultiplexing unit 1055 outputs the uplink reference signal to the channel measuring unit 1059. The demultiplexing unit 1055 compensates the propagation path for the uplink channel from the estimation value of the propagation path input from the channel measuring unit 1059.

The demodulating unit 1053 demodulates the reception signal for the modulation symbol of the uplink channel using a modulation scheme such as binary phase shift keying (BPSK), quadrature phase shift keying (QPSK), 16 quadrature amplitude modulation (QAM), 64 QAM, or 256 QAM. The demodulating unit 1053 performs separation and demodulation of a MIMO multiplexed uplink channel.

The decoding unit 1051 performs a decoding process on encoded bits of the demodulated uplink channel. The decoded uplink data and/or uplink control information are output to the control unit 103. The decoding unit 1051 performs a decoding process on the PUSCH for each transport block.

The channel measuring unit 1059 measures the estimation value, a channel quality, and/or the like of the propagation path from the uplink reference signal input from the demultiplexing unit 1055, and outputs the estimation value, a channel quality, and/or the like of the propagation path to the demultiplexing unit 1055 and/or the control unit 103. For example, the estimation value of the propagation path for propagation path compensation for the PUCCH or the PUSCH is measured through the UL-DMRS, and an uplink channel quality is measured through the SRS.

The transmitting unit 107 carries out a transmission process such as encoding, modulation, and multiplexing on downlink control information and downlink data input from the higher layer processing unit 101 under the control of the control unit 103. For example, the transmitting unit 107 generates and multiplexes the PHICH, the PDCCH, the EPDCCH, the PDSCH, and the downlink reference signal and generates a transmission signal. Further, the transmission process in the transmitting unit 107 is performed on the basis of a setting which is specified in advance, a setting notified from the base station device 1 to the terminal device 2, or a setting notified through the PDCCH or the EPDCCH transmitted through the same sub frame.

The encoding unit 1071 encodes the HARQ indicator (HARQ-ACK), the downlink control information, and the downlink data input from the control unit 103 using a predetermined coding scheme such as block coding, convolutional coding, turbo coding, or the like. The modulating unit 1073 modulates the encoded bits input from the encoding unit 1071 using a predetermined modulation scheme such as BPSK, QPSK, 16 QAM, 64 QAM, or 256 QAM. The downlink reference signal generating unit 1079 generates the downlink reference signal on the basis of a physical cell identification (PCI), an RRC parameter set in the terminal device 2, and the like. The multiplexing unit 1075 multiplexes a modulated symbol and the downlink reference signal of each channel and arranges resulting data in a predetermined resource element.

The wireless transmitting unit 1077 performs processes such as conversion into a signal in the time domain by inverse fast Fourier transform (IFFT), addition of the guard interval, generation of a baseband digital signal, conversion in an analog signal, quadrature modulation, conversion from a signal of an intermediate frequency into a signal of a high frequency (up conversion), removal of an extra frequency component, and amplification of power on the signal from the multiplexing unit 1075, and generates a transmission signal. The transmission signal output from the wireless transmitting unit 1077 is transmitted through the transceiving antenna 109.

<Configuration Example of Terminal Device 2 in Present Embodiment>

Figure 4:
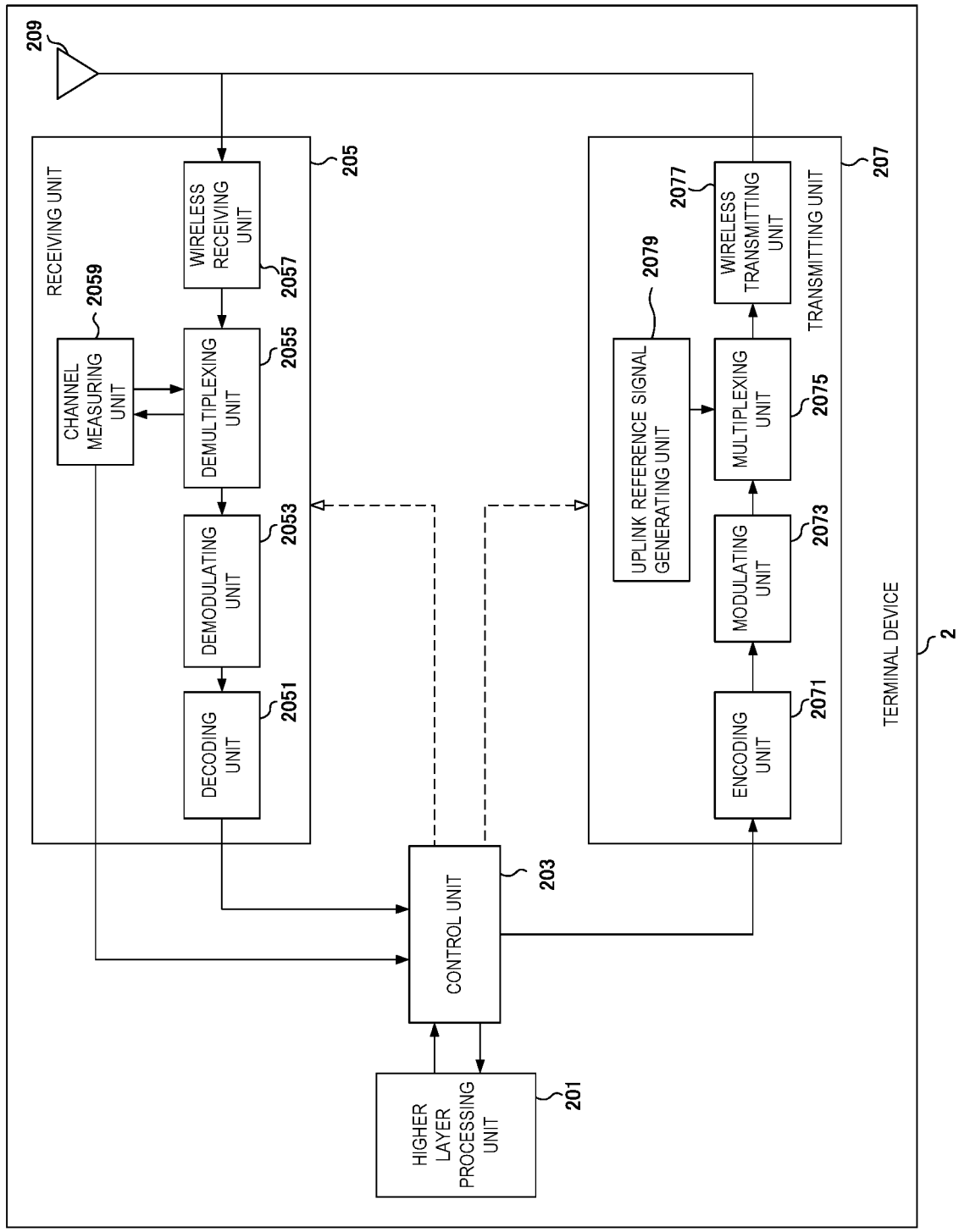
FIG. 4 is a schematic block diagram illustrating a configuration of a terminal device 2 of the present embodiment.

FIG. 4 is a schematic block diagram illustrating a configuration of the terminal device 2 of the present embodiment. As illustrated in FIG. 4, the terminal device 2 includes a higher layer processing unit 201, a control unit 203, a receiving unit 205, a transmitting unit 207, and a transceiving antenna 209. Further, the receiving unit 205 includes a decoding unit 2051, a demodulating unit 2053, a demultiplexing unit 2055, a wireless receiving unit 2057, and a channel measuring unit 2059. Further, the transmitting unit 207 includes an encoding unit 2071, a modulating unit 2073, a multiplexing unit 2075, a wireless transmitting unit 2077, and an uplink reference signal generating unit 2079.

The higher layer processing unit 201 outputs uplink data (transport block) to the control unit 203. The higher layer processing unit 201 performs processes of a medium access control (MAC) layer, a packet data convergence protocol (PDCP) layer, a radio link control (RLC) layer, and a radio resource control (RRC) layer. Further, the higher layer processing unit 201 generates control information to control the receiving unit 205 and the transmitting unit 207 and outputs the control information to the control unit 203.

The control unit 203 controls the receiving unit 205 and the transmitting unit 207 on the basis of the control information from the higher layer processing unit 201. The control unit 203 generates control information to be transmitted to the higher layer processing unit 201 and outputs the control information to the higher layer processing unit 201. The control unit 203 receives a decoded signal from the decoding unit 2051 and a channel estimation result from the channel measuring unit 2059. The control unit 203 outputs a signal to be encoded to the encoding unit 2071. Further, the control unit 203 may be used to control the whole or a part of the terminal device 2.

The higher layer processing unit 201 performs a process and management related to radio resource control, sub frame setting, scheduling control, and/or CSI report control. The process and the management in the higher layer processing unit 201 are performed on the basis of a setting which is specified in advance and/or a setting based on control information set or notified from the base station device 1. For example, the control information from the base station device 1 includes the RRC parameter, the MAC control element, or the DCI.

In the radio resource control in the higher layer processing unit 201, the setting information in the terminal device 2 is managed. In the radio resource control in the higher layer processing unit 201, generation and/or management of uplink data (transport block), system information, an RRC message (RRC parameter), and/or a MAC control element (CE) are performed.

In the sub frame setting in the higher layer processing unit 201, the sub frame setting in the base station device 1 and/or a base station device different from the base station device 1 is managed. The sub frame setting includes an uplink or downlink setting for the sub frame, a sub frame pattern setting, an uplink-downlink setting, an uplink reference UL-DL setting, and/or a downlink reference UL-DL setting. Further, the sub frame setting in the higher layer processing unit 201 is also referred to as a terminal sub frame setting.

In the scheduling control in the higher layer processing unit 201, control information for controlling scheduling on the receiving unit 205 and the transmitting unit 207 is generated on the basis of the DCI (scheduling information) from the base station device 1.

In the CSI report control in the higher layer processing unit 201, control related to the report of the CSI to the base station device 1 is performed. For example, in the CSI report control, a setting related to the CSI reference resources assumed for calculating the CSI by the channel measuring unit 2059 is controlled. In the CSI report control, resource (timing) used for reporting the CSI is controlled on the basis of the DCI and/or the RRC parameter.

Under the control from the control unit 203, the receiving unit 205 receives a signal transmitted from the base station device 1 via the transceiving antenna 209, performs a reception process such as demultiplexing, demodulation, and decoding, and outputs information which has undergone the reception process to the control unit 203. Further, the reception process in the receiving unit 205 is performed on the basis of a setting which is specified in advance or a notification from the base station device 1 or a setting.

The wireless receiving unit 2057 performs conversion into an intermediate frequency (down conversion), removal of an unnecessary frequency component, control of an amplification level such that a signal level is appropriately maintained, quadrature demodulation based on an in-phase component and a quadrature component of a received signal, conversion from an analog signal into a digital signal, removal of a guard interval (GI), and/or extraction of a signal in the frequency domain by fast Fourier transform (FFT) on the uplink signal received via the transceiving antenna 209.

The demultiplexing unit 2055 separates the downlink channel such as the PHICH, PDCCH, EPDCCH, or PDSCH, downlink synchronization signal and/or downlink reference signal from the signal input from the wireless receiving unit 2057. The demultiplexing unit 2055 outputs the uplink reference signal to the channel measuring unit 2059. The demultiplexing unit 2055 compensates the propagation path for the uplink channel from the estimation value of the propagation path input from the channel measuring unit 2059.

The demodulating unit 2053 demodulates the reception signal for the modulation symbol of the downlink channel using a modulation scheme such as BPSK, QPSK, 16 QAM, 64 QAM, or 256 QAM. The demodulating unit 2053 performs separation and demodulation of a MIMO multiplexed downlink channel.

The decoding unit 2051 performs a decoding process on encoded bits of the demodulated downlink channel. The decoded downlink data and/or downlink control information are output to the control unit 203. The decoding unit 2051 performs a decoding process on the PDSCH for each transport block.

The channel measuring unit 2059 measures the estimation value, a channel quality, and/or the like of the propagation path from the downlink reference signal input from the demultiplexing unit 2055, and outputs the estimation value, a channel quality, and/or the like of the propagation path to the demultiplexing unit 2055 and/or the control unit 203.

The downlink reference signal used for measurement by the channel measuring unit 2059 may be decided on the basis of at least a transmission mode set by the RRC parameter and/or other RRC parameters. For example, the estimation value of the propagation path for performing the propagation path compensation on the PDSCH or the EPDCCH is measured through the DL-DMRS. The estimation value of the propagation path for performing the propagation path compensation on the PDCCH or the PDSCH and/or the downlink channel for reporting the CSI are measured through the CRS. The downlink channel for reporting the CSI is measured through the CSI-RS. The channel measuring unit 2059 calculates a reference signal received power (RSRP) and/or a reference signal received quality (RSRQ) on the basis of the CRS, the CSI-RS, or the discovery signal, and outputs the RSRP and/or the RSRQ to the higher layer processing unit 201.

The transmitting unit 207 performs a transmission process such as encoding, modulation, and multiplexing on the uplink control information and the uplink data input from the higher layer processing unit 201 under the control of the control unit 203. For example, the transmitting unit 207 generates and multiplexes the uplink channel such as the PUSCH or the PUCCH and/or the uplink reference signal, and generates a transmission signal. Further, the transmission process in the transmitting unit 207 is performed on the basis of a setting which is specified in advance or a setting set or notified from the base station device 1.

The encoding unit 2071 encodes the HARQ indicator (HARQ-ACK), the uplink control information, and the uplink data input from the control unit 203 using a predetermined coding scheme such as block coding, convolutional coding, turbo coding, or the like. The modulating unit 2073 modulates the encoded bits input from the encoding unit 2071 using a predetermined modulation scheme such as BPSK, QPSK, 16 QAM, 64 QAM, or 256 QAM. The uplink reference signal generating unit 2079 generates the uplink reference signal on the basis of an RRC parameter set in the terminal device 2, and the like. The multiplexing unit 2075 multiplexes a modulated symbol and the uplink reference signal of each channel and arranges resulting data in a predetermined resource element.

The wireless transmitting unit 2077 performs processes such as conversion into a signal in the time domain by inverse fast Fourier transform (IFFT), addition of the guard interval, generation of a baseband digital signal, conversion in an analog signal, quadrature modulation, conversion from a signal of an intermediate frequency into a signal of a high frequency (up conversion), removal of an extra frequency component, and amplification of power on the signal from the multiplexing unit 2075, and generates a transmission signal. The transmission signal output from the wireless transmitting unit 2077 is transmitted through the transceiving antenna 209.

<Signaling of Control Information in Present Embodiment>

The base station device 1 and the terminal device 2 can use various methods for signaling (notification, broadcasting, or setting) of the control information. The signaling of the control information can be performed in various layers (layers). The signaling of the control information includes signaling of the physical layer which is signaling performed through the physical layer, RRC signaling which is signaling performed through the RRC layer, and MAC signaling which is signaling performed through the MAC layer. The RRC signaling is dedicated RRC signaling for notifying the terminal device 2 of the control information specific or a common RRC signaling for notifying of the control information specific to the base station device 1. The signaling used by a layer higher than the physical layer such as RRC signaling and MAC signaling is also referred to as signaling of the higher layer.

The RRC signaling is implemented by signaling the RRC parameter. The MAC signaling is implemented by signaling the MAC control element. The signaling of the physical layer is implemented by signaling the downlink control information (DCI) or the uplink control information (UCI). The RRC parameter and the MAC control element are transmitted using the PDSCH or the PUSCH. The DCI is transmitted using the PDCCH or the EPDCCH. The UCI is transmitted using the PUCCH or the PUSCH. The RRC signaling and the MAC signaling are used for signaling semi-static control information and are also referred to as semi-static signaling. The signaling of the physical layer is used for signaling dynamic control information and also referred to as dynamic signaling. The DCI is used for scheduling of the PDSCH or scheduling of the PUSCH. The UCI is used for the CSI report, the HARQ-ACK report, and/or the scheduling request (SR).

<Details of Downlink Control Information in Present Embodiment>

The DCI is notified using the DCI format having a field which is specified in advance. Predetermined information bits are mapped to the field specified in the DCI format. The DCI notifies of downlink scheduling information, uplink scheduling information, sidelink scheduling information, a request for a non-periodic CSI report, or an uplink transmission power command.

The DCI format monitored by the terminal device 2 is decided in accordance with the transmission mode set for each serving cell. In other words, a part of the DCI format monitored by the terminal device 2 can differ depending on the transmission mode. For example, the terminal device 2 in which a downlink transmission mode 1 is set monitors the DCI format 1A and the DCI format 1. For example, the terminal device 2 in which a downlink transmission mode 4 is set monitors the DCI format 1A and the DCI format 2. For example, the terminal device 2 in which an uplink transmission mode 1 is set monitors the DCI format 0. For example, the terminal device 2 in which an uplink transmission mode 2 is set monitors the DCI format 0 and the DCI format 4.

A control region in which the PDCCH for notifying the terminal device 2 of the DCI is placed is not notified of, and the terminal device 2 detects the DCI for the terminal device 2 through blind decoding (blind detection). Specifically, the terminal device 2 monitors a set of PDCCH candidates in the serving cell. The monitoring indicates that decoding is attempted in accordance with all the DCI formats to be monitored for each of the PDCCHs in the set. For example, the terminal device 2 attempts to decode all aggregation levels, PDCCH candidates, and DCI formats which are likely to be transmitted to the terminal device 2. The terminal device 2 recognizes the DCI (PDCCH) which is successfully decoded (detected) as the DCI (PDCCH) for the terminal device 2.

A cyclic redundancy check (CRC) is added to the DCI. The CRC is used for the DCI error detection and the DCI blind detection. A CRC parity bit (CRC) is scrambled using the RNTI. The terminal device 2 detects whether or not it is a DCI for the terminal device 2 on the basis of the RNTI. Specifically, the terminal device 2 performs de-scrambling on the bit corresponding to the CRC using a predetermined RNTI, extracts the CRC, and detects whether or not the corresponding DCI is correct.

The RNTI is specified or set in accordance with a purpose or a use of the DCI. The RNTI includes a cell-RNTI (C-RNTI), a semi persistent scheduling C-RNTI (SPS C-RNTI), a system information-RNTI (SI-RNTI), a paging-RNTI (P-RNTI), a random access-RNTI (RA-RNTI), a transmit power control-PUCCH-RNTI (TPC-PUCCH-RNTI), a transmit power control-PUSCH-RNTI (TPC-PUSCH-RNTI), a temporary C-RNTI, a multimedia broadcast multicast services (MBMS)-RNTI (M-RNTI)), and an eIMTA-RNTI.

The C-RNTI and the SPS C-RNTI are RNTIs which are specific to the terminal device 2 in the base station device 1 (cell), and serve as identifiers identifying the terminal device 2. The C-RNTI is used for scheduling the PDSCH or the PUSCH in a certain sub frame. The SPS C-RNTI is used to activate or release periodic scheduling of resources for the PDSCH or the PUSCH. A control channel having a CRC scrambled using the SI-RNTI is used for scheduling a system information block (SIB). A control channel with a CRC scrambled using the P-RNTI is used for controlling paging. A control channel with a CRC scrambled using the RA-RNTI is used for scheduling a response to the RACH. A control channel having a CRC scrambled using the TPC-PUCCH-RNTI is used for power control of the PUCCH. A control channel having a CRC scrambled using the TPC-PUSCH-RNTI is used for power control of the PUSCH. A control channel with a CRC scrambled using the temporary C-RNTI is used by a mobile station device in which no C-RNTI is set or recognized. A control channel with CRC scrambled using the M-RNTI is used for scheduling the MBMS. A control channel with a CRC scrambled using the eIMTA-RNTI is used for notifying of information related to a TDD UL/DL setting of a TDD serving cell in dynamic TDD (eIMTA). Further, the DCI format may be scrambled using a new RNTI instead of the above RNTI.

The scheduling information (downlink scheduling information, uplink scheduling information, and sidelink scheduling information) includes information for scheduling in units of resource blocks or in units of resource block groups as scheduling in the frequency domain. The resource block group is a set of consecutive resource blocks and indicates resources allocated to the terminal device to be scheduled. The size of the resource block group is decided in accordance with a system bandwidth.

<Details of Downlink Control Channel in Present Embodiment>

The DCI is transmitted using the PDCCH or the EPDCCH. The terminal device 2 monitors a set of PDCCH candidates and/or a set of EPDCCH candidates of one or more activated serving cells set by RRC signaling. Here, the monitoring means that the PDCCH and/or the EPDCCH in the set corresponding to all the DCI formats to be monitored is attempted to be decoded.

A set of PDCCH candidates or a set of EPDCCH candidates is also referred to as a search space. In the search space, a shared search space (CSS) and a terminal specific search space (USS) are defined. The CSS may be defined only for the search space for the PDCCH.

A common search space (CSS) is a search space set on the basis of a parameter specific to the base station device 1 and/or a parameter which is specified in advance. For example, the CSS is a search space used in common to a plurality of terminal devices. Therefore, the base station device 1 maps a control channel common to a plurality of terminal devices to the CSS, and thus resources for transmitting the control channel are reduced.

A UE-specific search space (USS) is a search space set using at least a parameter specific to the terminal device 2. Therefore, the USS is a search space specific to the terminal device 2, and it is possible to individually transmit the control channel specific to the terminal device 2. For this reason, the base station device 1 can efficiently map the control channels specific to a plurality of terminal devices.

The USS may be set to be used in common to a plurality of terminal devices. Since a common USS is set in a plurality of terminal devices, a parameter specific to the terminal device 2 is set to be the same value among a plurality of terminal devices. For example, a unit set to the same parameter among a plurality of terminal devices is a cell, a transmission point, a group of predetermined terminal devices, or the like.

The search space of each aggregation level is defined by a set of PDCCH candidates. Each PDCCH is transmitted using one or more CCE sets. The number of CCEs used in one PDCCH is also referred to as an aggregation level. For example, the number of CCEs used in one PDCCH is 1, 2, 4, or 8.

The search space of each aggregation level is defined by a set of EPDCCH candidates. Each EPDCCH is transmitted using one or more enhanced control channel element (ECCE) sets. The number of ECCEs used in one EPDCCH is also referred to as an aggregation level. For example, the number of ECCEs used in one EPDCCH is 1, 2, 4, 8, 16, or 32.

The number of PDCCH candidates or the number of EPDCCH candidates is decided on the basis of at least the search space and the aggregation level. For example, in the CSS, the number of PDCCH candidates in the aggregation levels 4 and 8 are 4 and 2, respectively. For example, in the USS, the number of PDCCH candidates in the aggregation 1, 2, 4, and 8 are 6, 6, 2, and 2, respectively.

Each ECCE includes a plurality of EREGs. The EREG is used to define mapping to the resource element of the EPDCCH. 16 EREGs which are assigned numbers of 0 to 15 are defined in each RB pair. In other words, an EREG 0 to an EREG 15 are defined in each RB pair. For each RB pair, the EREG 0 to the EREG 15 are preferentially defined at regular intervals in the frequency direction for resource elements other than resource elements to which a predetermined signal and/or channel is mapped. For example, the EREG is not defined for a resource element to which a demodulation reference signal associated with an EPDCCH transmitted through antenna ports 107 to 110 is mapped.

The number of ECCEs used in one EPDCCH depends on an EPDCCH format and is decided on the basis of other parameters. The number of ECCEs used in one EPDCCH is also referred to as an aggregation level. For example, the number of ECCEs used in one EPDCCH is decided on the basis of the number of resource elements which can be used for transmission of the EPDCCH in one RB pair, a transmission method of the EPDCCH, and the like. For example, the number of ECCEs used in one EPDCCH is 1, 2, 4, 8, 16, or 32. Further, the number of EREGs used in one ECCE is decided on the basis of a type of sub frame and a type of cyclic prefix and is 4 or 8. Distributed transmission and localized transmission are supported as the transmission method of the EPDCCH.

The distributed transmission or the localized transmission can be used for the EPDCCH. The distributed transmission and the localized transmission differ in mapping of the ECCE to the EREG and the RB pair. For example, in the distributed transmission, one ECCE is configured using EREGs of a plurality of RB pairs. In the localized transmission, one ECCE is configured using an EREG of one RB pair.

The base station device 1 performs a setting related to the EPDCCH in the terminal device 2. The terminal device 2 monitors a plurality of EPDCCHs on the basis of the setting from the base station device 1. A set of RB pairs that the terminal device 2 monitors the EPDCCH can be set. The set of RB pairs is also referred to as an EPDCCH set or an EPDCCH-PRB set. One or more EPDCCH sets can be set in one terminal device 2. Each EPDCCH set includes one or more RB pairs. Further, the setting related to the EPDCCH can be individually performed for each EPDCCH set.

The base station device 1 can set a predetermined number of EPDCCH sets in the terminal device 2. For example, up to two EPDCCH sets can be set as an EPDCCH set 0 and/or an EPDCCH set 1. Each of the EPDCCH sets can be constituted by a predetermined number of RB pairs. Each EPDCCH set constitutes one set of ECCEs. The number of ECCEs configured in one EPDCCH set is decided on the basis of the number of RB pairs set as the EPDCCH set and the number of EREGs used in one ECCE. In a case in which the number of ECCEs configured in one EPDCCH set is N, each EPDCCH set constitutes ECCEs 0 to N–1. For example, in a case in which the number of EREGs used in one ECCE is 4, the EPDCCH set constituted by 4 RB pairs constitutes 16 ECCEs.

<Details of Channel State Information in Present Embodiment>

The terminal device 2 reports the CSI to the base station device 1. The time and frequency resources used to report the CSI are controlled by the base station device 1. In the terminal device 2, a setting related to the CSI is performed through the RRC signaling from the base station device 1. In the terminal device 2, one or more CSI processes are set in a predetermined transmission mode. The CSI reported by the terminal device 2 corresponds to the CSI process. For example, the CSI process is a unit of control or setting related to the CSI. For each of the CSI processes, a setting related to the CSI-RS resources, the CSI-IM resources, the periodic CSI report (for example, a period and an offset of a report), and/or the non-periodic CSI report can be independently set.

The CSI includes a channel quality indicator (CQI), a precoding matrix indicator (PMI), a precoding type indicator (PTI), a rank indicator (RI), and/or a CSI-RS resource indicator (CRI). The RI indicates the number of transmission layers (the number of ranks). The PMI is information indicating a precoding matrix which is specified in advance. The PMI indicates one precoding matrix by one piece of information or two pieces of information. In a case in which two pieces of information are used, the PMI is also referred to as a first PMI and a second PMI. The CQI is information indicating a combination of a modulation scheme and a coding rate which are specified in advance. The CRI is information (single instance) indicating one CSI-RS resource selected from two or more CSI-RS resources in a case in which the two or more CSI-RS resources are set in one CSI process. The terminal device 2 reports the CSI to recommend to the base station device 1. The terminal device 2 reports the CQI satisfying a predetermined reception quality for each transport block (codeword).

In the CRI report, one CSI-RS resource is selected from the CSI-RS resources to be set. In a case in which the CRI is reported, the PMI, the CQI, and the RI to be reported are calculated (selected) on the basis of the reported CRI. For example, in a case in which the CSI-RS resources to be set are precoded, the terminal device 2 reports the CRI, so that precoding (beam) suitable for the terminal device 2 is reported.

A sub frame (reporting instances) in which periodic CSI reporting can be performed are decided by a report period and a sub frame offset set by a parameter of a higher layer (a CQIPMI index, an RI index, and a CRI index). Further, the parameter of the higher layer can be independently set in a sub frame set to measure the CSI. In a case in which only one piece of information is set in a plurality of sub frame sets, that information can be set in common to the sub frame sets. In each serving cell, one or more periodic CSI reports are set by the signaling of the higher layer.

A CSI report type supports a PUCCH CSI report mode. The CSI report type is also referred to as a PUCCH report type. A type 1 report supports feedback of the CQI for a terminal selection sub band. A type 1a report supports feedbank of a sub band CQI and a second PMI. Type 2, type 2b, type 2c reports support feedback of a wideband CQI and a PMI. A type 2a report supports feedback of a wideband PMI. A type 3 report supports feedback of the RI. A type 4 report supports feedback of the wideband CQI. A type 5 report supports feedback of the RI and the wideband PMI. A type 6 report supports feedback of the RI and the PTI. A type 7 report supports feedback of the CRI and the RI. A type 8 report supports feedback of the CRI, the RI, and the wideband PMI. A type 9 report supports feedback of the CRI, the RI, and the PTI. A type 10 report supports feedback of the CRI.

In the terminal device 2, information related to the CSI measurement and the CSI report is set from the base station device 1. The CSI measurement is performed on the basis of the reference signal and/or the reference resources (for example, the CRS, the CSI-RS, the CSI-IM resources, and/or the DRS). The reference signal used for the CSI measurement is decided on the basis of the setting of the transmission mode or the like. The CSI measurement is performed on the basis of channel measurement and interference measurement. For example, power of a desired cell is measured through the channel measurement. Power and noise power of a cell other than a desired cell are measured through the interference measurement.

For example, in the CSI measurement, the terminal device 2 performs the channel measurement and the interference measurement on the basis of the CRS. For example, in the CSI measurement, the terminal device 2 performs the channel measurement on the basis of the CSI-RS and performs the interference measurement on the basis of the CRS. For example, in the CSI measurement, the terminal device 2 performs the channel measurement on the basis of the CSI-RS and performs the interference measurement on the basis of the CSI-IM resources.

The CSI process is set as information specific to the terminal device 2 through signaling of the higher layer. In the terminal device 2, one or more CSI processes are set, and the CSI measurement and the CSI report are performed on the basis of the setting of the CSI process. For example, in a case in which a plurality of CSI processes are set, the terminal device 2 independently reports a plurality of CSIs based on the CSI processes. Each CSI process includes a setting for the cell state information, an identifier of the CSI process, setting information related to the CSI-RS, setting information related to the CSI-IM, a sub frame pattern set for the CSI report, setting information related to the periodic CSI report, setting information related to the non-periodic CSI report. Further, the setting for the cell state information may be common to a plurality of CSI processes.

The terminal device 2 uses the CSI reference resources to perform the CSI measurement. For example, the terminal device 2 measures the CSI in a case in which the PDSCH is transmitted using a group of downlink physical resource blocks indicated by the CSI reference resources. In a case in which the CSI sub frame set is set through the signaling of the higher layer, each CSI reference resource belongs to one of the CSI sub frame sets and does not belong to both of the CSI sub frame sets.

In the frequency direction, the CSI reference resource is defined by the group of downlink physical resource blocks corresponding to the bands associated with the value of the measured CQI.

In the layer direction (spatial direction), the CSI reference resources are defined by the RI and the PMI whose conditions are set by the measured CQI. In other words, in the layer direction (spatial direction), the CSI reference resources are defined by the RI and the PMI which are assumed or generated when the CQI is measured.

In the time direction, the CSI reference resources are defined by one or more predetermined downlink sub frames. Specifically, the CSI reference resources are defined by a valid sub frame which is a predetermined number before a sub frame for reporting the CSI. The predetermined number of sub frames for defining the CSI reference resources is decided on the basis of the transmission mode, the frame configuration type, the number of CSI processes to be set, and/or the CSI report mode. For example, in a case in which one CSI process and the periodic CSI report mode are set in the terminal device 2, the predetermined number of sub frames for defining the CSI reference resource is a minimum value of 4 or more among valid downlink sub frames.

A valid sub frame is a sub frame satisfying a predetermined condition. A downlink sub frame in a serving cell is considered to be valid in a case in which some or all of the following conditions are satisfied:

(1) A valid downlink sub frame is a sub frame in an ON state in the terminal device 2 in which the RRC parameters related to the ON state and the OFF state are set;

(2) A valid downlink sub frame is set as the downlink sub frame in the terminal device 2;

(3) A valid downlink sub frame is not a multimedia broadcast multicast service single frequency network (MB-SFN) sub frame in a predetermined transmission mode;

(4) A valid downlink sub frame is not included in a range of a measurement interval (measurement gap) set in the terminal device 2;

(5) A valid downlink sub frame is an element or part of a CSI sub frame set linked to a periodic CSI report when the CSI sub frame set is set in the terminal device 2 in the periodic CSI report; and (6) A valid downlink sub frame is an element or part of a CSI sub frame set linked to a downlink sub frame associated with a corresponding CSI request in an uplink DCI format in a non-periodic CSI report for the CSI process. Under these conditions, a predetermined transmission mode, a plurality of CSI processes, and a CSI sub frame set for the CSI process are set in the terminal device 2.

<Details of Multicarrier Transmission in Present Embodiment>

A plurality of cells are set for the terminal device 2, and the terminal device 2 can perform multicarrier transmission. Communication in which the terminal device 2 uses a plurality of cells is referred to as carrier aggregation (CA) or dual connectivity (DC). Contents described in the present embodiment can be applied to each or some of a plurality of cells set in the terminal device 2. The cell set in the terminal device 2 is also referred to as a serving cell.

In the CA, a plurality of serving cells to be set includes one primary cell (PCell) and one or more secondary cells (SCell). One primary cell and one or more secondary cells can be set in the terminal device 2 that supports the CA.

The primary cell is a serving cell in which the initial connection establishment procedure is performed, a serving cell that the initial connection re-establishment procedure is started, or a cell indicated as the primary cell in a handover procedure. The primary cell operates with a primary frequency. The secondary cell can be set after a connection is constructed or reconstructed. The secondary cell operates with a secondary frequency. Further, the connection is also referred to as an RRC connection.

The DC is an operation in which a predetermined terminal device 2 consumes radio resources provided from at least two different network points. The network point is a master base station device (a master eNB (MeNB)) and a secondary base station device (a secondary eNB (SeNB)). In the dual connectivity, the terminal device 2 establishes an RRC connection through at least two network points. In the dual connectivity, the two network points may be connected through a non-ideal backhaul.

In the DC, the base station device 1 which is connected to at least an S1-MME and plays a role of a mobility anchor of a core network is referred to as a master base station device. Further, the base station device 1 which is not the master base station device providing additional radio resources to the terminal device 2 is referred to as a secondary base station device. A group of serving cells associated with the master base station device is also referred to as a master cell group (MCG). A group of serving cells associated with the secondary base station device is also referred to as a secondary cell group (SCG).

In the DC, the primary cell belongs to the MCG. Further, in the SCG, the secondary cell corresponding to the primary cell is referred to as a primary secondary cell (PSCell). A function (capability and performance) equivalent to the PCell (the base station device constituting the PCell) may be supported by the PSCell (the base station device constituting the PSCell). Further, the PSCell may only support some functions of the PCell. For example, the PSCell may support a function of performing the PDCCH transmission using the search space different from the CSS or the USS. Further, the PSCell may constantly be in an activation state. Further, the PSCell is a cell that can receive the PUCCH.

In the DC, a radio bearer (a date radio bearer (DRB)) and/or a signaling radio bearer (SRB) may be individually allocated through the MeNB and the SeNB. A duplex mode may be set individually in each of the MCG (PCell) and the SCG (PSCell). The MCG (PCell) and the SCG (PSCell) may not be synchronized with each other. A parameter (a timing advance group (TAG)) for adjusting a plurality of timings may be independently set in the MCG (PCell) and the SCG (PSCell). In the dual connectivity, the terminal device 2 transmits the UCI corresponding to the cell in the MCG only through MeNB (PCell) and transmits the UCI corresponding to the cell in the SCG only through SeNB (pSCell). In the transmission of each UCI, the transmission method using the PUCCH and/or the PUSCH is applied in each cell group.

The PUCCH and the PBCH (MIB) are transmitted only through the PCell or the PSCell. Further, the PRACH is transmitted only through the PCell or the PSCell as long as a plurality of TAGs are not set between cells in the CG.

In the PCell or the PSCell, semi-persistent scheduling (SPS) or discontinuous transmission (DRX) may be performed. In the secondary cell, the same DRX as the PCell or the PSCell in the same cell group may be performed.

In the secondary cell, information/parameter related to a setting of MAC is basically shared with the PCell or the PSCell in the same cell group. Some parameters may be set for each secondary cell. Some timers or counters may be applied only to the PCell or the PSCell.

In the CA, a cell to which the TDD scheme is applied and a cell to which the FDD scheme is applied may be aggregated. In a case in which the cell to which the TDD is applied and the cell to which the FDD is applied are aggregated, the present disclosure can be applied to either the cell to which the TDD is applied or the cell to which the FDD is applied.

The terminal device 2 transmits information indicating a combination of bands in which the CA is supported by the terminal device 2 to the base station device 1. The terminal device 2 transmits information indicating whether or not simultaneous transmission and reception are supported in a plurality of serving cells in a plurality of different bands for each of band combinations to the base station device 1.

<Details of Resource Allocation in Present Embodiment>

The base station device 1 can use a plurality of methods as a method of allocating resources of the PDSCH and/or the PUSCH to the terminal device 2. The resource allocation method includes dynamic scheduling, semi persistent scheduling, multi sub frame scheduling, and cross sub frame scheduling.

In the dynamic scheduling, one DCI performs resource allocation in one sub frame. Specifically, the PDCCH or the EPDCCH in a certain sub frame performs scheduling for the PDSCH in the sub frame. The PDCCH or the EPDCCH in a certain sub frame performs scheduling for the PUSCH in a predetermined sub frame after the certain sub frame.

In the multi sub frame scheduling, one DCI allocates resources in one or more sub frames. Specifically, the PDCCH or the EPDCCH in a certain sub frame performs scheduling for the PDSCH in one or more sub frames which are a predetermined number after the certain sub frame. The PDCCH or the EPDCCH in a certain sub frame performs scheduling for the PUSCH in one or more sub frames which are a predetermined number after the sub frame. The predetermined number can be set to an integer of zero or more. The predetermined number may be specified in advance and may be decided on the basis of the signaling of the physical layer and/or the RRC signaling. In the multi sub frame scheduling, consecutive sub frames may be scheduled, or sub frames with a predetermined period may be scheduled. The number of sub frames to be scheduled may be specified in advance or may be decided on the basis of the signaling of the physical layer and/or the RRC signaling.

In the cross sub frame scheduling, one DCI allocates resources in one sub frame. Specifically, the PDCCH or the EPDCCH in a certain sub frame performs scheduling for the PDSCH in one sub frame which is a predetermined number after the certain sub frame. The PDCCH or the EPDCCH in a certain sub frame performs scheduling for the PUSCH in one sub frame which is a predetermined number after the sub frame. The predetermined number can be set to an integer of zero or more. The predetermined number may be specified in advance and may be decided on the basis of the signaling of the physical layer and/or the RRC signaling. In the cross sub frame scheduling, consecutive sub frames may be scheduled, or sub frames with a predetermined period may be scheduled.

In the semi-persistent scheduling (SPS), one DCI allocates resources in one or more sub frames. In a case in which information related to the SPS is set through the RRC signaling, and the PDCCH or the EPDCCH for activating the SPS is detected, the terminal device 2 activates a process related to the SPS and receives a predetermined PDSCH and/or PUSCH on the basis of a setting related to the SPS. In a case in which the PDCCH or the EPDCCH for releasing the SPS is detected when the SPS is activated, the terminal device 2 releases (inactivates) the SPS and stops reception of a predetermined PDSCH and/or PUSCH. The release of the SPS may be performed on the basis of a case in which a predetermined condition is satisfied. For example, in a case in which a predetermined number of empty transmission data is received, the SPS is released. The data empty transmission for releasing the SPS corresponds to a MAC protocol data unit (PDU) including a zero MAC service data unit (SDU).

Information related to the SPS by the RRC signaling includes an SPS C-RNTI which is an SPN RNTI, information related to a period (interval) in which the PDSCH is scheduled, information related to a period (interval) in which the PUSCH is scheduled, information related to a setting for releasing the SPS, and/or a number of the HARQ process in the SPS. The SPS is supported only in the primary cell and/or the primary secondary cell.

<Details of Downlink Resource Element Mapping in Present Embodiment>

Figure 5:
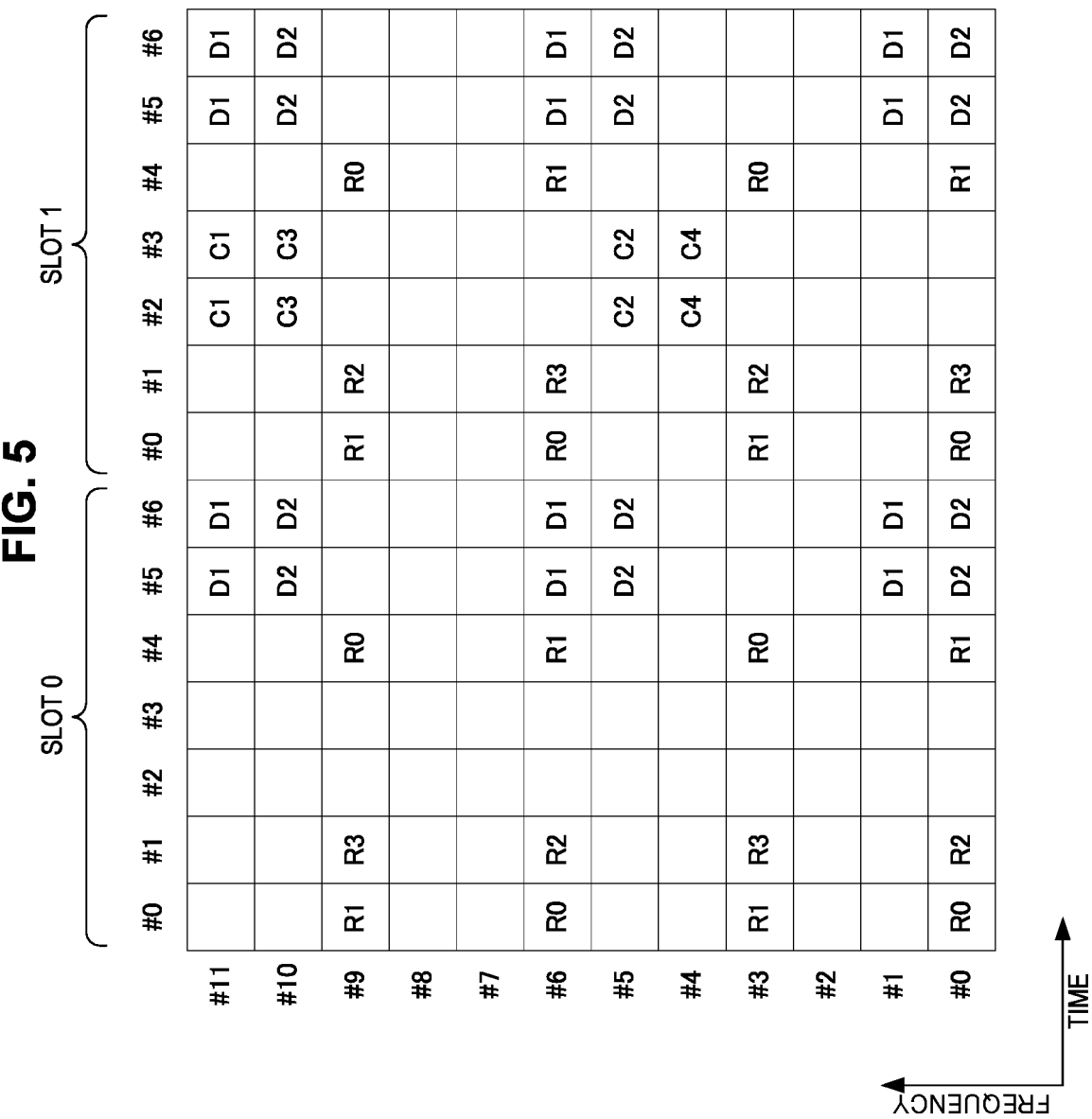
FIG. 5 is a diagram illustrating an example of downlink resource element mapping in the present embodiment.

FIG. 5 is a diagram illustrating an example of downlink resource element mapping in the present embodiment. In this example, a set of resource elements in one resource block pair in a case in which one resource block and the number of OFDM symbols in one slot are 7 will be described. Further, seven OFDM symbols in a first half in the time direction in the resource block pair are also referred to as a slot 0 (a first slot). Seven OFDM symbols in a second half in the time direction in the resource block pair are also referred to as a slot 1 (a second slot). Further, the OFDM symbols in each slot (resource block) are indicated by OFDM symbol number 0 to 6. Further, the sub carriers in the frequency direction in the resource block pair are indicated by sub carrier numbers 0 to 11. Further, in a case in which a system bandwidth is constituted by a plurality of resource blocks, a different sub carrier number is allocated over the system bandwidth. For example, in a case in which the system bandwidth is constituted by six resource blocks, the sub carriers to which the sub carrier numbers 0 to 71 are allocated are used. Further, in the description of the present embodiment, a resource element (k, l) is a resource element indicated by a sub carrier number k and an OFDM symbol number 1.

Resource elements indicated by R0 to R3 indicate cell-specific reference signals of the antenna ports 0 to 3, respectively. Hereinafter, the cell-specific reference signals of the antenna ports 0 to 3 are also referred to as cell-specific RSs (CRSs). In this example, the case of the antenna ports in which the number of CRSs is 4 is described, but the number thereof can be changed. For example, the CRS can use one antenna port or two antenna ports. Further, the CRS can shift in the frequency direction on the basis of the cell ID. For example, the CRS can shift in the frequency direction on the basis of a remainder obtained by dividing the cell ID by 6.

Resource element indicated by C1 to C4 indicates reference signals (CSI-RS) for measuring transmission path states of the antenna ports 15 to 22. The resource elements denoted by C1 to C4 indicate CSI-RSs of a code division multiplexing (CDM) group 1 to a CDM group 4, respectively. The CSI-RS is constituted by an orthogonal sequence (orthogonal code) using a Walsh code and a scramble code using a pseudo random sequence. Further, the CSI-RS is code division multiplexed using an orthogonal code such as a Walsh code in the CDM group. Further, the CSI-RS is frequency-division multiplexed (FDM) mutually between the CDM groups.

The CSI-RSs of the antenna ports 15 and 16 are mapped to C1. The CSI-RSs of the antenna ports 17 and 18 is mapped to C2. The CSI-RSs of the antenna port 19 and 20 are mapped to C3. The CSI-RSs of the antenna port 21 and 22 are mapped to C4.

A plurality of antenna ports of the CSI-RSs are specified. The CSI-RS can be set as a reference signal corresponding to eight antenna ports of the antenna ports 15 to 22. Further, the CSI-RS can be set as a reference signal corresponding to four antenna ports of the antenna ports 15 to 18. Further, the CSI-RS can be set as a reference signal corresponding to two antenna ports of the antenna ports 15 to 16. Further, the CSI-RS can be set as a reference signal corresponding to one antenna port of the antenna port 15. The CSI-RS can be mapped to some sub frames, and, for example, the CSI-RS can be mapped for every two or more sub frames. A plurality of mapping patterns are specified for the resource element of the CSI-RS. Further, the base station device 1 can set a plurality of CSI-RSs in the terminal device 2.

The CSI-RS can set transmission power to zero. The CSI-RS with zero transmission power is also referred to as a zero power CSI-RS. The zero power CSI-RS is set independently of the CSI-RS of the antenna ports 15 to 22. Further, the CSI-RS of the antenna ports 15 to 22 is also referred to as a non-zero power CSI-RS.

The base station device 1 sets CSI-RS as control information specific to the terminal device 2 through the RRC signaling. In the terminal device 2, the CSI-RS is set through the RRC signaling by the base station device 1. Further, in the terminal device 2, the CSI-IM resources which are resources for measuring interference power can be set. The terminal device 2 generates feedback information using the CRS, the CSI-RS, and/or the CSI-IM resources on the basis of a setting from the base station device 1.

Resource elements indicated by D1 to D2 indicate the DL-DMRSs of the CDM group 1 and the CDM group 2, respectively. The DL-DMRS is constituted using an orthogonal sequence (orthogonal code) using a Walsh code and a scramble sequence according to a pseudo random sequence. Further, the DL-DMRS is independent for each antenna port and can be multiplexed within each resource block pair. The DL-DMRSs are in an orthogonal relation with each other between the antenna ports in accordance with the CDM and/or the FDM. Each of DL-DMRSs undergoes the CDM in the CDM group in accordance with the orthogonal codes. The DL-DMRSs undergo the FDM with each other between the CDM groups. The DL-DMRSs in the same CDM group are mapped to the same resource element. For the DL-DMRSs in the same CDM group, different orthogonal sequences are used between the antenna ports, and the orthogonal sequences are in the orthogonal relation with each other. The DL-DMRS for the PDSCH can use some or all of the eight antenna ports (the antenna ports 7 to 14). In other words, the PDSCH associated with the DL-DMRS can perform MIMO transmission of up to 8 ranks. The DL-DMRS for the EPDCCH can use some or all of the four antenna ports (the antenna ports 107 to 110). Further, the DL-DMRS can change a spreading code length of the CDM or the number of resource elements to be mapped in accordance with the number of ranks of an associated channel.

The DL-DMRS for the PDSCH to be transmitted through the antenna ports 7, 8, 11, and 13 are mapped to the resource element indicated by D1. The DL-DMRS for the PDSCH to be transmitted through the antenna ports 9, 10, 12, and 14 are mapped to the resource element indicated by D2. Further, the DL-DMRS for the EPDCCH to be transmitted through the antenna ports 107 and 108 are mapped to the resource element indicated by D1. The DL-DMRS for the EPDCCH to be transmitted through the antenna ports 109 and 110 are mapped to the resource element denoted by D2.

<HARQ in Present Embodiment>

In the present embodiment, the HARQ has various features. The HARQ transmits and retransmits the transport block. In the HARQ, a predetermined number of processes (HARQ processes) are used (set), and each process independently operates in accordance with a stop-and-wait scheme.

In the downlink, the HARQ is asynchronous and operates adaptively. In other words, in the downlink, retransmission is constantly scheduled through the PDCCH. The uplink HARQ-ACK (response information) corresponding to the downlink transmission is transmitted through the PUCCH or the PUSCH. In the downlink, the PDCCH notifies of a HARQ process number indicating the HARQ process and information indicating whether or not transmission is initial transmission or retransmission.

In the uplink, the HARQ operates in a synchronous or asynchronous manner. The downlink HARQ-ACK (response information) corresponding to the uplink transmission is transmitted through the PHICH. In the uplink HARQ, an operation of the terminal device is decided on the basis of the HARQ feedback received by the terminal device and/or the PDCCH received by the terminal device. For example, in a case in which the PDCCH is not received, and the HARQ feedback is ACK, the terminal device does not perform transmission (retransmission) but holds data in a HARQ buffer. In this case, the PDCCH may be transmitted in order to resume the retransmission. Further, for example, in a case in which the PDCCH is not received, and the HARQ feedback is NACK, the terminal device performs retransmission non-adaptively through a predetermined uplink sub frame. Further, for example, in a case in which the PDCCH is received, the terminal device performs transmission or retransmission on the basis of contents notified through the PDCCH regardless of content of the HARQ feedback.

Further, in the uplink, in a case in which a predetermined condition (setting) is satisfied, the HARQ may be operated only in an asynchronous manner. In other words, the downlink HARQ-ACK is not transmitted, and the uplink retransmission may constantly be scheduled through the PDCCH.

In the HARQ-ACK report, the HARQ-ACK indicates ACK, NACK, or DTX. In a case in which the HARQ-ACK is ACK, it indicates that the transport block (codeword and channel) corresponding to the HARQ-ACK is correctly received (decoded). In a case in which the HARQ-ACK is NACK, it indicates that the transport block (codeword and channel) corresponding to the HARQ-ACK is not correctly received (decoded). In a case in which the HARQ-ACK is DTX, it indicates that the transport block (codeword and channel) corresponding to the HARQ-ACK is not present (not transmitted).

A predetermined number of HARQ processes are set (specified) in each of downlink and uplink. For example, in FDD, up to eight HARQ processes are used for each serving cell. Further, for example, in TDD, a maximum number of HARQ processes is decided by an uplink/downlink setting.

A maximum number of HARQ processes may be decided on the basis of a round trip time (RTT). For example, in a case in which the RTT is 8 TTIs, the maximum number of the HARQ processes can be 8.

In the present embodiment, the HARQ information is constituted by at least a new data indicator (NDI) and a transport block size (TBS). The NDI is information indicating whether or not the transport block corresponding to the HARQ information is initial transmission or retransmission. The TBS is the size of the transport block. The transport block is a block of data in a transport channel (transport layer) and can be a unit for performing the HARQ. In the DL-SCH transmission, the HARQ information further includes a HARQ process ID (a HARQ process number). In the UL-SCH transmission, the HARQ information further includes an information bit in which the transport block is encoded and a redundancy version (RV) which is information specifying a parity bit. In the case of spatial multiplexing in the DL-SCH, the HARQ information thereof includes a set of NDI and TBS for each transport block.

<TTI in Present Embodiment>

Figure 6:
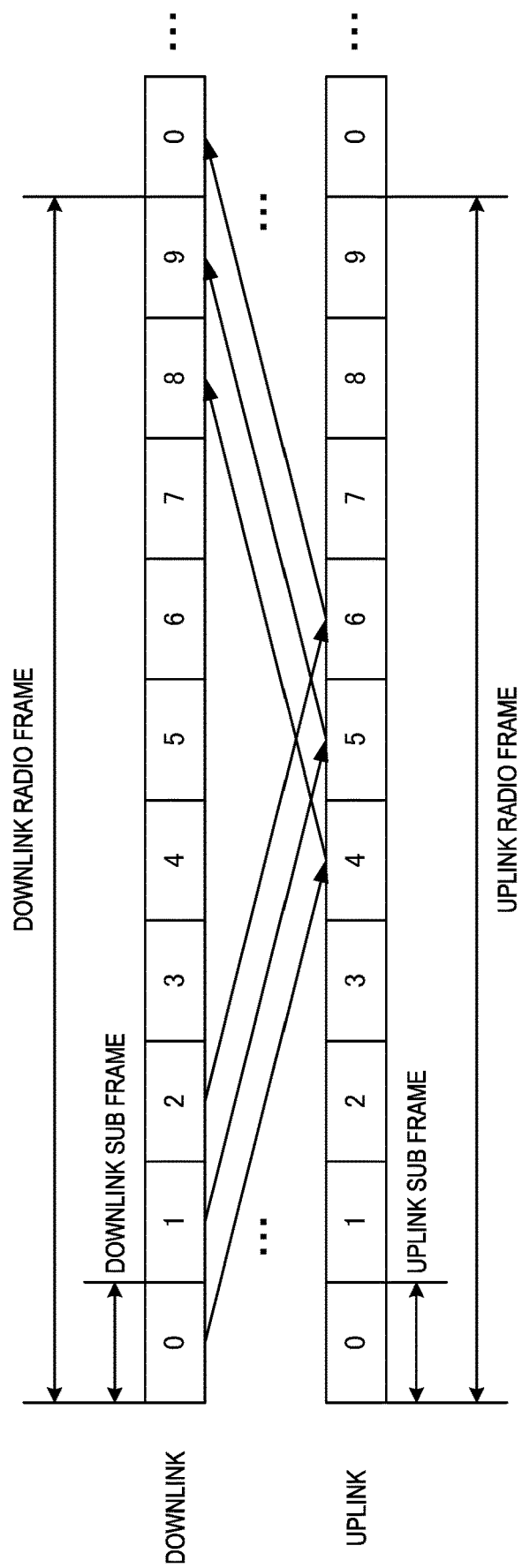
FIG. 6 is a diagram illustrating an example of a TTI in the present embodiment.

FIG. 6 is a diagram illustrating an example of the TTI in the present embodiment. In the example of FIG. 6, the TTI is a 1 sub frame. In other words, a unit of data transmission in the time domain such as the PDCCH, the EPDCCH, the PDSCH, the PUSCH, or the HARQ-ACK is a 1 sub frame. Arrows between downlink and uplink indicate a HARQ timing and/or a scheduling timing. The HARQ timing and the scheduling timing are specified or set in units of sub frames which are TTIs. For example, in a case in which a certain PDSCH is transmitted through a downlink sub frame n, the HARQ-ACK for the PDSCH is transmitted through an uplink sub frame n+4 after 4 sub frames. For example, in a case in which the PDCCH for notifying of the uplink grant is transmitted through a downlink sub frame n, the PUSCH corresponding to the uplink grant is transmitted through an uplink sub frame n+4 after 4 sub frames, and the HARQ-ACK for the PUSCH is notified through a downlink sub frame n+8 after 4 sub frames. Further, in FIG. 6, an example in which the TTI is a 1 sub frame is described, but the TTI may be a plurality of sub frames. In other words, the TTI may be an integer multiple of a sub frame length.

Figure 7:
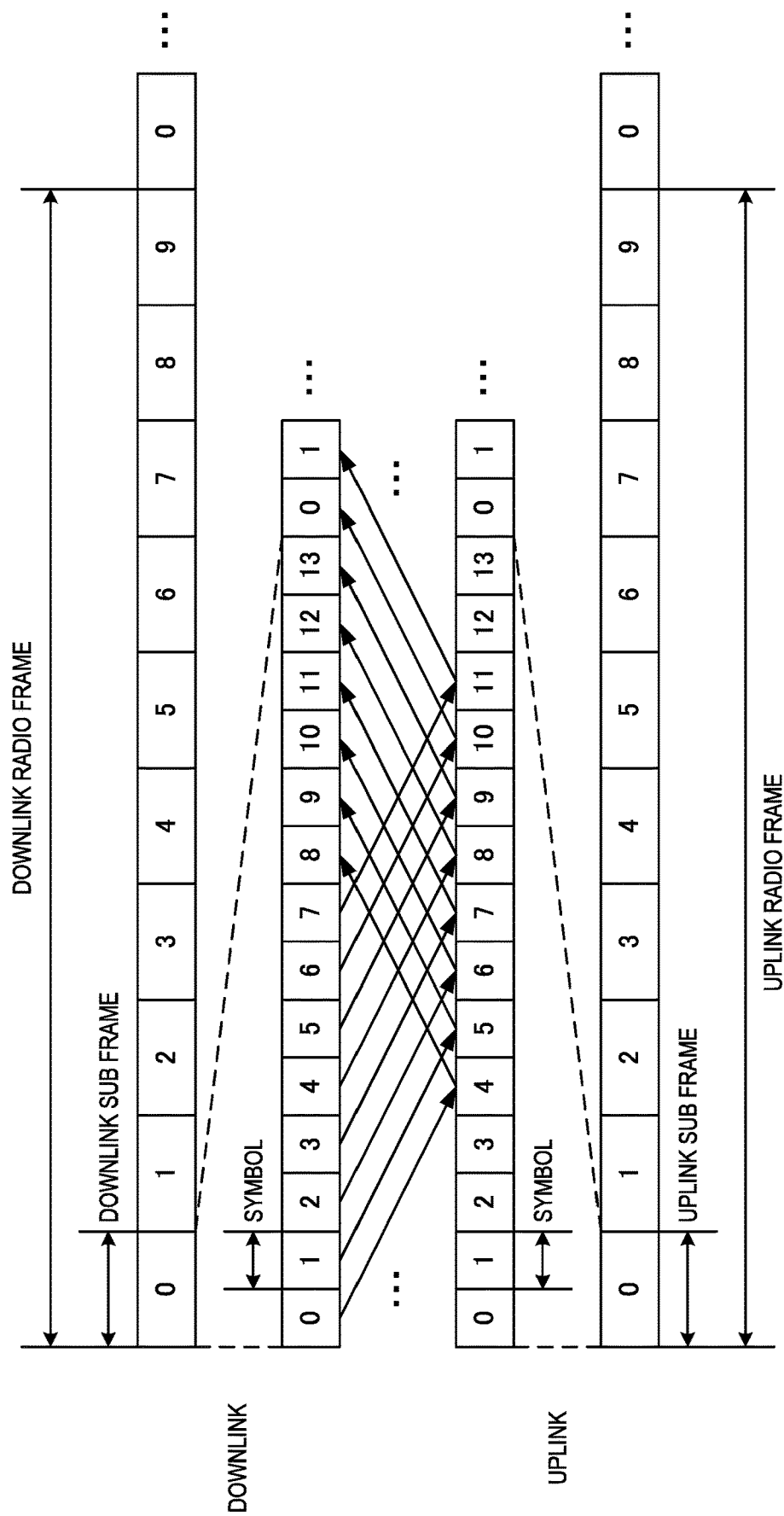
FIG. 7 is a diagram illustrating an example of a TTI in the present embodiment.

FIG. 7 is a diagram illustrating an example of the TTI in the present embodiment. In the example of FIG. 7, the TTI is a 1 symbol. In other words, a unit of data transmission in the time domain such as the PDCCH, the EPDCCH, the PDSCH, the PUSCH, or the HARQ-ACK is a 1 symbol. Arrows between downlink and uplink indicate a HARQ timing and/or a scheduling timing. The HARQ timing and the scheduling timing are specified or set in units of symbols which are TTIs. For example, in a case in which a certain PDSCH is transmitted through a downlink symbol n, the HARQ-ACK for the PDSCH is transmitted through an uplink symbol n+4 after 4 symbols. For example, in a case in which the PDCCH for notifying of the uplink grant is transmitted through a downlink symbol n, the PUSCH corresponding to the uplink grant is transmitted through an uplink symbol n+4 after 4 symbols, and the HARQ-ACK for the PUSCH is notified through a downlink symbol n+8 after 4 symbols. Further, in FIG. 6, an example in which the TTI is a 1 symbol is described, but the TTI may be a plurality of symbols. In other words, the TTI may be an integer multiple of a symbol length.

A difference between FIG. 6 and FIG. 7 lies in that the TTIs have different sizes (lengths). Further, as described above, in a case in which the HARQ timing and the scheduling timing are specified or set on the basis of the TTI, the HARQ timing and the scheduling timing can be adjusted to earlier timings by reducing the TTI. Since the HARQ timing and the scheduling timing are factors for deciding the latency of the system, reducing the TTI reduces the latency. For example, the reduction in the latency is important for data (packet) intended for safety purpose such as intelligent transportation system. On the other hand, in a case in which the TTI is reduced, the maximum value of the TBS transmitted at one TTI is reduced, and an overhead of control information is likely to increase. Therefore, it is preferable that the TTI be specified or set in accordance with the purpose or the use of data. For example, the base station device can specify or set the size (length) and/or the mode of the TTI in a cell-specific manner or a terminal device specific manner. Further, in a case in which the HARQ timing and the scheduling timing are specified or set on the basis of the TTI, the maximum value of the TBS transmitted in the latency and/or one TTI can be adaptively set by changing the size (length) of the TTI. Accordingly, efficient data transmission in which the latency is considered can be performed. Further, in the description of the present embodiment, the sub frame, the symbol, the OFDM symbol, and the SC-FDMA symbol can be interpreted as the TTI.

<Setting Related to TTI in Present Embodiment>

In the present embodiment, sizes of a plurality of TTIs are specified. For example, a plurality of modes (TTI modes) related to the size of the TTI are specified, and the base station device sets the mode in the terminal device through the signaling of the higher layer. The base station device performs data transmission on the basis of the TTI mode set in the terminal device. The terminal device performs data transmission on the basis of the TTI mode set by the base station device. The setting of the TTI mode can be performed individually for each cell (serving cell).

A first TTI mode is a mode in which the TTI is based on the sub frame, and a second TTI mode is a mode in which the TTI is based on the symbol. For example, the TTI illustrated in FIG. 6 is used in the first TTI mode, and the TTI illustrated in FIG. 7 is used in the second TTI mode. Further, for example, in the first TTI mode, the TTI is an integer multiple of the sub frame length, and in the second TTI mode, the TTI is an integer multiple of the symbol length. Further, for example, in the first TTI mode, the TTI is specified through a 1 sub frame used in a system of a related art, and in the second TTI mode, the TTI is specified as an integer multiple of the symbol length which is not used in the system of the related art. Further, the TTI specified or set in the first TTI mode is also referred to as a first TTI, and the TTI specified or set in the second TTI mode is also referred to as a second TTI.

Various methods can be used for setting the TTI mode. In one example of the setting of the TTI mode, the first TTI mode or the second TTI mode is set in the terminal device through the signaling of the higher layer. In a case in which the first TTI mode is set, data transmission is performed on the basis of the first TTI. In a case in which the second TTI mode is set, data transmission is performed on the basis of the second TTI. In another example of the setting of the TTI mode, the second TTI mode (an extended TTI mode or a short TTI (STTI) mode) is set in the terminal device through the signaling of the higher layer. In a case in which the second TTI mode is not set, data transmission is performed on the basis of the first TTI. In a case in which the second TTI mode is set, data transmission is performed on the basis of the second TTI. Further, the second TTI is also referred to as an extended TTI or an STTI.

The setting related to the STTI (STTI setting) is performed through the RRC signaling and/or the signaling of the physical layer. The STTI setting includes information (parameter) related to the TTI size, a setting related to the STTI in the downlink (downlink STTI setting), a setting related to the STTI in the uplink (uplink STTI setting), and/or information for monitoring the control channel for notifying of the control information related to the STTI. The STTI setting can be individually set for each cell (serving cell).

The setting related to the STTI in the downlink is a setting for transmission (transmission and reception) of the downlink channel (the PDSCH, the PDCCH, and/or the EPDCCH) in the STTI mode, and includes a setting related to the downlink channel in the STTI mode. For example, the setting related to the STTI in the downlink includes a setting related to the PDSCH in the STTI mode, a setting related to the PDCCH in the STTI mode, and/or a setting related to the EPDCCH in the STTI mode.

The setting related to the STTI in the uplink is a setting for transmission (transmission and reception) of the uplink channel (the PUSCH and/or the PUCCH) in the STTI mode, and includes a setting related to the uplink channel in the STTI mode. For example, the setting related to the STTI in the uplink includes a setting related to the PUSCH in the STTI mode, and/or a setting related to the PUCCH in the STTI mode.

The information for monitoring the control channel for notifying of the control information related to the STTI is an RNTI used for scrambling the CRC added to the control information (DCI) related to the STTI. The RNTI is also referred to as an STTI-RNTI. Further, the STTI-RNTI may be set in common to the STTI in the downlink and the STTI in the uplink or may be set independently. Further, in a case in which a plurality of STTI settings are set, the STTI-RNTI may be set in common to all the STTI settings or may be independently set.

The information related to the TTI size is information indicating the size of the TTI in the STTI mode (that is, the size of the STTI). For example, the information related to the TTI size includes the number of OFDM symbols for setting the TTI in units of OFDM symbols. Further, in a case in which the information related to the TTI size is not included in the STTI setting, the TTI size can be set to a value which is specified in advance. For example, in a case in which the information related to the TTI size is not included in the STTI setting, the TTI size is a 1 symbol length or a 1 sub frame length. Further, the information related to the TTI size may be set in common to the STTI in the downlink and the STTI in the uplink or may be set independently. Further, in a case in which a plurality of STTI settings are set, the information related to the TTI size may be set in common to all the STTI settings or may be set independently.

In the description of the present embodiment, a channel (STTI channel) in the STTI mode includes a downlink channel in the STTI mode and/or an uplink channel in the STTI mode. A setting related to the channel in the STTI mode (STTI channel setting) includes a setting related to the downlink channel in the STTI mode and/or a setting related to the uplink channel in the STTI mode. The PDCCH in the STTI mode is also referred to as a shortened PDCCH (SPDCCH), a further enhanced PDCCH (FEPDCCH), or a reduced PDCCH (RPDSCH). The PDSCH in the STTI mode is also referred to as a shortened PDSCH (SPDSCH), an enhanced PDSCH (EPDSCH), or a reduced PDSCH (RPDSCH). The PUSCH in the STTI mode is also referred to as a shortened PUSCH (SPUSCH), an enhanced PUSCH (EPUSCH), or a reduced PUSCH (RPUSCH). The PUCCH in the STTI mode is also referred to as a shortened PUCCH (SPUCCH), an enhanced PUCCH (EPUCCH), or a reduced PUCCH (RPUCCH). The STTI channel includes the SPDSCH, the SPUSCH, or the SPUCCH. The STTI channel setting includes an SPDSCH setting, an SPUSCH setting, or an SPUCCH setting. The STTI channel includes the SPDCCH, the SPDSCH, the SPUSCH, or the SPUCCH. The STTI channel setting includes an SPDCCH setting (second PDCCH setting), an SPDSCH setting (second PDSCH setting), an SPUSCH setting (second PUSCH setting), or an SPUCCH setting (second PUCCH setting).

In the present embodiment, data transmission and scheduling methods for the channels in the STTI mode can use various methods or schemes. For example, the channel in the STTI mode is mapped to some or all of one or more periodic resources that are set or notified through the signaling of the higher layer and/or the signaling of the physical layer.

In the present embodiment, the physical downlink control channel in the first TTI mode is also referred to as a PDCCH or a first PDCCH, and the physical downlink control channel in the second TTI mode is also referred to as an SPDCCH or a second PDCCH.

In the present embodiment, the physical downlink shared channel in the first TTI mode is also referred to as a PDSCH or a first PDSCH, and the physical downlink shared channel in the second TTI mode is also referred to as an SPDSCH or a second PDSCH.

In the present embodiment, the physical uplink control channel in the first TTI mode is also referred to as a PUCCH or a first PUCCH, and the physical uplink control channel in the second TTI mode is also referred to as an SPUCCH or a second PUCCH.

In the present embodiment, the physical uplink shared channel in the first TTI mode is also referred to as a PUSCH or a first PUSCH, and the physical uplink shared channel in the second TTI mode is also referred to as an SPUSCH or a second PUSCH.

The channel in the STTI mode is mapped on the basis of the sub resource block. The sub resource block is used to indicate mapping of a predetermined channel in the STTI mode to the resource element. One sub resource block is defined by successive sub carriers corresponding to one TTI in the time domain and consecutive sub carriers corresponding to one resource block in the frequency domain. A certain sub resource block may be configured to be included in only one resource block or may be configured over two resource blocks. Further, a certain sub resource block may be configured over two resource blocks in one resource block pair or may not be configured over a plurality of resource block pairs.

The channel in the STTI mode is transmitted and received on the basis of the extended sub frame. The extended sub frame is specified or set in accordance with the TTI length in the STTI mode. For example, in a case in which the TTI length is 2 symbols, the extended sub frame is specified or set to be 2 symbols. The extended sub frame length is a time length of the sub resource block. The extended sub frame is specified or set in accordance with a smaller number of symbols than the number of symbols corresponding to the sub frame. The extended sub frame is also referred to as a sub frame or a short sub frame.

Each of the transport blocks (codeword) of the channel in the STTI mode is transmitted using one or more sub resource blocks in the same TTI.

Resources (sub resource block) to which the channel (the STTI channel) in the STTI mode can be mapped through signaling of the higher layer and/or signaling of the physical layer are set in the terminal device. The resources to which the channel in the STTI mode can be mapped is also referred to as an STTI channel candidate. Further, a series of STTI channel candidates set by one STTI channel setting is also referred to as a set of STTI channel candidates.

A set of the STTI channel candidates is designated by a TTI of a predetermined period in the time domain and a predetermined sub resource block in the frequency domain. In the same the STTI channel, a plurality of STTI channel settings can be performed. In other words, in each set of the STTI channel candidates, the period in the time domain and/or the resources in the frequency domain can be set independently. In a case in which a plurality of STTI channel settings are performed, the terminal device can monitor the set of a plurality of STTI channel candidates which is set.

The STTI channel setting includes STTI channel setting information in the time domain, STTI channel setting information in the frequency domain, and/or information related to the HARQ-ACK for the STTI channel. Further, the STTI channel setting may further include information for monitoring the control channel for notifying of the information related to the TTI size and/or the control information related to the STTI channel. The STTI channel setting information in the time domain is information for deciding the resources of the STTI channel candidate in the time domain. The STTI channel setting information in the frequency domain is information for deciding the resources of the STTI channel candidate in the frequency domain.

The information for deciding the resources of the STTI channel candidate can use various formats. The resources of the STTI channel in the frequency domain are decided (set, specified, or designated) in units of resource blocks or in units of sub resource blocks.

An example of the STTI channel setting information in the time domain includes a predetermined number of TTI periods and a predetermined number of TTI offsets. The offset of the TTI is an offset (shift) from a TTI serving as a reference and is set in units of TTIs. For example, in a case in which the offset of the TTI is 3, the set of the STTI channel candidates is set by including a TTI obtained by offsetting 3 TTIs from the TTI serving as the reference. For example, in a case in which the period of the TTI is 3, the set of the STTI channel candidate is set at intervals of every two TTIs. In a case in which the period of the TTI is 1, all consecutive TTIs are set.

In another example of the STTI channel setting information in the time domain, bitmap information indicating the TTI of the STTI channel candidate is used. For example, one bit in the bitmap information corresponds to a predetermined number of sub frames or each of TTIs in a predetermined number of radio frames. In a case in which a certain bit in the bitmap information is 1, it indicates that the TTI corresponding to the bit is a TTI including the STTI channel candidate. In a case in which a certain bit in the bitmap information is 0, it indicates that the TTI corresponding to the bit is not a TTI including the STTI channel candidate. Specifically, in a case in which the TTI size is one sub frame, the number of TTIs in five sub frames is 70. In this case, the bitmap information is 70-bit information. The bitmap information is applied from the TTI serving as the reference and repeatedly applied for each TTI corresponding to the bitmap information.

An example of the STTI channel setting information in the frequency domain uses bitmap information indicating sub resource blocks of the STTI channel candidate or a set of sub resource blocks. For example, one bit in the bitmap information corresponds to each of a predetermined number of sets of sub resource blocks. In a case in which a certain bit in the bitmap information is 1, it indicates that the sub resource block included in the set of sub resource blocks corresponding to the bit is a sub resource block including the STTI channel candidate. In a case in which a certain bit in the bitmap information is 0, it indicates that the sub resource block included in the set of sub resource blocks corresponding to the bit is not a sub resource block including the STTI channel candidate.

Another example of the STTI channel setting information in the frequency domain uses a sub resource block serving as a start and the number of consecutively allocated sub resource blocks.

The set of sub resource blocks is constituted by a predetermined number of consecutive sub resource blocks in the frequency domain. The predetermined number of sub resource blocks constituting the set of sub resource blocks may be decided on the basis of other parameters such as the system bandwidth or may be set through the RRC signaling. In the description of the present embodiment, the set of sub resource blocks simply includes the sub resource block as well.

The sub resource block set by the STTI channel setting information in the frequency domain may be identical in all the TTIs or may be switched (hopped) at intervals of every predetermined number of TTIs. For example, the sub resource block of the STTI channel candidate in a certain TTI is decided further using a number (an index or information) indicating the TTI, and the sub resource block of the STTI channel candidate is set differently for each TTI. Accordingly, the frequency diversity effect can be expected.

The information related to the HARQ-ACK for the STTI channel includes information related to resources for reporting the HARQ-ACK for the STTI channel. For example, in a case in which the STTI channel is the SPDSCH, information related to the HARQ-ACK for the STTI channel explicitly or implicitly indicates resources in the uplink channel for reporting the HARQ-ACK for the SPDSCH.

In a case in which a plurality of STTI channel settings are set for the same the STTI channel, all parameters in the STTI channel setting may be independently set, or some parameters may be set in common. For example, in a plurality of STTI channel settings, the STTI channel setting information in the time domain and the STTI channel setting information in the frequency domain are set independently. For example, in a plurality of STTI channel settings, the STTI channel setting information in the time domain is set in common, and the STTI channel setting information in the frequency domain is set independently. For example, in a plurality of STTI channel settings, the STTI channel setting information in the time domain is set independently, and the STTI channel setting information in the frequency domain is set in common. Further, only some pieces of information may be set in common, and the period of the TTI included in the STTI channel setting information in the time domain may be set in common.

Some pieces of information or some parameters set by the STTI setting in the present embodiment may be notified through signaling of the physical layer. For example, the STTI channel setting information in the frequency domain is notified through signaling of the physical layer.

In one example of an operation of the terminal device in the STTI mode, the terminal device operates only through signaling of the higher layer (the RRC signaling) only. In a case in which the STTI channel setting is set through signaling of the higher layer, the terminal device starts monitoring or receiving of the corresponding STTI channel. The terminal device stops monitoring or receiving of the corresponding STTI channel in a case in which the STTI channel setting being set is released through signaling of the higher layer.

In another example of the operation of the terminal device in the STTI mode, the terminal device operates through signaling of the higher layer (the RRC signaling) and signaling of the physical layer. In a case in which the STTI channel setting is set through signaling of the higher layer, and the information (DCI) for activating scheduling of the corresponding STTI channel is notified through signaling of the physical layer, the terminal device starts monitoring or receiving of the corresponding STTI channel. In a case in which the STTI channel setting is set through signaling of the higher layer. and information (DCI) for releasing scheduling of the corresponding STTI channel is notified through signaling of the physical layer, the terminal device stops monitoring or receiving of the corresponding STTI channel.

In a case in which a plurality of STTI channel settings are set, the information for enabling the scheduling of the STTI channel or the information for releasing the scheduling of the STTI channel may be notified in common to the STTI channels or independently.

In a case in which a plurality of STTI channel settings are set, and the STTI channel candidates which are set differently collide at the same TTI (that is, in a case in which a plurality of STTI channel candidates are set within the same TTI), the terminal device may monitor all of the STTI channel candidate or may monitor some of the STTI channel candidates. In a case in which some of the STTI channel candidates are monitored, the terminal device may decide the STTI channel candidate to be monitored on the basis of a predetermined priority. For example, the predetermined priority is decided on the basis of a type of STTI channel, an index (number) indicating the STTI channel setting, and/or an element (parameter) including a capability of the terminal device.

<Details of SPDCCH Set in Present Embodiment>

Figure 8:
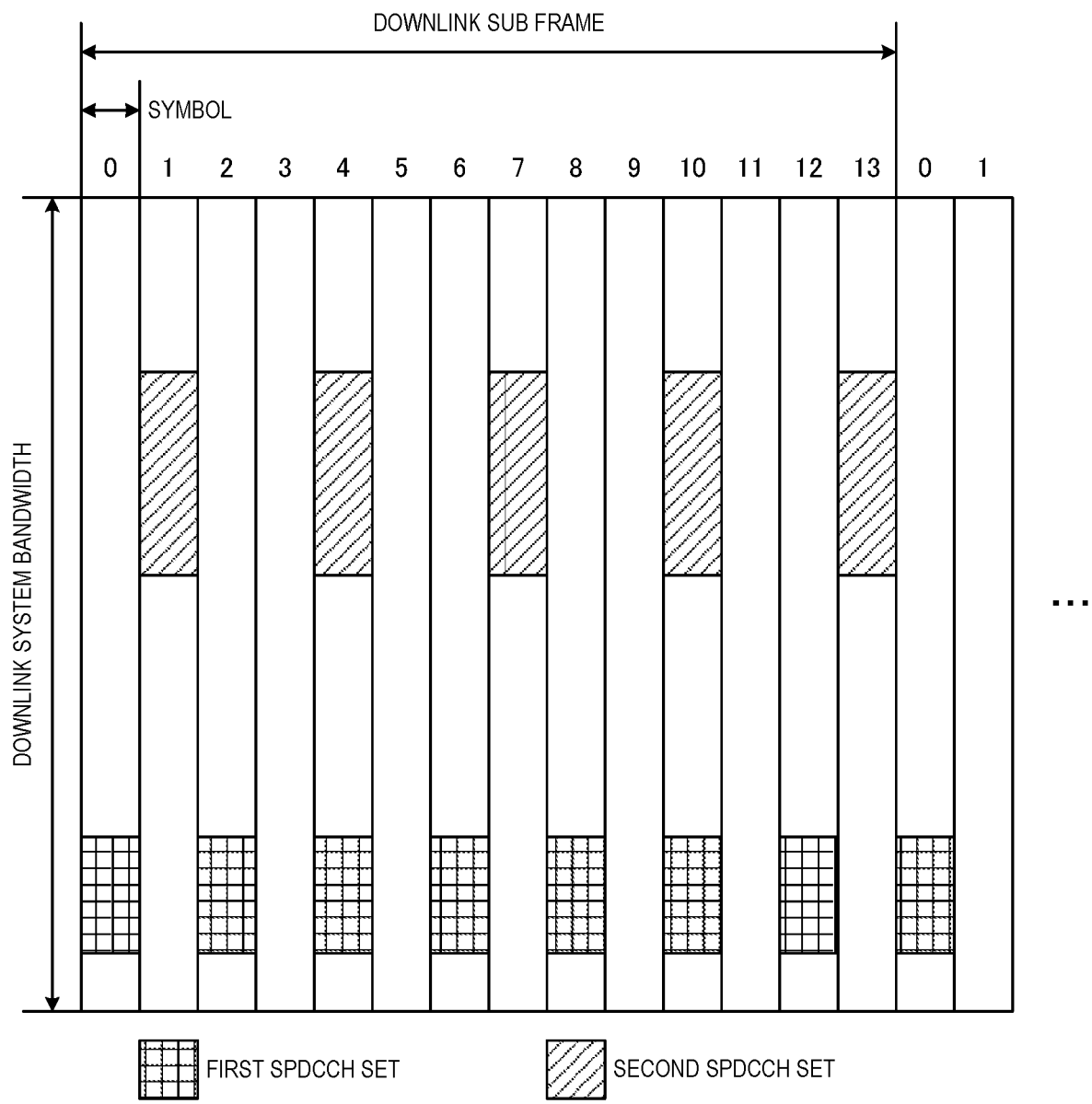
FIG. 8 is a diagram illustrating an example of a set of SPDSCH candidates.

FIG. 8 is a diagram illustrating an example of a set of SPDCCH candidates. In the example of FIG. 8, a first SPDCCH set (a first set of SPDCCH candidates) and a second SPDCCH set (a second set of SPDCCH candidates) are set in the terminal device by the base station device. The TTI size is 1 symbol. In the first set of SPDCCH candidates, the period of the TTI is 2, and the offset of the TTI is 0. However, the TTI serving as the reference in the offset of the TTI is a first symbol 0 in FIG. 8. In the second set of the SPDCCH candidate, the period of the TTI is 3, and the offset of the TTI is 1. The SPDCCH candidate is also referred to as a second PDCCH candidate. Further, the SPDCCH candidate may be specified to be set in all the TTIs in advance. In this case, the cycle and the offset of the TTI may not be set.

The base station device maps the SPDCCH for the terminal device to one of the SPDCCH candidates set in the terminal device and transmits resulting data. The terminal device monitors the SPDCCH candidate set in the base station device and detects the SPDCCH for the terminal device.

An example of a method of deciding whether or not the SPDCCH detected in a certain terminal device is addressed to the terminal device, and reception is performed correctly is a method of using an RNTI specific to the terminal device (for example, the STTI-RNTI). For example, each codeword (transport block) to which a predetermined CRC is added is scrambled using the RNTI specific to the terminal device and transmitted. Therefore, in a case in which the terminal device receives the SPDCCH, since each codeword is descrambled correctly, the terminal device can determine that the SPDCCH is addressed to the terminal device on the basis of the added CRC. On the other hand, in a case in which a terminal device different from the terminal device receives the SPDCCH, since each codeword is not descrambled correctly, another the terminal device can determine that the SPDCCH is not addressed to itself on the basis of the added CRC.

Another example of a method of deciding whether or not the SPDCCH detected in a certain terminal device is addressed to the terminal device, and reception is performed correctly is a method of including information indicating that the SPDCCH for the certain terminal device is addressed to the terminal device. For example, the SPDCCH for a certain terminal device contains an RNTI specific to the terminal device. For example, the CRC in the SPDCCH for a certain terminal device is scrambled using an RNTI specific to the terminal device.

The SPDCCH is used to transmit the DCI. The DCI transmitted through the SPDCCH is used for the scheduling of the SPDSCH. The SPDCCH transmitted in a certain TTI can schedule the SPDSCH in the TTI. Further, the SPDCCH transmitted in a certain TTI can schedule the SPDSCH in a TTI different from the TTI. For example, the SPDCCH transmitted in a certain TTI can schedule the SPDSCH in an x-th TTI from the TTI. Here, "x" is a value which is specified in advance or a value set through the RRC signaling. Further, the SPDCCH transmitted in a certain TTI can schedule a plurality of SPDSCHs in a predetermined number of TTIs after the TTI. For example, the SPDCCH transmitted in a certain TTI can schedule a plurality of SPDSCHs in y TTIs after the TTI. Here, "y" is a value which is specified in advance or a value set through the RRC signaling.

The SPDCCH candidate can be set as the SPDCCH set through the RRC signaling. The SPDCCH set corresponds to the STTI setting for the SPDCCH. The SPDCCH set is also referred to as an SPDCCH-PRB set. The SPDCCH set is set to be specific to the terminal device, but the same setting can be performed in a plurality of terminal devices. A plurality of SPDCCH sets can be set in one the terminal device.

The SPDCCH set can be set in units of resource block pairs. The number of resource block pairs set as the SPDCCH set is set from among a plurality of types which are specified in advance. In a case in which a plurality of TTI lengths can be set, the types of the number of resource block pairs set as the SPDCCH set may be decided depending on the TTI length. For example, in a case in which the TTI length is 14 symbols, the number of settable resource block pairs is 2, 4, or 8. In a case in which the TTI length is 7 symbols, the number of settable resource block pairs is 4, 8, or 16. In a case in which the TTI length is 2 symbols, the number of settable resource block pairs is 4, 8, 16, or 32.

A plurality of SPDCCH candidates are set in each of the TTIs within the resource block pair set by the SPDCCH set. A plurality of SPDCCH candidates are also referred to as an SPDCCH search space. The number of SPDCCH candidates in each TTI is specified or set for each aggregation level. In a case in which a plurality of TTI lengths can be set, the number of SPDCCH candidates in each TTI may be decided depending on the TTI length.

<Monitoring of SPDCCH in Present Embodiment>

A USS and/or a CSS is specified or set in the SPDCCH set. Further, only the USS may be specified or set in the SPDCCH set. In other words, the CSS is not specified or set in the SPDCCH set.

Various methods can be used as the method of monitoring the terminal device in a case in which the SPDCCH set is set in the terminal device. As an example of the monitoring method, in a case in which the SPDCCH set is set in a certain terminal device, the terminal device monitors the USS of the SPDCCH and the CSS of the PDCCH. The terminal device does not monitor the USS of the PDCCH. Further, even in a case in which the SPDCCH set is set in the terminal device, the terminal device monitors the USS of the PDCCH in the sub frame in which the terminal device does not monitor the USS of the SPDCCH.

As another example of the monitoring method, in a case in which the SPDCCH set is set in a certain terminal device, the terminal device monitors the USS of the SPDCCH and the CSS of the SPDCCH. The terminal device does not monitor the CSS of the PDCCH and the USS of the PDCCH. Further, even in a case in which the SPDCCH set is set in the terminal device, in a sub frame in which the terminal device does not monitor the USS of SPDCCH and/or the CSS of the SPDCCH, the terminal device monitors the CSS of the PDCCH and/or the USS of the PDCCH.

As another example of the monitoring method, in a case in which the SPDCCH set is set in a certain terminal device, the terminal device monitors the CSS and/or the USS of the SPDCCH and the CSS and/or the USS of the PDCCH. Further, in a case in which the SPDCCH is detected in a certain sub frame or in a case in which the SPDSCH is scheduled in a certain sub frame, the terminal device assumes that the PDSCH is not scheduled in the sub frame. In other words, in this case, the terminal device assumes that the PDCCH is not detected in the sub frame. In a case in which the PDCCH is detected, the PDCCH may be ignored. Further, in this case, only the CSS of the PDCCH may be monitored.

As another example of the monitoring method, in a case in which the SPDCCH set is set in a certain terminal device, the terminal device monitors the CSS and/or the USS of the SPDCCH and the CSS and/or the USS of the PDCCH. Further, in a case in which the SPDCCH is detected in a certain sub frame or in a case in which the SPDSCH is scheduled in a certain sub frame, the terminal device assumes that the PDSCH can be scheduled in the sub frame. In other words, even in this case, the terminal device schedules the PDCCH in the sub frame.

As another example of the monitoring method, in a case in which the SPDCCH set is set in a certain terminal device, the terminal device monitors the CSS and/or the USS of the SPDCCH and the CSS and/or the USS of the PDCCH. Further, in a case in which the PDCCH or the EPDCCH is detected in a certain sub frame or in a case in which the SPDSCH is scheduled in a certain sub frame, the terminal device assumes that the SPDSCH is not scheduled in the sub frame. In other words, in this case, the terminal device assumes that the SPDCCH is not detected in the sub frame. In a case in which the SPDCCH is detected, the SPDCCH may be ignored. Further, in this case, only the CSS of the SPDCCH may be monitored.

As another example of the monitoring method, in a case in which the SPDCCH set is set in a certain terminal device, the terminal device monitors the CSS and/or the USS of the SPDCCH and the CSS and/or the USS of the PDCCH. Further, in a case in which the PDCCH or the EPDCCH is detected in a certain sub frame or in a case in which the SPDSCH is scheduled in a certain sub frame, the terminal device assumes that the SPDSCH can be scheduled in the sub frame. In other words, even in this case, the terminal device schedules the SPDCCH in the sub frame.

In the same sub frame, in a case in which both SPDSCH and PDSCH are scheduled for the terminal device, the terminal device assumes that the PDSCH is not mapped to the RB pair including the resource element to which the SPDSCH is mapped.

In a case in which both the SPDSCH and the PDSCH are scheduled in the same sub frame for the terminal device, in the terminal device, the PDSCH can be mapped even to the RB pair including the resource element to which the SPDSCH is mapped, but in the PDSCH, puncturing or rate matching is performed on the resource element to which the SPDSCH is mapped.

In the same sub frame, in a case in which both SPDSCH and PDSCH are scheduled for the terminal device, the terminal device assumes that the SPDSCH is not mapped to the RB pair including the resource element to which the SPDSCH is mapped.

The monitoring method may be decided in accordance with a cell in which the SPDCCH set is set. For example, in a case in which the SPDCCH set is set in the PCell, the terminal device monitors the CSS of the SPDCCH and the USS of the SPDCCH in the cell. In a case in which the SPDCCH set is set in the PSCell, the terminal device monitors the CSS of SPDCCH and the USS of SPDCCH in the cell. In a case in which the SPDCCH set is set in the SCell, the terminal device monitors the CSS of the PDCCH and the USS of the SPDCCH in the cell.

In a case in which the terminal device monitors both the PDCCH and the SPDCCH in a certain sub frame, the PDCCH may schedule the SPDSCH under predetermined conditions. For example, in a case in which the TTI of the resources to which the SPDSCH is mapped is included in the PDCCH region, the PDCCH in the PDCCH region can schedule the SPDSCH. Further, for example, in a case in which the TTI of the resources to which the SPDSCH is mapped is the TTI immediately after the PDCCH region, the PDCCH in the PDCCH region can schedule the SPDSCH.

In a case in which the PDCCH can schedule the SPDSCH, the terminal device may further monitor the SPDCCH in the TTI of the resources to which the SPDSCH is mapped. For example, regardless of whether or not the PDCCH schedules the SPDSCH, the terminal device monitors the SPDCCH in the TTI of the resources to which the SPDSCH is mapped. Further, for example, in a case in which the PDCCH schedules the SPDSCH, the terminal device does not monitor the SPDCCH in the TTI of the resources to which the SPDSCH is mapped. Further, for example, in a case in which the PDCCH does not schedule the SPDSCH, the terminal device monitors the SPDCCH in the TTI of the resources to which the SPDSCH is mapped. Further, for example, the terminal device also assumes that the SPDSCH scheduled by the PDCCH and the SPDSCH scheduled by the SPDCCH are not scheduled at the same time in a certain TTI.

Further, it may be decided whether or not the PDCCH can schedule the SPDSCH on the basis of the capability information of the terminal device. In other words, the terminal device notifies the base station device of the capability information indicating whether or not the SPDSCH can be scheduled by the PDCCH. The terminal device sets whether or not the SPDSCH can be scheduled by PDCCH through the RRC signaling.

In other words, it may be decided whether or not a control channel of a first TTI length can schedule a shared channel of a second TTI length on the basis of the capability information of the terminal device. In other words, the terminal device notifies the base station device of the capability information indicating whether or not the shared channel of the second TTI length can be scheduled in accordance with the control channel of the first TTI length. The terminal device sets whether or not the shared channel of the second TTI length can be scheduled in accordance with the control channel of the first TTI length through the RRC signaling.

The EPDCCH set may be able to be set in the terminal device in which the SPDCCH set can be set. In other words, in a case in which a certain terminal device supports reception of the SPDCCH, the terminal device also supports reception of the EPDCCH. Further, various methods can be used for setting for the terminal device in which the SPDCCH set and the EPDCCH set can be set. As an example of the setting, any one of the SPDCCH set and the EPDCCH set is set in the terminal device in which the SPDCCH set and the EPDCCH set can be set. In other words, the SPDCCH set and the EPDCCH set are not set in the same time.

As another example of the setting, both the SPDCCH set and the EPDCCH set can be set in the terminal device in which the SPDCCH set and the EPDCCH set can be set, but monitoring in the same sub frame is not set. In other words, the terminal device does not monitor both the SPDCCH and the EPDCCH in a certain sub frame.

As another example of the setting, both the SPDCCH set and the EPDCCH set are set in the terminal device in which the SPDCCH set and the EPDCCH set can be set, but in a case in which both the SPDCCH and the EPDCCH are monitored in the same sub frame, the number of SPDCCH candidates and/or the number of EPDCCH candidates is reduced as compared with the case in which only one of the SPDCCH or the EPDCCH is monitored.

The RNTI used for monitoring the SPDCCH may be set independently of the RNTI used for monitoring the PDCCH. The RNTI used for monitoring the SPDCCH can be set on the basis of a parameters included in the SPDCCH setting. In other words, the RNTI used for scrambling the CRC added to the DCI included in the SPDCCH may be set independently of the RNTI used for scrambling the CRC added to the DCI included in the PDCCH.

Figure 9:
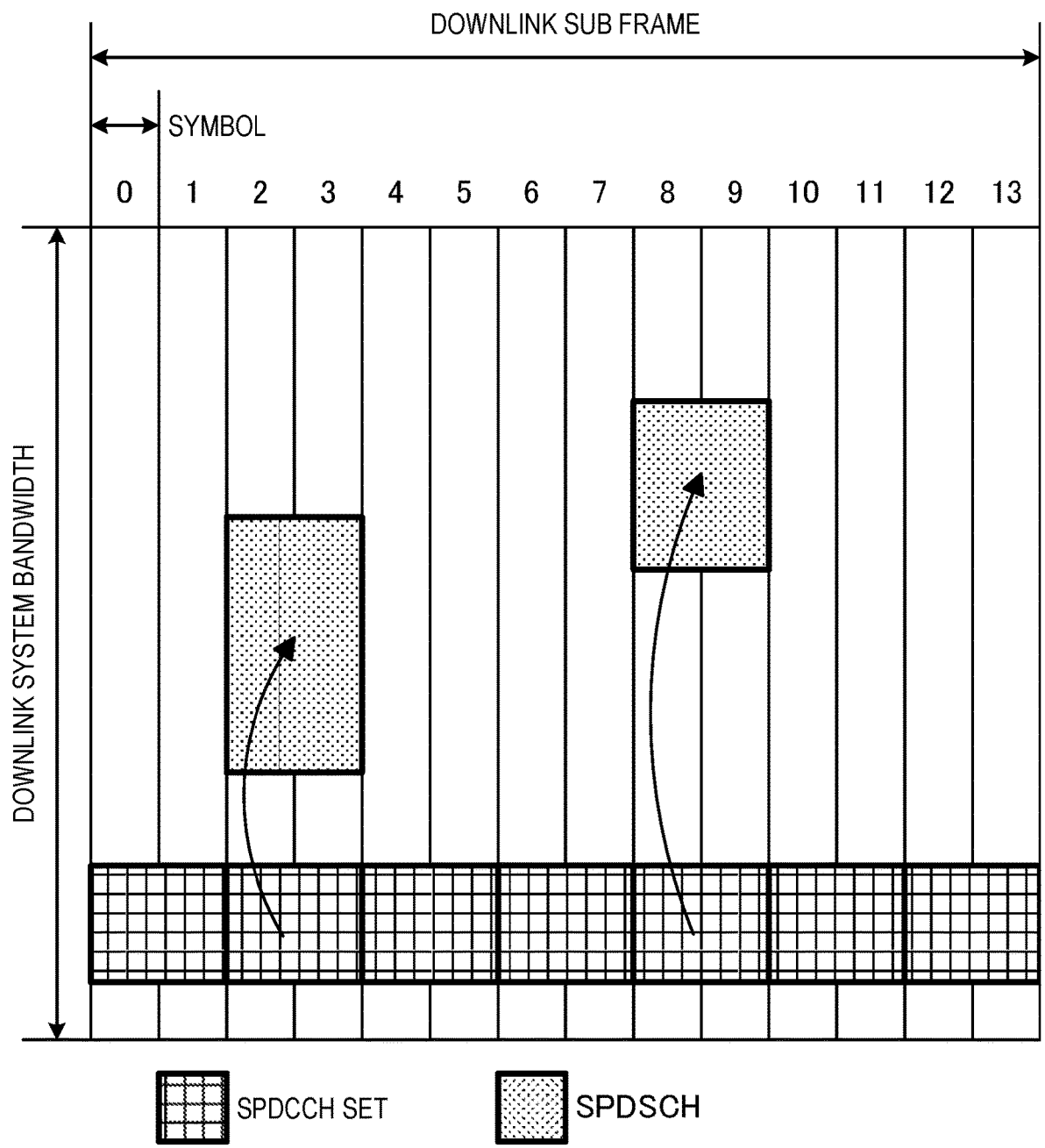
FIG. 9 is a diagram illustrating an example of an SPDCCH set and an SPDSCH in the present embodiment.

FIG. 9 is a diagram illustrating an example of the SPDCCH set and the SPDSCH in the present embodiment. In FIG. 9, the size of the TTI in the SPDCCH and the SPDSCH is a two-symbol length. The SPDCCH set is set in a predetermined resource block pair in the terminal device by the base station device. The terminal device monitors the SPDCCH candidate in the set SPDCCH set and searches for the SPDCCH addressed to the terminal device. In a case in which the terminal device detects the SPDCCH addressed to the terminal device, the terminal device receives the SPDSCH scheduled through the DCI included in the SPDCCH. FIG. 9 illustrates an example in which the SPDCCH and the SPDSCH addressed to the terminal device are received in a TTI constituted by symbols #2 and 3 and a TTI constituted by symbols #8 and 9.

Figure 10:
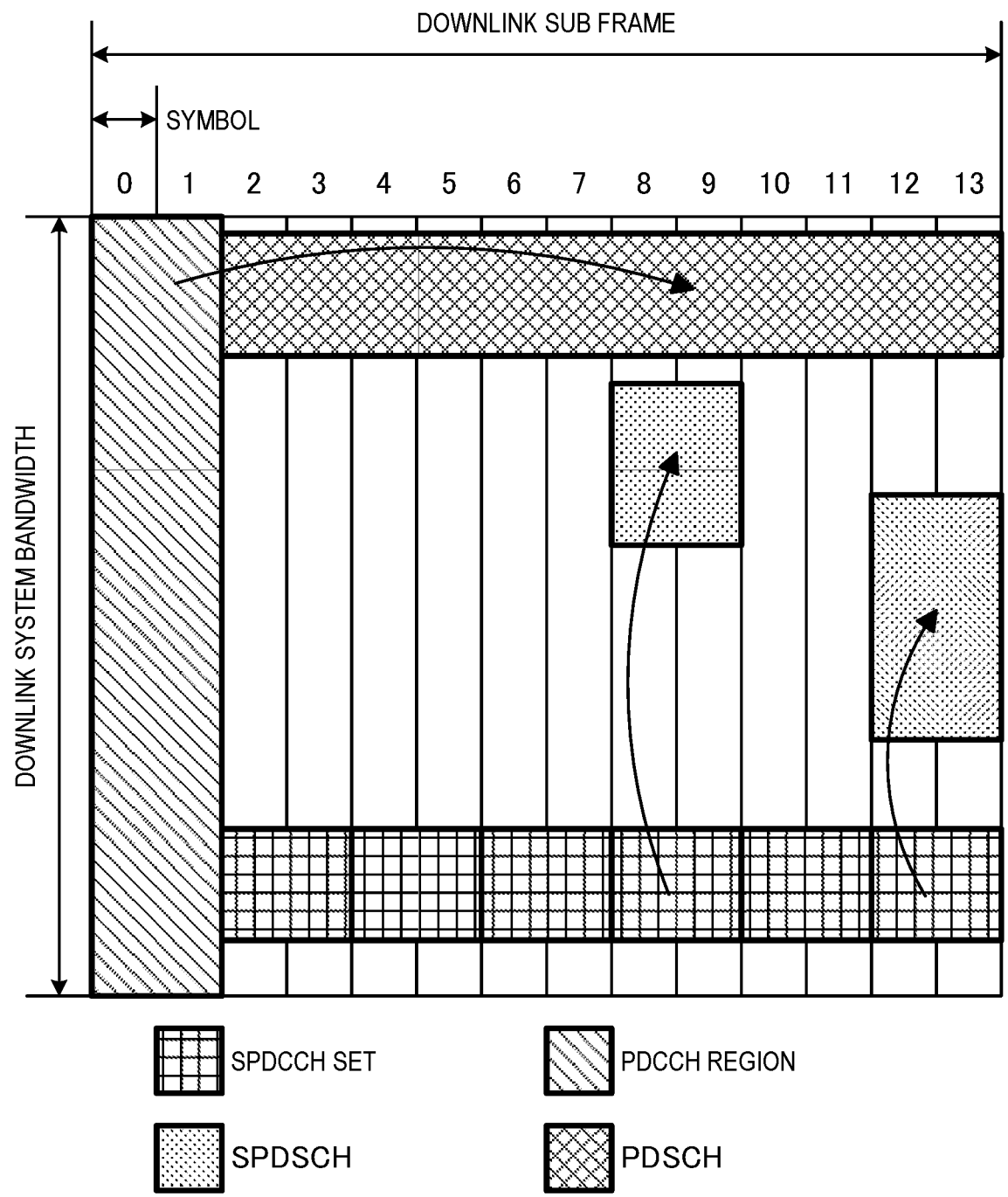
FIG. 10 is a diagram illustrating an example of an SPDCCH set, an SPDSCH, a PDCCH region, and a PDSCH in the present embodiment.

FIG. 10 is a diagram illustrating an example of the SPDCCH set, the SPDSCH, the PDCCH region, and the PDSCH in the present embodiment. In FIG. 10, the size of the TTI in the SPDCCH and the SPDSCH is a two-symbol length. The SPDCCH set is set in a predetermined resource block pair in the terminal device by the base station device. The terminal device monitors the SPDCCH candidate in the set SPDCCH set and searches for the SPDCCH addressed to the terminal device. In a case in which the terminal device detects the SPDCCH addressed to the terminal device, the terminal device receives the SPDSCH scheduled through the DCI included in the SPDCCH. FIG. 9 illustrates an example in which the SPDCCH and the SPDSCH addressed to the terminal device are received in a TTI constituted by symbols #8 and 9 and a TTI constituted by symbols #12 and 13. Further, FIG. 10 illustrates an example in which the PDCCH in the PDCCH region schedules the PDSCH.

A part of the monitoring of the SPDCCH described in the present embodiment can be paraphrased as follows.

The terminal device that communicates with the base station device includes a higher layer processing unit that performs one or more second PDCCH settings through signaling of the higher layer from the base station device and a receiving unit that monitors only a common search space and a terminal device-specific search space in the first PDCCH in a case in which the second PDCCH setting is not performed and monitors the terminal device-specific search space in at least the second PDCCH in a case in which the second PDCCH setting is performed. The first PDCCH is transmitted on the basis of the sub frame defined in accordance with a predetermined number of symbols. The second PDCCH is transmitted on the basis of the extended sub frame of a smaller number of symbols than the number of symbols corresponding to the sub frame and the resource block set through the second PDCCH setting.

The receiving unit of the terminal device does not monitor the terminal device-specific search space in the first PDCCH in a case in which the second PDCCH setting is performed. The receiving unit of the terminal device further monitors the common search space in the first PDCCH in a case in which the second PDCCH setting is performed. The receiving unit of the terminal device further monitors the common search space in the second PDCCH in a case in which the second PDCCH setting is performed.

A combination of settable values of the resource block used for transmission of the second PDCCH is decided on the basis of the number of symbols of the extended sub frame set through the second PDCCH setting. A minimum value included in the combinations of the settable values increases as the number of symbols of the extended sub frame decreases. A minimum value included in the combinations of the settable values decreases as the number of symbols of the extended sub frame increases. A maximum value included in the combinations of the settable values increases as the number of symbols of the extended sub frame decreases. A maximum value included in the combinations of the settable values decreases as the number of symbols of the extended sub frame increases.

The base station device that communicates with the terminal device includes a higher layer processing unit that performs one or more second PDCCH settings through the signaling of the higher layer in the terminal device and a transmitting unit that maps a first PDCCH to the common search space or the terminal device-specific search space in the first PDCCH and transmits the resulting PDCCH in a case in which the second PDCCH setting is not set, and maps the second PDCCH to the terminal device-specific search space in at least the second PDCCH and transmitting the resulting PDCCH in a case in which the second PDCCH setting is performed. The first PDCCH is transmitted on the basis of a sub frame defined by a predetermined number of symbols. The second PDCCH is transmitted on the basis of the extended sub frame of a smaller number of symbols than the number of symbols corresponding to the sub frame and the resource block set through the second PDCCH setting.

The terminal device that communicates with the base station device includes a receiving unit that monitors a first PDCCH transmitted on the basis of the sub frame defined by a predetermined number of symbols and a second PDCCH transmitted on the basis of the extended sub frame of a smaller number of symbols than the number of symbols corresponding to the sub frame and the resource block set through the second PDCCH setting. The first PDSCH allocated by the first PDCCH is mapped on the basis of the resource block pair corresponding to the number of symbols of the sub frame. The second PDSCH allocated by the second PDCCH is mapped on the basis of the sub resource block corresponding to the number of symbols of the extended sub frame.

In a case in which the first PDCCH is detected in a predetermined sub frame, the second PDCCH is not detected in the predetermined sub frame. In a case in which a first PDCCH is detected in a predetermined sub frame, the receiving unit monitors only the common search space in the second PDCCH. In a case in which the first PDSCH and the second PDSCH are allocated in a predetermined sub frame, the first PDSCH is mapped except for the resource block including the sub resource block used for the transmission of the second PDSCH.

In a case in which the first PDSCH and the second PDSCH are allocated in a predetermined sub frame, the first PDSCH is allocated except for the resource element included in the sub resource block used for the transmission of the second PDSCH in the resource block including the sub resource block used for the transmission of the second PDSCH.

In a case in which the second PDCCH is detected in a predetermined sub frame, the first PDCCH is not detected in the predetermined sub frame. In a case in which a second PDCCH is detected in a predetermined sub frame, the receiving unit monitors only the common search space in the first PDCCH.

In a case in which the first PDSCH and the second PDSCH are allocated in a predetermined sub frame, the second PDSCH is mapped on the basis of the sub resource block not included in the resource block used for transmission of the first PDSCH.

The base station device that communicates with the terminal device includes a transmitting unit that transmits a first PDCCH transmitted on the basis of the sub frame defined by a predetermined number of symbols and a second PDCCH transmitted on the basis of the extended sub frame of a smaller number of symbols than the number of symbols corresponding to the sub frame and the resource block set through the second PDCCH setting. The first PDSCH allocated by the first PDCCH is mapped on the basis of the resource block pair corresponding to the number of symbols of the sub frame. The second PDSCH allocated by the second PDCCH is mapped on the basis of the sub resource block corresponding to the number of symbols of the extended sub frame.

<Details of Resource Element Mapping of SPDCCH and Demodulation Reference Signal Associated with SPDCCH in Present Embodiment>

In the SPDCCH, resource element mapping is performed on the basis of a group of predetermined resource elements.

The search space of each aggregation level is defined by a set of SPDCCH candidates. Each SPDCCH is transmitted using one or more shortened control channel element (SCCE) sets. The number of SCCEs used in one SPDCCH is also referred to as an aggregation level. For example, the number of ECCEs used in one EPDCCH is 1, 2, 4, 8, 16, or 32. Further, a combination of the number of SCCEs used for one SPDCCH may be specified depending on the TTI length for the SPDSCH. Here, the SCCE is a control channel element used for transmitting the SPDCCH. The SCCE is also referred to as enhanced control channel element (FECCE).

The number of SPDCCH candidates is decided on the basis of at least the TTI length, the search space, and/or the aggregation level. For example, in the CSS, the number of PDCCH candidates in the aggregation levels 4 and 8 are 4 and 2, respectively. For example, in the USS, the number of PDCCH candidates in the aggregation 1, 2, 4, and 8 are 6, 6, 2, and 2, respectively.

Each SCCE includes a plurality of shortened resource element groups (SREGs). An SREG is used to define mapping to the resource element of the SPDCCH. The SREGs are also referred to as further enhanced resource element groups (FEREGs).

Figure 11:
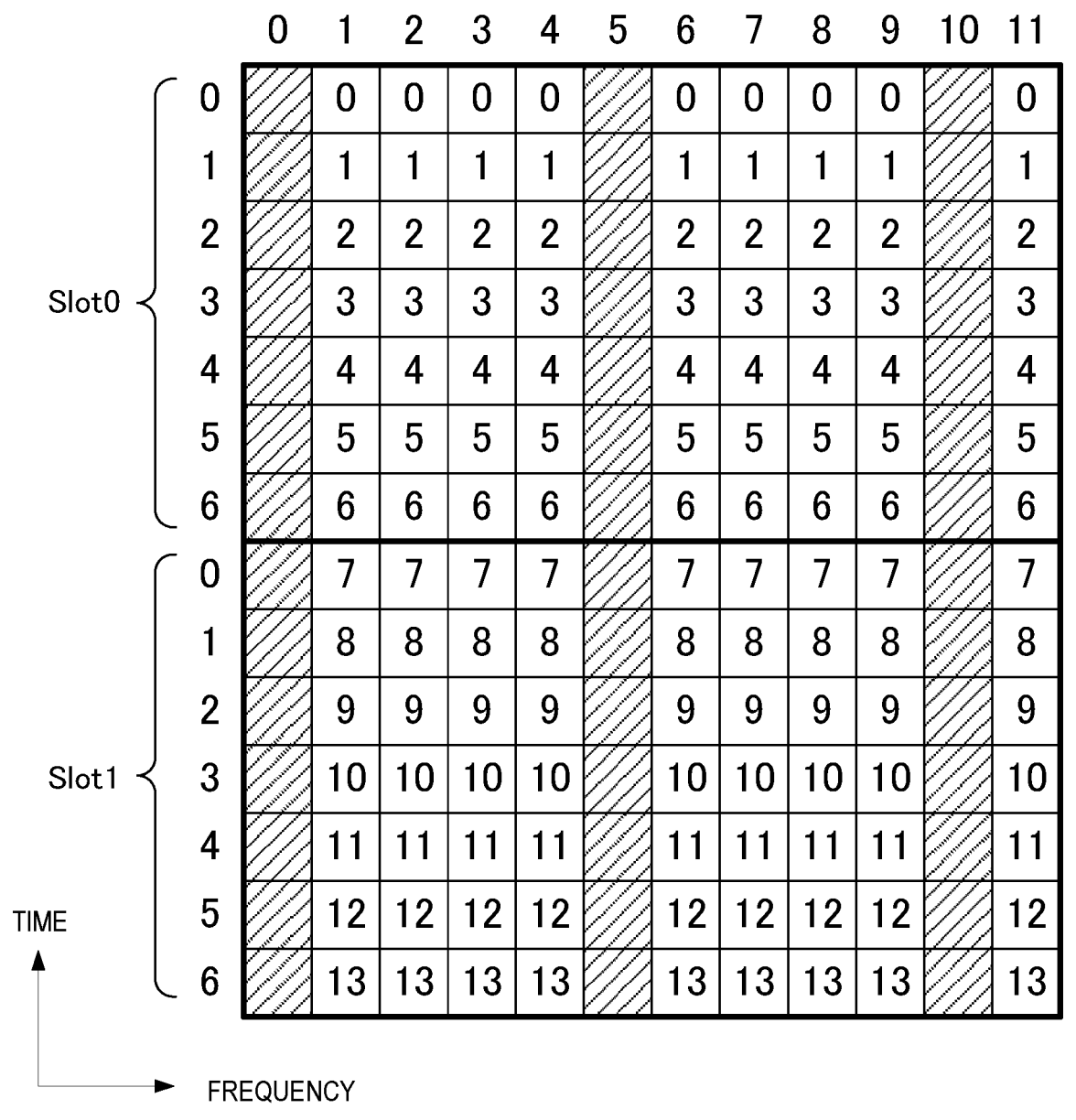

FIG. 11 is a diagram illustrating an example of a configuration of the SREG in the present embodiment. 14 EREGs which are assigned numbers of 0 to 13 are defined in each RB pair. In other words, an SREG 0 to an SREG 13 are defined in each RB pair. In each RB pair, the SREG 0 to the SREG 13 are sequentially defined for each symbol for resource elements other than resource elements to which a predetermined signal and/or channel is mapped. For example, the SREG is not defined for the resource element to which the demodulation reference signal associated with SPDCCH is mapped.

For example, the demodulation reference signal (SPDCCH-DMRS) associated with the SPDCCH is mapped to the resource element of a predetermined sub carrier (sub carriers #0, 5, and 10) in each RB pair. A predetermined sub carrier may be the same sub carrier as the demodulation reference signal (EPDCCH-DMRS) associated with the EPDCCH. In the example of FIG. 11, the predetermined sub carrier is identical to the sub carrier to which antenna ports 107 and 108 are mapped.

A method of generating the sequence used for the SPDCCH-DMRS may be identical to a method of generating the sequence used for the EPDCCH-DMRS. For example, the sequence used for the SPDCCH-DMRS is generated on the basis of a 2-chip orthogonal code mapped to two consecutive resource elements in the time direction, similarly to the sequence used for the EPDCCH-DMRS. In the example of FIG. 11, the SPDCCH-DMRS is mapped in units of two consecutive resource elements, starting from the first resource element in the sub frame. For example, the antenna ports of the SPDCCH-DMRS are 207 and 208 for the two orthogonal codes. In other words, the SPDCCH-DMRS of the antenna ports 207 and 208 can be code division multiplexed using the same two consecutive resource elements.

Various methods can be used for the mapping for the resources of the antenna port of the SPDCCH-DMRS. As an example of the mapping method, the antenna port of the SPDCCH-DMRS is mapped to the SREG. For example, in the example of FIG. 11, a resource element in which SREG numbers constitute even-numbered SREGs corresponds to the antenna port 207, and a resource element in which SREG numbers constitute odd-numbered SREGs corresponds to the antenna port 208. The mapping method may be used for the distributed transmission of the SPDCCH.

As another example of the mapping method, the antenna port of the SPDCCH-DMRS is mapped to the SCCE. For example, resource elements included in the same SCCE correspond to the antenna port 207 or 208 on the basis of a predetermined condition. The predetermined condition is a condition based on a value which is set or notified of by the base station device, a value such as the RNTI which is set in the terminal device, and/or a value such as a physical cell ID specific to the base station device. The mapping method may be used for localized transmission of the SPDCCH.

As another example of the mapping method, the antenna port of the SPDCCH-DMRS is mapped to the SPDCCH. For example, resource elements included in the same SPDCCH correspond to the antenna port 207 or 208 on the basis of a predetermined condition. The predetermined condition is a condition based on a value which is set or notified of by the base station device, a value such as the RNTI which is set in the terminal device, and/or a value such as a physical cell ID specific to the base station device. The mapping method may be used for localized transmission of the SPDCCH.

As another example of the mapping method, the antenna port of the SPDCCH-DMRS is mapped to the resource element. For example, in each RB pair, the antenna ports 207 and 208 of the SPDCCH-DMRS are mapped to the resource elements other than the resource element to which the SPDCCH-DMRS is mapped alternately from the first symbol with a priority given to the frequency direction. In other words, since the antenna ports 207 and 208 of the SPDCCH-DMRS are mapped in the same SREG the diversity effect is increased. The mapping method may be used for the distributed transmission of the SPDCCH.

A method different from the example illustrated in FIG. 11 may be used for the resource element mapping in the RB pair of the SPDCCH-DMRS. For example, the SPDCCH-DMRS is mapped to the resource elements of predetermined sub carriers (sub carriers #1, 6, and 11) in each RB pair. The predetermined sub carrier is identical to the sub carrier to which the antenna ports 109 and 110 of the EPDCCH-DMRS are mapped. In this case, the antenna ports of the SPDCCH-DMRS can be 209 and 210. Further, the antenna ports 207 and 208 and the antenna ports 209 and 210 may be switched and used on the basis of a predetermined condition. The predetermined condition is a condition based on a value which is set or notified of by the base station device, a value such as the RNTI which is set in the terminal device, and/or a value such as a physical cell ID specific to the base station device.

The number of SCCEs used for one SPDCCH depends on the SPDCCH format and is decided on the basis of other parameters. The number of SCCEs used for one SPDCCH is also referred to as an aggregation level. For example, the number of SCCEs used for one SPDCCH is decided on the basis of the number of resource elements which can be used for the SPDCCH transmission in one RB pair, the transmission method of the SPDCCH, the TTI length, and/or the like. For example, the number of SCCEs used for one SPDCCH is 1, 2, 4, 8, 16, or 32. Further, the number of SREGs used for one SCCE is decided on the basis of the TTI length, a type of sub frame, and/or a type of cyclic prefix. For example, the number of SREGs used for one SCCE is 2, 4, or 8. Distributed transmission and localized transmission may be supported as the transmission method of the SPDCCH.

The distributed transmission or the localized transmission can be used for the SPDCCH. The distributed transmission and the localized transmission differ in mapping of the SCCE to the SREG and the RB pair. For example, in the distributed transmission, one SCCE is configured using SREGs of a plurality of RB pairs. In the localized transmission, one SCCE is configured using an SREG of one RB pair.

In the SPDCCH, the SREG configuration may not be defined, and only an SCCE configuration may be defined. In this case, only localized transmission may be supported in the SPDCCH.

The base station device 1 performs a setting related to the SPDCCH in the terminal device 2. The terminal device 2 monitors a predetermined number of SPDCCH candidates on the basis of the setting from the base station device 1. A set of RB pairs that the terminal device 2 monitors the SPDCCH can be set. The set of RB pairs is also referred to as an SPDCCH set or an SPDCCH-PRB set. One or more SPDCCH sets can be set in one terminal device 2. Each SPDCCH set includes one or more RB pairs. Further, the setting related to the SPDCCH can be individually performed for each SPDCCH set.

The base station device 1 can set a predetermined number of SPDCCH sets in the terminal device 2. For example, up to two SPDCCH sets can be set as an SPDCCH set 0 and/or an SPDCCH set 1. Each of the SPDCCH sets can be constituted by a predetermined number of RB pairs. Each SPDCCH set constitutes one set of SCCEs. The number of SCCEs configured in one SPDCCH set is decided on the basis of the TTI length, the number of RB pairs set as the SPDCCH set and/or the number of SREGs used in one SCCE. In a case in which the number of SCCEs configured in one SPDCCH set is N, each SPDCCH set constitutes SCCEs 0 to N−1. For example, in a case in which the number of SREGs used in one SCCE is 4, the SPDCCH set constituted by 4 RB pairs constitutes 16 SCCEs.

Figure 12:
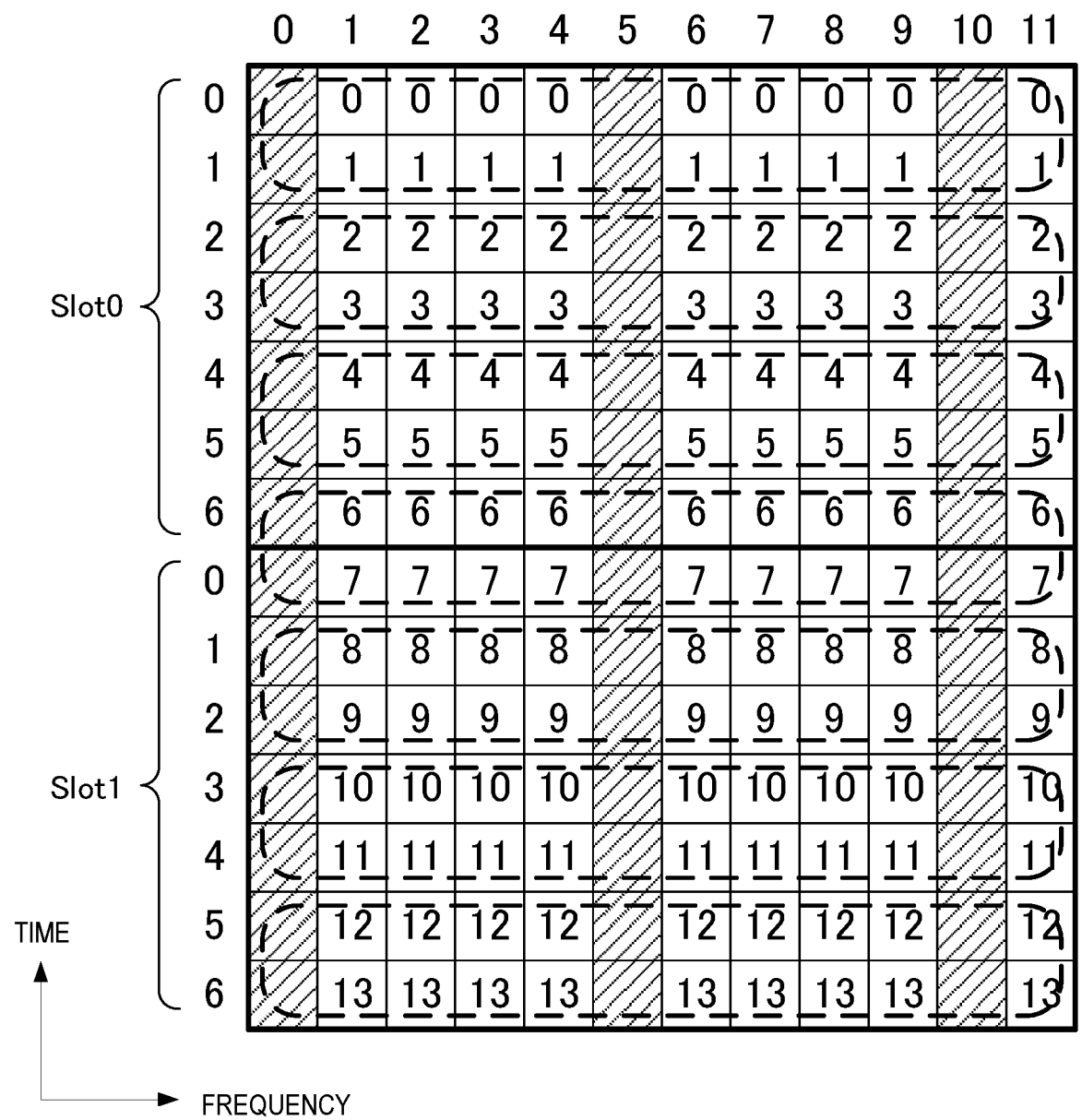
FIG. 12 is a diagram illustrating an example of an SCCE configuration in the present embodiment.

FIG. 12 is a diagram illustrating an example of the SCCE configuration in the present embodiment. In the example of FIG. 12, the number of SREGs constituting one SCCE is 2 which is suitable for the SCCE configuration in a case in which the TTI length is 2. In FIG. 12, resources indicated by a dotted line indicate one SCCE. In a case in which the TTI length is 2, the SPDCCH in which the aggregation level is 2 corresponds to two SCCEs in the SPDCCH set in the same TTI.

A start symbol for the sub frame can be set in the SPDCCH. The start symbol indicates a symbol in which the resource element mapping of the SPDCCH is started in a certain sub frame. For example, in a case in which the start symbol is 3, in a sub frame, the SPDCCH can be mapped from the symbol 3 of the slot 0 to the last symbol of the sub frame. For example, a symbol before the start symbol can be used as a region used for the transmission of the PDCCH.

Further, in the example of FIG. 12, in a case in which the start symbol is 3, the number of resource elements of the SCCE constituted by the SREGs 2 and 3 is reduced by half as compared with other SCCEs. Therefore, various methods can be used as a method of coping with such an SCCE. Such an SCCE may be decided on the basis of the number of resource elements available for the transmission of the SPDCCH in the SCCE. For example, it is decided whether or not it is an SCCE that is necessary to cope with on the basis of whether the number of available resource elements is larger or smaller than a predetermined number. The predetermined number may be set or specified in advance through the RRC signaling.

As an example of the coping method, an SCCE in which the number of available resource elements is smaller than a predetermined number is not used for the transmission of the SPDCCH. In other words, in the TTI including such an SCCE, since the SPDCCH is not transmitted, the terminal device does not monitor the SPDCCH.

As another example of the coping method, in the TTI including the SCCE in which the number of available resource elements is smaller than a predetermined number, the number of SREGs constituting one SCCE, a combination of aggregation levels, or the like is different from other TTIs. For example, in the TTI including such an SCCE, the aggregation level is higher than the other TTIs.

In a case in which the start symbol is set in the SPDCCH set, the SCCE configuration may be decided on the basis of the start symbol. For example, the SCCE may be constituted in order from the start symbol.

Part of the SPDCCH resource element mapping and the demodulation reference signal associated with the SPDCCH described in the present embodiment can be paraphrased as follows.

The terminal device that communicates with the base station device includes a higher layer processing unit that performs one or more SPDCCH settings through signaling of the higher layer from the base station device and a receiving unit that monitors the SPDCCH transmitted on the basis of the extended sub frame of a smaller number of symbols than the number of symbols corresponding to the sub frame and the resource block set through the SPDCCH setting. The SPDCCH is transmitted through one or more control channel elements. The control channel element is constituted by a plurality of resource element groups. The resource element group is specified in association with the symbol in the resource block pair in each of the resource block pairs set through the SPDCCH setting.

The number of resource element groups constituted in each resource block pair is equal to the number of symbols in the resource block pair.

The demodulation reference signal associated with the SPDCCH is mapped to all the resource elements included in a predetermined sub carrier in each of the resource block pairs set through the SPDCCH setting.

The demodulation reference signal associated with the SPDCCH is mapped to the resource elements in two consecutive symbols including symbols corresponding to the resource element group used for the mapping of the SPDCCH in each of the resource block pairs set through the SPDCCH setting.

The SPDCCH setting includes information indicating the number of symbols of the extended sub frame. The number of control channel elements used for the transmission of the SPDCCH is decided on the basis of at least the number of symbols of the extended sub frame. The number of resource element groups constituting the control channel element is decided on the basis of at least the number of symbols of the extended sub frame. The configuration of the resource element group in each of the resource block pairs is used in common regardless of the number of symbols of the extended sub frame.

The base station device that communicates with the terminal device includes a higher layer processing unit that performs one or more SPDCCH settings through signaling of the higher layer from the terminal device and a transmitting unit that transmits the SPDCCH transmitted on the basis of the extended sub frame of a smaller number of symbols than the number of symbols corresponding to the sub frame and the resource block set through the SPDCCH setting. The SPDCCH is transmitted through one or more control channel elements. The control channel element is constituted by a plurality of resource element groups. The resource element group is specified in association with the symbol in the resource block pair in each of the resource block pairs set through the SPDCCH setting.

<HARQ-ACK Transmission Responsive to SPDSCH in Present Embodiment>

The terminal device transmits the HARQ-ACK responsive to the scheduled SPDSCH. Various methods can be used for transmitting the HARQ-ACK responsive to the SPDSCH.

As an example of a method of transmitting the HARQ-ACK responsive to SPDSCH, the terminal device can transmit HARQ-ACK responsive to the SPDSCH through the SPUCCH or the SPUSCH in a predetermined TTI. For example, the terminal device transmits the HARQ-ACK responsive to the SPDSCH received in a certain TTI through the SPUCCH or the SPUSCH after four TTIs from the TTI.

Figure 13:
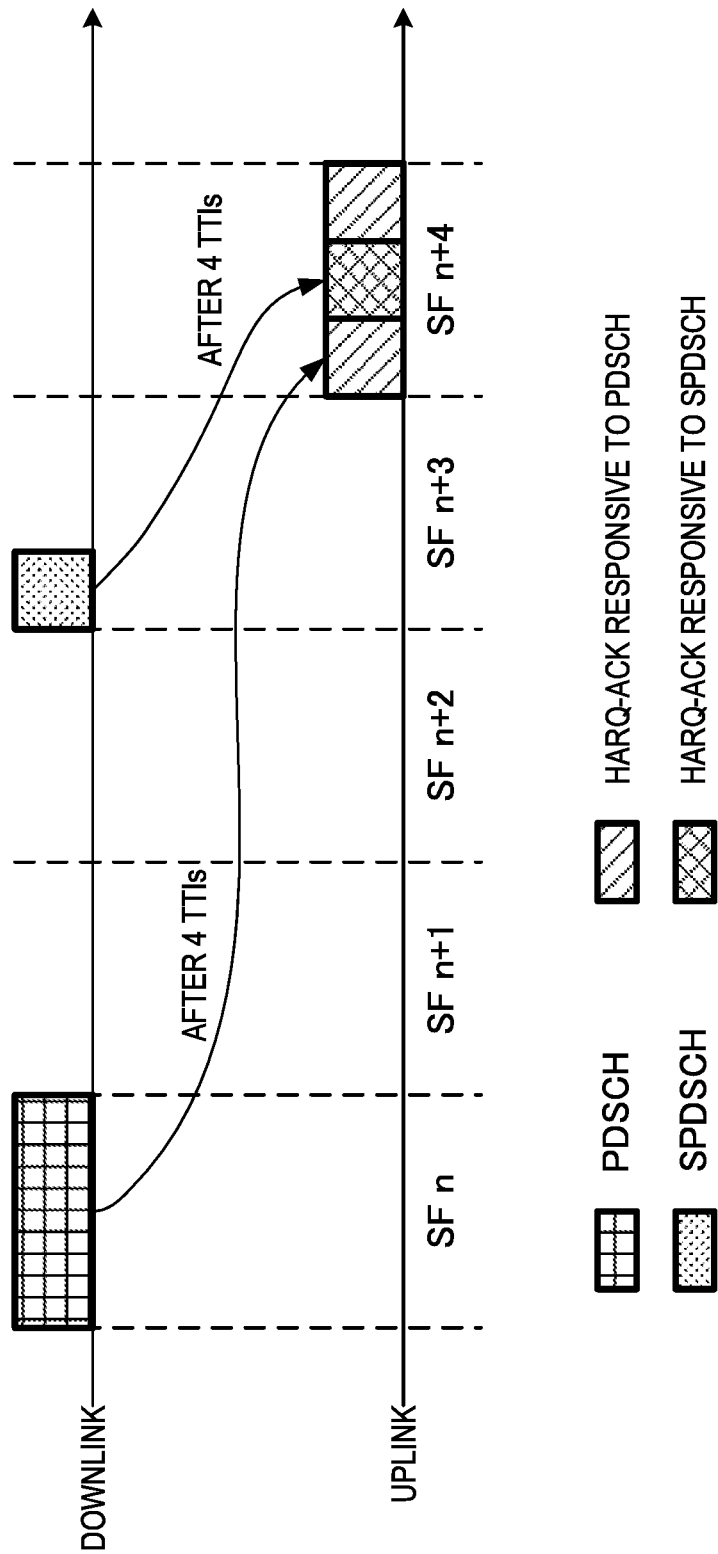
FIG. 13 is a diagram illustrating an example of transmission of a HARQ-ACK responsive to an SPDSCH and HARQ-ACK responsive to a PDSCH.

FIG. 13 is a diagram illustrating an example of transmission of the HARQ-ACK responsive to the SPDSCH and the HARQ-ACK responsive to the PDSCH. FIG. 13 illustrates an example in which the TTI for transmitting the HARQ-ACK responsive to the SPDSCH is included in the sub frame for transmitting the HARQ-ACK responsive to the PDSCH. In this case, it is necessary for the terminal device to simultaneously transmit the HARQ-ACK responsive to the SPDSCH and the HARQ-ACK responsive to the PDSCH, but since the terminal device supporting only single-carrier transmission is unable to transmit them simultaneously, a special process may be necessary. Various methods can be used for such a process.

As an example of the method of transmitting the HARQ-ACK responsive to the SPDSCH, in a case in which the TTI for transmitting the HARQ-ACK responsive to the SPDSCH is included in the sub frame for transmitting the HARQ-ACK responsive to the PDSCH, the terminal device does not transmit (drops) the HARQ-ACK responsive to the PDSCH. In other words, the terminal device preferentially transmits the HARQ-ACK responsive to the SPDSCH.

As an example of the method of transmitting the HARQ-ACK responsive to the SPDSCH, in a case in which the TTI for transmitting the HARQ-ACK responsive to the SPDSCH is included in the sub frame for transmitting the HARQ-ACK responsive to the PDSCH, the terminal device does not transmit (drops) the HARQ-ACK responsive to the SPDSCH. In other words, the terminal device preferentially transmits the HARQ-ACK responsive to the PDSCH.

As an example of the method of transmitting the HARQ-ACK responsive to the SPDSCH, in a case in which the TTI for transmitting the HARQ-ACK responsive to the SPDSCH is included in the sub frame for transmitting the HARQ-ACK responsive to the PDSCH, the terminal device transmits the HARQ-ACK responsive to the PDSCH through the SPUCCH or the SPUSCH for the transmission of the HARQ-ACK. In other words, the HARQ-ACK responsive to the PDSCH is piggy-backed in the SPUCCH or the SPUSCH for the transmission of the HARQ-ACK responsive to the SPDSCH.

As an example of the method of transmitting the HARQ-ACK responsive to the SPDSCH, in a case in which the TTI for transmitting the HARQ-ACK responsive to the SPDSCH is included in the sub frame for transmitting the HARQ-ACK responsive to the PDSCH, the terminal device transmits the HARQ-ACK responsive to the SPDSCH through the PUCCH or the PUSCH for the transmission of the HARQ-ACK. In other words, the HARQ-ACK responsive to the SPDSCH is piggy-backed in the PUCCH or the PUSCH for the transmission of the HARQ-ACK responsive to the PDSCH.

As an example of the Method of transmitting the HARQ-ACK responsive to the SPDSCH, the terminal device assumes that the PDSCH in which the HARQ-ACK responsive to the PDSCH is transmitted is not scheduled to the sub frame including the TTI for transmitting the HARQ-ACK responsive to the SPDSCH. In other words, in a certain sub frame, the SPDSCH and the PDSCH are scheduled so that the HARQ-ACK responsive to the SPDSCH and the HARQ-ACK responsive to the PDSCH are not transmitted at the same time.

As an example of the Method of transmitting the HARQ-ACK responsive to the SPDSCH, the terminal device assumes that the SPDSCH in which the HARQ-ACK responsive to the SPDSCH is transmitted is not scheduled to all or a part of the TTI for transmitting the HARQ-ACK responsive to the SPDSCH and included in the sub frame. In other words, in a certain sub frame, the SPDSCH and the PDSCH are scheduled so that the HARQ-ACK responsive to the SPDSCH and the HARQ-ACK responsive to the PDSCH are not transmitted at the same time.

As an example of the method of transmitting the HARQ-ACK responsive to the SPDSCH, in a case in which the TTI for transmitting the HARQ-ACK responsive to the SPDSCH is included in the sub frame for transmitting the HARQ-ACK responsive to the PDSCH, the terminal device transmits the HARQ-ACK responsive to the SPDSCH and the HARQ-ACK responsive to the PDSCH individually. The terminal device has a capability of transmitting the SPUCCH or the SPUSCH and the PUCCH or the PUSCH simultaneously.

As an example of the method of transmitting the HARQ-ACK responsive to the SPDSCH, in a case in which the TTI for transmitting the HARQ-ACK responsive to the SPDSCH is included in the sub frame for transmitting the HARQ-ACK responsive to the PDSCH, the terminal device transmits the HARQ-ACK responsive to the SPDSCH and the HARQ-ACK responsive to the PDSCH individually, but the PUCCH or the PUSCH for the transmission of the HARQ-ACK responsive to the PDSCH is transmitted after puncturing or rate-matching is performed on the resource element included in the TTI in which the HARQ-ACK responsive to the SPDSCH is transmitted.

Further, in the above description, the method of transmitting the HARQ-ACK responsive to the SPDSCH has been described in connection with the TTI for transmitting the HARQ-ACK responsive to the SPDSCH is included in the sub frame for transmitting the HARQ-ACK responsive to the PDSCH, but the present disclosure is not limited thereto. The method of transmitting the HARQ-ACK responsive to the SPDSCH can also be applied to a case in which the TTI for transmitting the HARQ-ACK responsive to the SPDSCH is included in the sub frame for transmitting the PUSCH.

<SPUSCH Transmission in Present Embodiment>

The terminal device transmits the SPUSCH scheduled through the SPDCCH. Various methods can be used for the transmission of the SPUSCH.

As an example of an SPUSCH transmission method, the terminal device can transmit the SPUSCH in a predetermined TTI. For example, the terminal device transmits the SPUSCH scheduled in a certain TTI in a fourth TTI from the TTI.

As an example of the SPUSCH transmission method, in a case in which the TTI for transmitting the SPUSCH is included in the sub frame for transmitting the HARQ-ACK responsive to the PDSCH, the terminal device does not transmit (drop) the HARQ-ACK responsive to the PDSCH. In other words, the terminal device preferentially transmits the SPUSCH.

As an example of the SPUSCH transmission method, in a case in which the TTI for transmitting the SPUSCH is included in the sub frame for transmitting the HARQ-ACK responsive to the PDSCH, the terminal device does not transmit (drop) the SPUSCH. In other words, the terminal device preferentially transmits the HARQ-ACK responsive to the PDSCH.

As an example of the SPUSCH transmission method, in a case in which the TTI for transmitting the SPUSCH is included in the sub frame for transmitting the HARQ-ACK responsive to the PDSCH, the terminal device transmits the HARQ-ACK responsive to the PDSCH through the SPUSCH. In other words, the HARQ-ACK responsive to the PDSCH is piggybacked in the SPUSCH.

As an example of the SPUSCH transmission method, in a case in which the TTI for transmitting the SPUSCH is included in the sub frame for transmitting the HARQ-ACK responsive to the PDSCH, the terminal device transmits a codeword (transport block) of the SPUSCH through the PUCCH or the PUSCH for transmitting the HARQ-ACK responsive the PDSCH. In other words, the codeword (transport block) of the SPUSCH is piggybacked in the PUCCH or the PUSCH for the transmission of the HARQ-ACK responsive to the PDSCH.

As an example of the Method of transmitting the SPUSCH, the terminal device assumes that the PDSCH in which the HARQ-ACK responsive to the PDSCH is transmitted is not scheduled to the sub frame including the TTI for transmitting the SPUSCH. In other words, in a certain sub frame, the SPDSCH and the PDSCH are scheduled so that SPUSCH and the HARQ-ACK responsive to the PDSCH are not transmitted at the same time.

As an example of the Method of transmitting the SPUSCH, the terminal device assumes that the SPDSCH in which the HARQ-ACK responsive to the SPUSCH is transmitted is not scheduled to all or a part of the TTI for transmitting the SPUSCH and included in the sub frame. In other words, in a certain sub frame, the SPDUCH and the PDSCH are scheduled so that the SPUSCH and the HARQ-ACK responsive to the PDSCH are not transmitted at the same time.

As an example of the method of transmitting the SPUSCH, in a case in which the TTI for transmitting the SPUSCH is included in the sub frame for transmitting the HARQ-ACK responsive to the PDSCH, the terminal device transmits the SPUSCH and the HARQ-ACK responsive to the PDSCH individually. The terminal device has a capability of transmitting the SPUCCH or the SPUSCH and the PUCCH or the PUSCH simultaneously.

As an example of the method of transmitting the SPUSCH, in a case in which the TTI for transmitting the SPUSCH is included in the sub frame for transmitting the HARQ-ACK responsive to the PDSCH, the terminal device transmits the SPUSCH and the HARQ-ACK responsive to the PDSCH individually, but the PUCCH or the PUSCH for the transmission of the HARQ-ACK responsive to the PDSCH is transmitted after puncturing or rate-matching is performed on the resource element included in the TTI in which the SPUSCH is transmitted.

Further, in the above description, the method of transmitting the SPUSCH has been described in connection with the TTI for transmitting the SPUSCH is included in the sub frame for transmitting the HARQ-ACK responsive to the PDSCH, but the present disclosure is not limited thereto. The method of transmitting the SPUSCH can also be applied to a case in which the TTI for transmitting the SPUSCH is included in the sub frame for transmitting the PUSCH.

Part of the HARQ-ACK transmission and the SPUSCH transmission for the SPDSCH described in the present embodiment can be paraphrased as follows.

The terminal device that communicates with the base station device includes a receiving unit that receives a first PDSCH transmitted on the basis of the sub frame defined by a predetermined number of symbols and a second PDSCH transmitted on the basis of the extended sub frame of a smaller number of symbols than the number of symbols corresponding to the sub frame and a transmitting unit that transmits a first HARQ-ACK which is a feedback for reception of the first PDSCH and transmits second HARQ-ACK which is a feedback for reception of the second PDSCH after a predetermined extended sub frame.

The first HARQ-ACK is transmitted through the first PUCCH or the first PUSCH in a sub frame which is a predetermined number after the sub frame in which the first PDSCH is received. The second HARQ-ACK is transmitted through the second PUCCH or the second PUSCH in the extended sub frame which is a predetermined number after the extended sub frame in which the second PDSCH is received.

The second HARQ-ACK is not transmitted through the extended sub frame included in the sub frame for transmitting the first HARQ-ACK.

The receiving unit of the terminal device assumes that the second HARQ-ACK which can be transmitted through the extended sub frame included in the sub frame for transmitting the first HARQ-ACK is not received.

The transmitting unit of the terminal device drops the second HARQ-ACK in a case in which the second HARQ-ACK transmitted through the extended sub frame included in the sub frame for transmitting the first HARQ-ACK occurs.

The transmitting unit of the terminal device transmits the second HARQ-ACK through the first PUCCH or the first PUSCH for transmitting the first HARQ-ACK in a case in which the second HARQ-ACK transmitted through the extended sub frame included in the sub frame for transmitting the first HARQ-ACK occurs.

The first HARQ-ACK is not transmitted through the sub frame including the extended sub frame for transmitting the second HARQ-ACK.

The receiving unit of the terminal device assumes that the first HARQ-ACK which can be transmitted through the sub frame including the extended sub frame for transmitting the second HARQ-ACK is not received.

The transmitting unit of the terminal device drops the first HARQ-ACK in a case in which the first HARQ-ACK transmitted through the sub frame including the extended sub frame for transmitting the second HARQ-ACK occurs.

In a case in which the first HARQ-ACK transmitted through the sub frame including the extended sub frame for transmitting the second HARQ-ACK occurs, the transmitting unit of the terminal device transmits the first HARQ-ACK through the second PUCCH or the second PUSCH for transmitting the second HARQ-ACK.

The receiving unit of the terminal device receives the first PDCCH for notifying of allocation information of the first PUSCH transmitted on the basis of the sub frame. The transmitting unit of the terminal device transmits the first PUSCH on the basis of the allocation information. The second HARQ-ACK is not transmitted through the extended sub frame included in the sub frame for transmitting the first PUSCH.

The receiving unit of the terminal device receives the first PDCCH for notifying of the allocation information of the first PUSCH transmitted on the basis of the sub frame. The transmitting unit of the terminal device transmits the first PUSCH on the basis of the allocation information. The first PUSCH is not transmitted through the sub frame including the extended sub frame for transmitting the second HARQ-ACK.

The receiving unit of the terminal device receives the second PDCCH notifying the allocation information of the second PUSCH transmitted on the basis of the extended sub frame. The transmitting unit of the terminal device transmits the second PUSCH on the basis of the allocation information. The second PUSCH is not transmitted through the extended sub frame included in the sub frame for transmitting the first HARQ-ACK.

The receiving unit of the terminal device receives the second PDCCH for notifying of the allocation information of the second PUSCH transmitted on the basis of the extended sub frame. The transmitting unit of the terminal device transmits the second PUSCH on the basis of the allocation information. The first HARQ-ACK is not transmitted through the sub frame including the extended sub frame for transmitting the second PUSCH.

The base station device that communicates with the terminal device includes a transmitting unit that transmits a first PDSCH transmitted on the basis of the sub frame defined by a predetermined number of symbols and a second PDSCH transmitted on the basis of the extended sub frame of a smaller number of symbols than the number of symbols corresponding to the sub frame and a receiving unit that receives a first HARQ-ACK which is a feedback for reception of the first PDSCH after a predetermined sub frame and receives a second HARQ-ACK which is a feedback for reception of the second PDSCH after a predetermined extended sub frame.

<Resource Element Mapping of SPDCCH and/or SPDSCH in Present Embodiment>

As described above, the channel in the STTI mode is mapped on the basis of the sub resource block. In other words, the SPDCCH and/or the SPDSCH are mapped on the basis of the sub resource block. The resource element mapping of the SPDCCH and/or the SPDSCH described in the present embodiment is also applied to the candidate of the SPDCCH and/or SPDSCH to be monitored.

In the present embodiment, in a case in which a predetermined channel or signal is not mapped to a predetermined resource element, a predetermined method can be used for the mapping. An example of the predetermined method is rate matching. In the rate matching, a predetermined channel or signal is mapped while skipping a predetermined resource element. It is necessary for the terminal device to recognize or assume that the rate matching is used for mapping to a predetermined resource element in reception (demodulation and decoding) of a predetermined channel or signal. Another example of the predetermined method is puncturing. In the puncturing, a predetermined channel or signal is assumed to be mapped without skipping a predetermined resource element, but another channel or signal is mapped to (overwritten in) the predetermined resource element. It is preferable that the terminal device recognize or assume that the puncturing is used for the mapping to a predetermined resource element in the reception (demodulation, decoding) of a predetermined channel or signal, but the terminal device may not perform the recognizing or the assuming. In this case, the reception accuracy deteriorates, but the terminal device can perform the reception by adjusting the coding rate or the like. In the description of the present embodiment, both the rate matching and the puncturing can be applied as the resource element mapping.

The SPDCCH and/or SPDSCH are mapped to the resource element on the basis of various conditions, criteria, or scales. In other words, in each of the antenna ports used for the transmission of the SPDCCH and/or the SPDSCH, a block of a complex value symbol is mapped to a resource element satisfying a predetermined condition, criterion, or scale in the (current) TTI serving as the target. The predetermined condition, criteria, or scale is at least part of the following conditions, criteria, or scales. The conditions, criteria, or scales used for mapping the SPDCCH and/or the SPDSCH (second PDSCH) to the resource element are also referred to as a second condition, a second criterion, or a second criterion, respectively. The conditions, criteria, or scales used for mapping the PDSCH (first PDSCH) to the resource element are also referred to as a first condition, a first criterion, or a first measure, respectively.

(1) The resource element to which the SPDCCH and/or the SPDSCH are mapped is within the sub resource block allocated for transmission. Further, the resource element to which the PDSCH is mapped is within the resource block allocated for transmission.

(2) The resource element to which the SPDCCH and/or the SPDSCH are mapped is not used for transmission of the PBCH and the synchronization signal. Further, the resource element to which the PDSCH is mapped is not used for transmission of the PBCH and the synchronization signal.

(3) The resource element to which the SPDCCH and/or the SPDSCH are mapped is assumed not to be used for the CRS by the terminal device. Further, the resource element to which the PDSCH is mapped is assumed not to be used for the CRS by the terminal device. The CRS assumed by the terminal device may be different in the SPDCCH and/or the SPDSCH and the PDSCH. For example, the CRS assumed in the mapping of the SPDCCH and/or the SPDSCH is set independently of the CRS assumed in the mapping of the SPDCCH and/or the SPDSCH.

(4) In the sub resource block in which the DMRS associated with the SPDCCH and/or SPDSCH is not transmitted, the SPDCCH and/or the SPDSCH is transmitted through an antenna port through which the CRS is transmitted or an antenna port through which the DMRS associated with the SPDCCH and/or the SPDSCH are transmitted. The DMRS associated with the SPDCCH and/or the SPDSCH can be a DMRS mapped in the resource block including the sub resource block to which the SPDCCH and/or the SPDSCH are mapped. Further, in the sub resource block in which the DMRS associated with the PDSCH is not transmitted, the PDSCH is transmitted through the antenna port to which the antenna port through which the CRS is transmitted is transmitted. The antenna port through which the SPDCCH and/or the SPDSCH are transmitted may be identical to as or different from the antenna port through which the PDSCH is transmitted.

(5) In the sub resource block to which the DMRS associated with the SPDCCH and/or the SPDSCH is transmitted, the SPDCCH and/or the SPDSCH is transmitted through the antenna port through which the CRS is transmitted or the antenna port through the DMRS associated with the SPDCCH and/or the SPDSCH is transmitted. The DMRS associated with the SPDCCH and/or the SPDSCH can be a DMRS mapped in the resource block including the sub resource block to which the DMRS and/or the SPDCCH and/or the SPDSCH are mapped. Further, in the sub resource block through which the DMRS associated with the PDSCH is transmitted, the PDSCH is transmitted through the antenna port through which the DMRS associated with the PDSCH is transmitted. The antenna port through which the SPDCCH and/or the SPDSCH are transmitted may be identical to or different from the antenna port through which the PDSCH is transmitted. In other words, the antenna port through which the DMRS associated with the SPDCCH and/or the SPDSCH is transmitted may be identical to or different from the antenna port through which the DMRS associated with the PDSCH is transmitted.

(6) In a case in which the SPDCCH and/or the SPDSCH are transmitted through an MBSFN sub frame, the SPDCCH and/or the SPDSCH is transmitted through the antenna port through which the DMRS associated with the SPDCCH and/or the SPDSCH is transmitted. The DMRS associated with the SPDCCH and/or the SPDSCH can be a DMRS mapped in the resource block including the sub resource block to which the SPDCCH and/or the SPDSCH are mapped. The MBSFN sub frame is set in a cell-specific manner or a terminal device-specific manner through the RRC signaling. Further, in a case in which the PDSCH is transmitted through the MBSFN sub frame, the PDSCH is transmitted through the antenna port through which the DMRS associated with the PDSCH is transmitted. The antenna port through which the SPDCCH and/or the SPDSCH are transmitted may be identical to or different from the antenna port through which the PDSCH is transmitted. In other words, the antenna port through which the DMRS associated with the SPDCCH and/or the SPDSCH is transmitted may be identical to or different from the antenna port through which the DMRS associated with the PDSCH is transmitted.

(7) The SPDCCH and/or the SPDSCH are not mapped to the resource elements used for the DMRS associated with the SPDCCH and/or the SPDSCH. Further, the PDSCH is not mapped to the resource element used for the DMRS associated with the PDSCH. The DMRS associated with the SPDCCH and/or the SPDSCH may be identical to or different from the DMRS associated with the PDSCH. Further, the SPDCCH and/or the SPDSCH may not be mapped to the resource element used for the DMRS further associated with the PDSCH.

(8) The SPDCCH and/or the SPDSCH are not mapped to resource elements used for the ZP CSI-RS and/or the NZP CSI-RS set in a cell-specific manner or a terminal device-specific manner. Further, the PDSCH is not mapped to the resource elements used for the ZP CSI-RS and/or the NZP CSI-RS set in a cell-specific manner or a terminal device-specific manner. The ZP CSI-RS and/or the NZP CSI-RS in the mapping of the SPDCCH and/or the SPDSCH may have the same setting as the ZP CSI-RS and/or the NZP CSI-RS in the mapping of the PDSCH.

(9) The SPDCCH and/or the SPDSCH are not mapped to the resource block pair, the sub resource block, the enhanced resource element group, or the resource element for transmitting the EPDCCH associated with the SPDCCH and/or the SPDSCH. For example, the SPDCCH and/or the SPDSCH are not mapped to the sub resource block including the resource element to which the EPDCCH associated with that SPDCCH and/or the SPDSCH is mapped. Further, the PDSCH is not mapped to the resource block pair for transmitting the EPDCCH associated with the PDSCH.

(10) The SPDCCH and/or the SPDSCH are mapped to a symbol after a symbol indicated by a predetermined index in a first slot in a certain sub frame in the sub frame (the start symbol of the SPDCCH and/or the SPDSCH). In other words, in a case in which the sub resource block to which the SPDCCH and/or the SPDSCH are to be mapped includes a symbol before the start symbol of the SPDCCH and/or the SPDSCH within a certain sub frame, the SPDCCH and/or the SPDSCH is not mapped to the symbol. The predetermined index indicating the start symbol of the SPDCCH and/or the SPDSCH is set in a cell-specific manner or a terminal device-specific manner. For example, the predetermined index indicating the start symbol of the SPDCCH and/or the SPDSCH is included in the downlink STTI setting and set. A minimum value of the predetermined index indicating the start symbol of SPDCCH and/or the SPDSCH can be set to 0. Further, the start symbols of the SPDCCH and/or the SPDSCH may be specified in advance without being set and can be set to, for example, 0. In other words, the SPDCCH and/or the SPDSCH can be mapped to all symbols in a certain sub frame.

Further, the PDSCH is mapped to a symbol after a symbol indicated by a predetermined index in a first slot in a certain sub frame in the sub frame (the start symbol of the PDSCH). The predetermined index indicating the start symbol of the SPDCCH and/or the SPDSCH may be identical to or different from the predetermined index indicating the start symbol of the PDSCH. A minimum value of the predetermined index indicating the start symbol of the PDSCH is 1.

(11) The SPDCCH and/or the SPDSCH are not mapped to the resource elements of the resource element group allocated to the PCFICH or the PHICH. Further, the PDSCH is not mapped to a symbol including the resource element group allocated to the PCFICH or the PHICH (that is, a first symbol in a certain sub frame). In other words, the SPDCCH and/or the SPDSCH can be mapped to resource elements other than the resource element group in the symbol including the resource element group allocated to the PCFICH or the PHICH. For the resource element mapping of the SPDCCH and/or the SPDSCH, preferably, the rate matching is performed in the resource element used for the transmission of the PCFICH or the PHICH.

(12) The SPDCCH and/or the SPDSCH are not mapped to the resource block pair, the sub resource block, the symbol, the TTI, the resource element group, or the resource element for transmitting the PDCCH associated with the SPDCCH and/or the SPDSCH. In other words, the SPDCCH and/or the SPDSCH are not mapped to the resource block pair including the resource element or the resource element group, the sub resource block, the symbol, the TTI, or the resource element group for transmitting the PDCCH associated with the SPDCCH and/or the SPDSCH.

Further, the PDSCH is mapped regardless of the transmission of all the PDCCHs including the PDCCH associated with the PDSCH. For example, the PDCCH is transmitted through a symbol indicated by a CFI set or notified from the base station device, and the PDSCH is not mapped to the symbol used for transmitting the PDCCH. Therefore, in the mapping of the PDSCH, the terminal device may not necessarily recognize or assume the resource element used for transmitting the PDCCH.

On the other hand, in a case in which the SPDCCH and/or the SPDSCH are also mapped to the symbol including the resource element used for transmitting the PDCCH, it is preferable that the terminal device recognize or assume the resource element used for transmitting the PDCCH in the mapping of the PDSCH. In the resource element mapping of the SPDCCH and/or the SPDSCH, preferably, puncturing is performed on the resource element used for transmitting the PDCCH. Further, in the resource element mapping of the SPDCCH and/or the SPDSCH, the PDCCH includes not only the PDCCH associated with the SPDCCH and/or the SPDSCH but also some or all PDCCHs that the terminal device can recognize or receive.

(13-1) The SPDCCH and/or the SPDSCH are not mapped to the resource block, the resource block pair, or the resource block group used for the transmission of the PDSCH scheduled to (recognized or received by) the terminal device. For example, in a case in which a certain PDSCH is scheduled to a certain terminal device, the terminal device assumes that the SPDCCH and/or the SPDSCH is not mapped to the resource block used for transmission of the PDSCH or the sub resource block in the resource block group. Further, in this case, the SPDCCH and/or the SPDSCH may be mapped to the symbol (PDCCH region) before the start symbol of the PDSCH in the resource block or the resource block group.

In a case in which the SPDCCH and/or the SPDSCH are not mapped to the resource block, the resource block pair, or the resource block group used for transmission of the PDSCH scheduled to the terminal device, the PDSCH can be mapped regardless of the mapping of the SPDCCH and/or the SPDSCH. In other words, in a case in which the PDSCH is scheduled to resources including a certain resource block, the SPDCCH and/or the SPDSCH including the sub resource block in the resource block are not mapped. In other words, the terminal device assumes that the SPDCCH and/or the SPDSCH using the sub resource block in the resource block used for transmission of the PDSCH scheduled to the terminal device are not mapped (transmitted). The terminal device may not monitor the candidates of the SPDCCH and/or the SPDSCH.

In other words, in a case in which the candidate of the SPDCCH and/or the SPDSCH and the PDSCH to be scheduled collide in the same resource element, the resource block, or the sub resource block, the PDSCH is preferentially mapped, and the SPDCCH and/or the SPDSCH are not mapped.

(13-2) The SPDCCH and/or the SPDSCH are mapped regardless of transmission of the PDSCH scheduled to (recognized or received by) the terminal device. For example, even in a case in which a certain PDSCH is scheduled to a certain terminal device, the terminal device assumes that the SPDCCH and/or the SPDSCH can be mapped to the resource block used for transmission of the PDSCH or the sub resource block in the resource block group. In other words, the terminal device monitors the candidate of the SPDCCH and/or the SPDSCH to be set regardless of the scheduling of the PDSCH.

In a case in which the SPDCCH and/or the SPDSCH are mapped regardless of the transmission of the PDSCH scheduled to the terminal device, the mapping of the PDSCH depends on that SPDCCH and/or the SPDSCH. For example, the PDSCH is not mapped to the resource elements corresponding to the candidates of all the SPDCCHs and/or the SPDSCHs. For example, the PDSCH is not mapped to the resource element corresponding to the SPDCCH and/or the SPDSCH which is detected among the candidates of the SPDCCH and/or the SPDSCH. In other words, the PDSCH is also mapped to the resource elements corresponding to SPDCCHs and/or the SPDSCHs which is not detected among the candidates of the SPDCCH and/or the SPDSCH.

Further, the PDSCH may not be scheduled in the resource blocks or the sub frames including the sub resource blocks used for transmission of the SPDCCH and/or the SPDSCH. For example, the terminal device assumes that the PDSCH is not scheduled in the resource block or the sub frame including the sub resource block corresponding to the candidate of the SPDCCH and/or the SPDSCH.

In other words, in a case in which the candidate of the SPDCCH and/or the SPDSCH and the PDSCH to be scheduled collide in the same resource element, the resource block, or the sub resource block, the SPDCCH and/or the SPDSCH are preferentially mapped, and the PDSCH is mapped to the resource element other than the resource element to which the SPDCCH and/or the SPDSCH are mapped.

(13-3) The resource element mappings described in (13-1) and (13-2) are switched on the basis of a predetermined condition and used. For example, in a case in which the PDSCH is scheduled through the EPDCCH, the resource element mapping described in (13-1) is used, and in a case in which the PDSCH is scheduled through the PDCCH, the resource element mapping described in (13-2) is used. For example, in a case in which the PDSCH is scheduled through the EPDCCH, the resource element mapping described in (13-2) is used, and in a case in which the PDSCH is scheduled through the PDCCH, the resource element mapping described in (13-1) is used.

Figure 14:
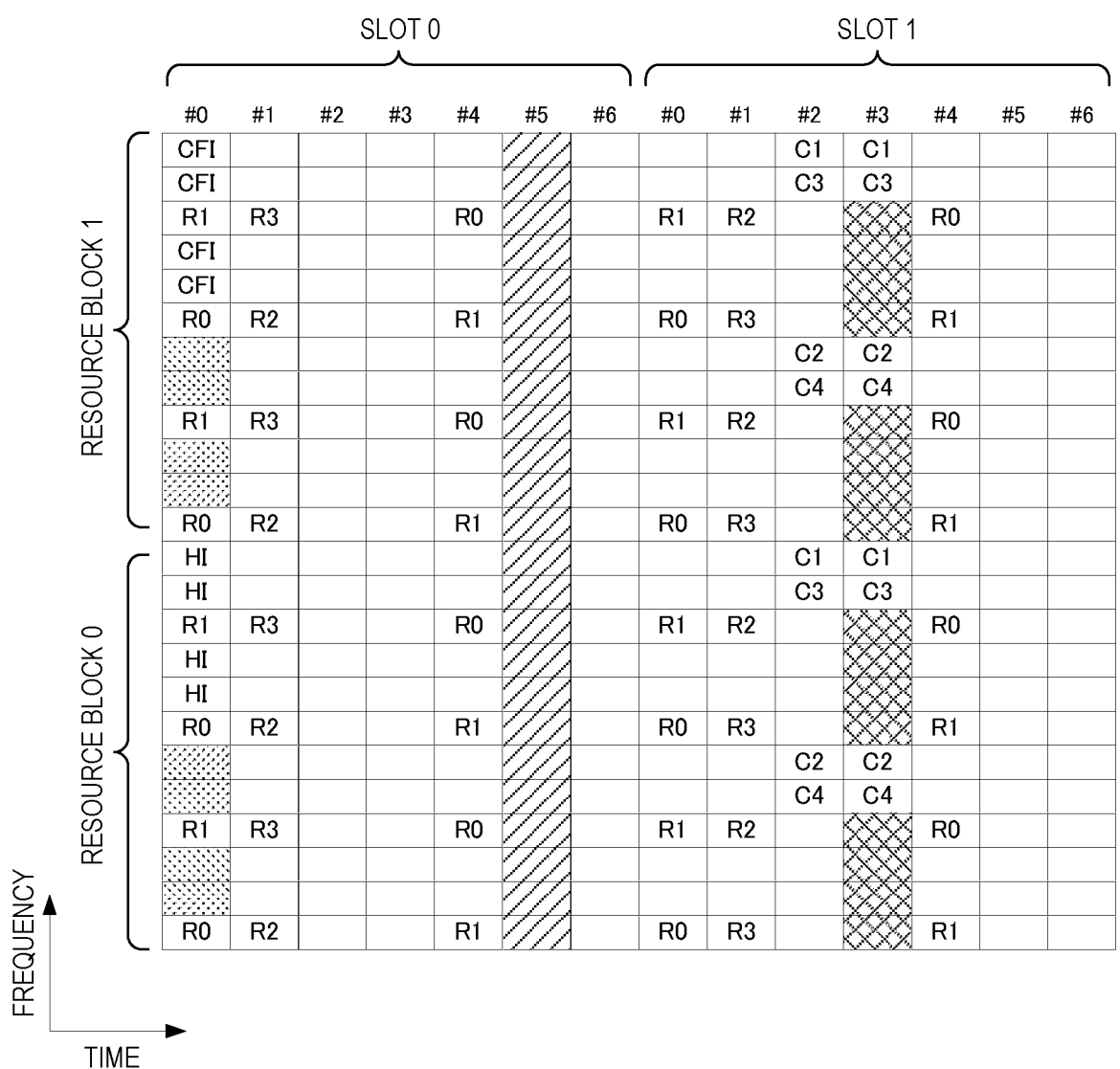
FIG. 14 is a diagram illustrating an example of resource element mapping of an SPDCCH and/or an SPDSCH.

FIG. 14 is a diagram illustrating an example of the resource element mapping of SPDCCH and/or the SPDSCH. FIG. 14 illustrates resource elements of two resource block pairs in the downlink. Resource elements R0 to R3 are resource elements to which the CRS is mapped respectively. Resource elements C1 to C4 are resource elements to which the CSI-RS is mapped. A resource element CFI is a resource element to which the PCFICH is mapped. A resource element HI is a resource element to which the PHICH is mapped.

In the example of FIG. 14, the TTI is a 1 symbol. In other words, one sub resource block is constituted by one symbol and 12 resource elements indicated by 12 sub carriers. The terminal device receives or monitors the SPDCCH and/or the SPDSCH mapped to a set of sub resource blocks (resource blocks 0 and 1) in a symbol 0 of a slot 0, a symbol 5 of the slot 0, and a symbol 3 of a slot 1 on the basis of a predetermined setting. The SPDCCH and/or the SPDSCH in the symbol 0 of the slot 0 are mapped to the resource elements other than the resource elements used for transmission of the CRS, the PCFICH, and the PHICH. The SPDCCH and/or the SPDSCH in the symbol 5 of the slot 0 are mapped to all the resource elements. The SPDCCH and/or the SPDSCH in the symbol 3 of the slot 1 are mapped to a resource element other than the resource element used for transmission of the CSI-RS.

The SPDCCH and/or the SPDSCH may be further mapped after the start symbol of SPDCCH and/or the SPDSCH in a certain sub frame. For example, in a case in which the start symbol of SPDCCH and/or the SPDSCH is 3, the SPDCCH and/or the SPDSCH can be mapped from the symbol 3 of the slot 0 to the symbol 6 of the slot 1. In the example of FIG. 14, the terminal device does not assume transmission or mapping of the SPDCCH and/or the SPDSCH in the symbol 0 of the slot 0. Therefore, the terminal device may not receive or monitor the SPDCCH and/or the SPDSCH in the symbol 0 of the slot 0.

Further, in the above description, the example in which the size of the TTI is specified on the basis of the number of symbols in which a predetermined symbol is used as a unit of a symbol length has been described, but the present invention is not limited to this example. The size of the TTI may be specified by various methods or units. In the present embodiment, the size of the TTI can be a length of time. For example, in another example of specifying the size of the TTI, the number of symbols constituting each TTI is constant, and the symbol lengths of the respective symbols are different. Specifically, the base station device can transmit a signal in which a sub carrier interval and a symbol length are varied. In a case in which the sub carrier interval is increased by an "e" times, the symbol length is increased by a 1/e times. Further, the base station device can multiplex signals of different symbol lengths into one component carrier and transmit a multiplexed signal. In other words, since signals of different TTI lengths can be transmitted in one component carrier, the above-described method can be similarly applied.

According to the details of the above embodiment, it is possible to improve the transmission efficiency in the wireless communication system in which the base station device 1 and the terminal device 2 communicate with each other.

APPLICATION EXAMPLES

Application Examples for Base Station

First Application Example

Figure 15:
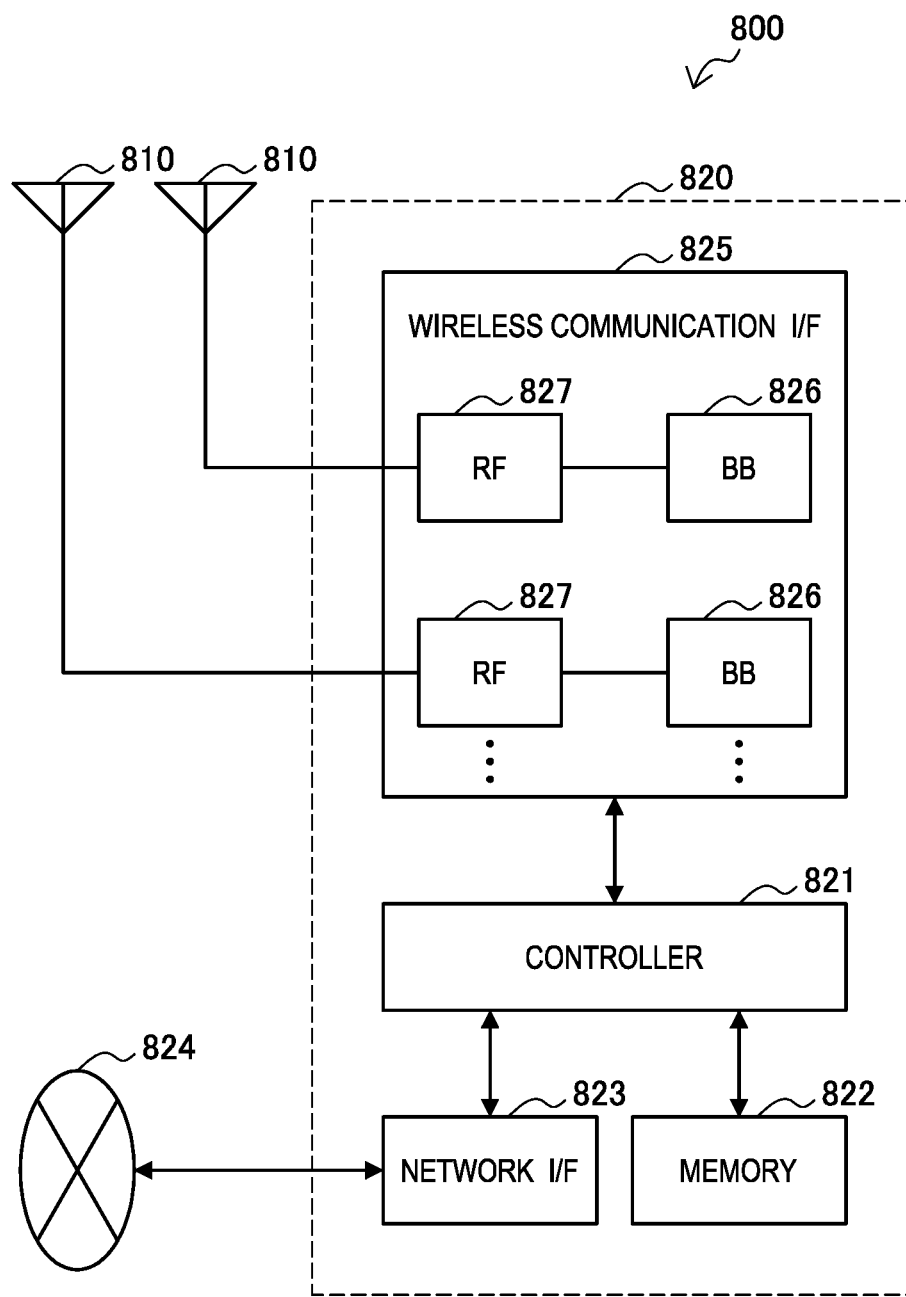
FIG. 15 is a block diagram illustrating a first example of a schematic configuration of an eNB to which the technology according to the present disclosure may be applied.

FIG. 15 is a block diagram illustrating a first example of a schematic configuration of an eNB to which the technology according to the present disclosure may be applied. An eNB 800 includes one or more antennas 810 and a base station apparatus 820. Each antenna 810 and the base station apparatus 820 may be connected to each other via an RF cable.

Each of the antennas 810 includes a single or a plurality of antenna elements (e.g., a plurality of antenna elements constituting a MIMO antenna) and is used for the base station apparatus 820 to transmit and receive a wireless signal. The eNB 800 may include the plurality of the antennas 810 as illustrated in FIG. 15, and the plurality of antennas 810 may, for example, correspond to a plurality of frequency bands used by the eNB 800. It should be noted that while FIG. 15 illustrates an example in which the eNB 800 includes the plurality of antennas 810, the eNB 800 may include the single antenna 810.

The base station apparatus 820 includes a controller 821, a memory 822, a network interface 823, and a wireless communication interface 825.

The controller 821 may be, for example, a CPU or a DSP, and operates various functions of an upper layer of the base station apparatus 820. For example, the controller 821 generates a data packet from data in a signal processed by the wireless communication interface 825, and transfers the generated packet via the network interface 823. The controller 821 may generate a bundled packet by bundling data from a plurality of base band processors to transfer the generated bundled packet. Further, the controller 821 may also have a logical function of performing control such as radio resource control, radio bearer control, mobility management, admission control, and scheduling. Further, the control may be performed in cooperation with a surrounding eNB or a core network node. The memory 822 includes a RAM and a ROM, and stores a program executed by the controller 821 and a variety of control data (such as, for example, terminal list, transmission power data, and scheduling data).

The network interface 823 is a communication interface for connecting the base station apparatus 820 to the core network 824. The controller 821 may communicate with a core network node or another eNB via the network interface 823. In this case, the eNB 800 may be connected to a core network node or another eNB through a logical interface (e.g., S1 interface or X2 interface). The network interface 823 may be a wired communication interface or a wireless communication interface for wireless backhaul. In the case where the network interface 823 is a wireless communication interface, the network interface 823 may use a higher frequency band for wireless communication than a frequency band used by the wireless communication interface 825.

The wireless communication interface 825 supports a cellular communication system such as long term evolution (LTE) or LTE-Advanced, and provides wireless connection to a terminal located within the cell of the eNB 800 via the antenna 810. The wireless communication interface 825 may typically include a base band (BB) processor 826, an RF circuit 827, and the like. The BB processor 826 may, for example, perform encoding/decoding, modulation/demodulation, multiplexing/demultiplexing, and the like, and performs a variety of signal processing on each layer (e.g., L1, medium access control (MAC), radio link control (RLC), and packet data convergence protocol (PDCP)). The BB processor 826 may have part or all of the logical functions as described above instead of the controller 821. The BB processor 826 may be a module including a memory having a communication control program stored therein, a processor to execute the program, and a related circuit, and the function of the BB processor 826 may be changeable by updating the program. Further, the module may be a card or blade to be inserted into a slot of the base station apparatus 820, or a chip mounted on the card or the blade. Meanwhile, the RF circuit 827 may include a mixer, a filter, an amplifier, and the like, and transmits and receives a wireless signal via the antenna 810.

The wireless communication interface 825 may include a plurality of the BB processors 826 as illustrated in FIG. 15, and the plurality of BB processors 826 may, for example, correspond to a plurality of frequency bands used by the eNB 800. Further, the wireless communication interface 825 may also include a plurality of the RF circuits 827, as illustrated in FIG. 15, and the plurality of RF circuits 827 may, for example, correspond to a plurality of antenna elements. Note that FIG. 15 illustrates an example in which the wireless communication interface 825 includes the plurality of BB processors 826 and the plurality of RF circuits 827, but the wireless communication interface 825 may include the single BB processor 826 or the single RF circuit 827.

Second Application Example

Figure 16:
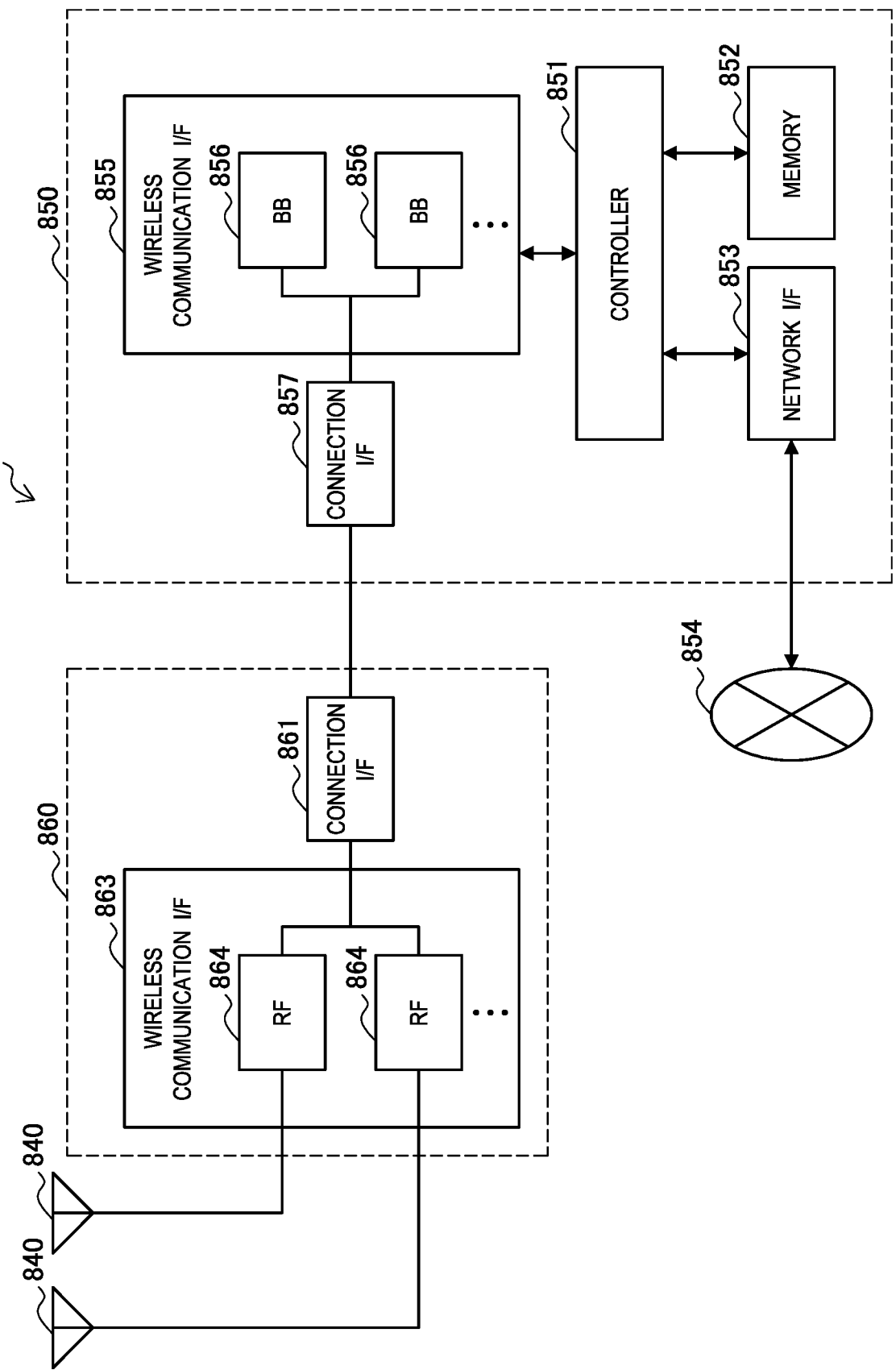
FIG. 16 is a block diagram illustrating a second example of the schematic configuration of the eNB to which the technology according to the present disclosure may be applied.

FIG. 16 is a block diagram illustrating a second example of a schematic configuration of an eNB to which the technology according to the present disclosure may be applied. An eNB 830 includes one or more antennas 840, a base station apparatus 850, and an RRH 860. Each of the antennas 840 and the RRH 860 may be connected to each other via an RF cable. Further, the base station apparatus 850 and the RRH 860 may be connected to each other by a high speed line such as optical fiber cables.

Each of the antennas 840 includes a single or a plurality of antenna elements (e.g., antenna elements constituting a MIMO antenna), and is used for the RRH 860 to transmit and receive a wireless signal. The eNB 830 may include a plurality of the antennas 840 as illustrated in FIG. 16, and the plurality of antennas 840 may, for example, correspond to a plurality of frequency bands used by the eNB 830. Note that FIG. 16 illustrates an example in which the eNB 830 includes the plurality of antennas 840, but the eNB 830 may include the single antenna 840.

The base station apparatus 850 includes a controller 851, a memory 852, a network interface 853, a wireless communication interface 855, and a connection interface 857. The controller 851, the memory 852, and the network interface 853 are similar to the controller 821, the memory 822, and the network interface 823 described with reference to FIG. 15.

The wireless communication interface 855 supports a cellular communication system such as LTE and LTE-Advanced, and provides wireless connection to a terminal located in a sector corresponding to the RRH 860 via the RRH 860 and the antenna 840. The wireless communication interface 855 may typically include a BB processor 856 or the like. The BB processor 856 is similar to the BB processor 826 described with reference to FIG. 15 except that the BB processor 856 is connected to an RF circuit 864 of the RRH 860 via the connection interface 857. The wireless communication interface 855 may include a plurality of the BB processors 856, as illustrated in FIG. 16, and the plurality of BB processors 856 may, for example, correspond to a plurality of frequency bands used by the eNB 830. Note that FIG. 16 illustrates an example in which the wireless communication interface 855 includes the plurality of BB processors 856, but the wireless communication interface 855 may include the single BB processor 856.

The connection interface 857 is an interface for connecting the base station apparatus 850 (wireless communication interface 855) to the RRH 860. The connection interface 857 may be a communication module for communication on the high speed line which connects the base station apparatus 850 (wireless communication interface 855) to the RRH 860.

Further, the RRH 860 includes a connection interface 861 and a wireless communication interface 863.

The connection interface 861 is an interface for connecting the RRH 860 (wireless communication interface 863) to the base station apparatus 850. The connection interface 861 may be a communication module for communication on the high speed line.

The wireless communication interface 863 transmits and receives a wireless signal via the antenna 840. The wireless communication interface 863 may typically include the RF circuit 864 or the like. The RF circuit 864 may include a mixer, a filter, an amplifier and the like, and transmits and receives a wireless signal via the antenna 840. The wireless communication interface 863 may include a plurality of the RF circuits 864 as illustrated in FIG. 16, and the plurality of RF circuits 864 may, for example, correspond to a plurality of antenna elements. Note that FIG. 16 illustrates an example in which the wireless communication interface 863 includes the plurality of RF circuits 864, but the wireless communication interface 863 may include the single RF circuit 864.

The eNB 800, the eNB 830, the base station device 820, or the base station device 850 illustrated in FIGS. 15 and 16 may correspond to the base station device 1 described above with reference to FIG. 3 and the like.

Application Examples for Terminal Apparatus

First Application Example

Figure 17:
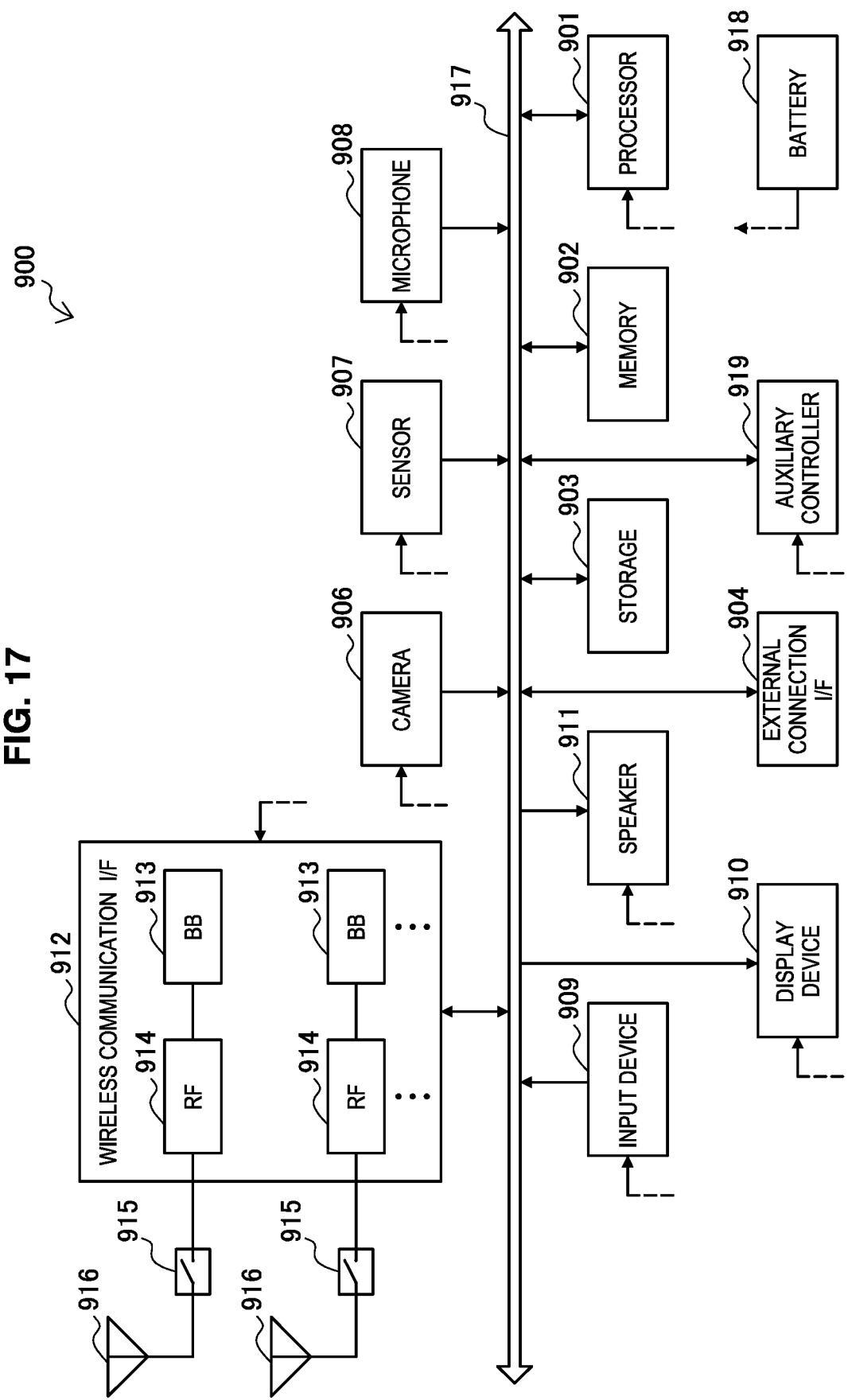
FIG. 17 is a block diagram illustrating an example of a schematic configuration of a smartphone 900 to which the technology according to the present disclosure may be applied.

FIG. 17 is a block diagram illustrating an example of a schematic configuration of a smartphone 900 as the terminal apparatus 2 to which the technology according to the present disclosure may be applied. The smartphone 900 includes a processor 901, a memory 902, a storage 903, an external connection interface 904, a camera 906, a sensor 907, a microphone 908, an input device 909, a display device 910, a speaker 911, a wireless communication interface 912, one or more antenna switches 915, one or more antennas 916, a bus 917, a battery 918, and an auxiliary controller 919.

The processor 901 may be, for example, a CPU or a system on chip (SoC), and controls the functions of an application layer and other layers of the smartphone 900. The memory 902 includes a RAM and a ROM, and stores a program executed by the processor 901 and data. The storage 903 may include a storage medium such as semiconductor memories and hard disks. The external connection interface 904 is an interface for connecting the smartphone 900 to an externally attached device such as memory cards and universal serial bus (USB) devices.

The camera 906 includes, for example, an image sensor such as charge coupled devices (CCDs) and complementary metal oxide semiconductor (CMOS), and generates a captured image. The sensor 907 may include a sensor group including, for example, a positioning sensor, a gyro sensor, a geomagnetic sensor, an acceleration sensor and the like. The microphone 908 converts a sound that is input into the smartphone 900 to an audio signal. The input device 909 includes, for example, a touch sensor which detects that a screen of the display device 910 is touched, a key pad, a keyboard, a button, a switch or the like, and accepts an operation or an information input from a user. The display device 910 includes a screen such as liquid crystal displays (LCDs) and organic light emitting diode (OLED) displays, and displays an output image of the smartphone 900. The speaker 911 converts the audio signal that is output from the smartphone 900 to a sound.

The wireless communication interface 912 supports a cellular communication system such as LTE or LTE-Advanced, and performs wireless communication. The wireless communication interface 912 may typically include the BB processor 913, the RF circuit 914, and the like. The BB processor 913 may, for example, perform encoding/decoding, modulation/demodulation, multiplexing/demultiplexing, and the like, and performs a variety of types of signal processing for wireless communication. On the other hand, the RF circuit 914 may include a mixer, a filter, an amplifier, and the like, and transmits and receives a wireless signal via the antenna 916. The wireless communication interface 912 may be a one-chip module in which the BB processor 913 and the RF circuit 914 are integrated. The wireless communication interface 912 may include a plurality of BB processors 913 and a plurality of RF circuits 914 as illustrated in FIG. 17. Note that FIG. 17 illustrates an example in which the wireless communication interface 912 includes a plurality of BB processors 913 and a plurality of RF circuits 914, but the wireless communication interface 912 may include a single BB processor 913 or a single RF circuit 914.

Further, the wireless communication interface 912 may support other types of wireless communication system such as a short range wireless communication system, a near field communication system, and a wireless local area network (LAN) system in addition to the cellular communication system, and in this case, the wireless communication interface 912 may include the BB processor 913 and the RF circuit 914 for each wireless communication system.

Each antenna switch 915 switches a connection destination of the antenna 916 among a plurality of circuits (for example, circuits for different wireless communication systems) included in the wireless communication interface 912.

Each of the antennas 916 includes one or more antenna elements (for example, a plurality of antenna elements constituting a MIMO antenna) and is used for transmission and reception of the wireless signal by the wireless communication interface 912. The smartphone 900 may include a plurality of antennas 916 as illustrated in FIG. 17. Note that FIG. 17 illustrates an example in which the smartphone 900 includes a plurality of antennas 916, but the smartphone 900 may include a single antenna 916.

Further, the smartphone 900 may include the antenna 916 for each wireless communication system. In this case, the antenna switch 915 may be omitted from a configuration of the smartphone 900.

The bus 917 connects the processor 901, the memory 902, the storage 903, the external connection interface 904, the camera 906, the sensor 907, the microphone 908, the input device 909, the display device 910, the speaker 911, the wireless communication interface 912, and the auxiliary controller 919 to each other. The battery 918 supplies electric power to each block of the smartphone 900 illustrated in FIG. 17 via a feeder line that is partially illustrated in the figure as a dashed line. The auxiliary controller 919, for example, operates a minimally necessary function of the smartphone 900 in a sleep mode.

Second Application Example

Figure 18:
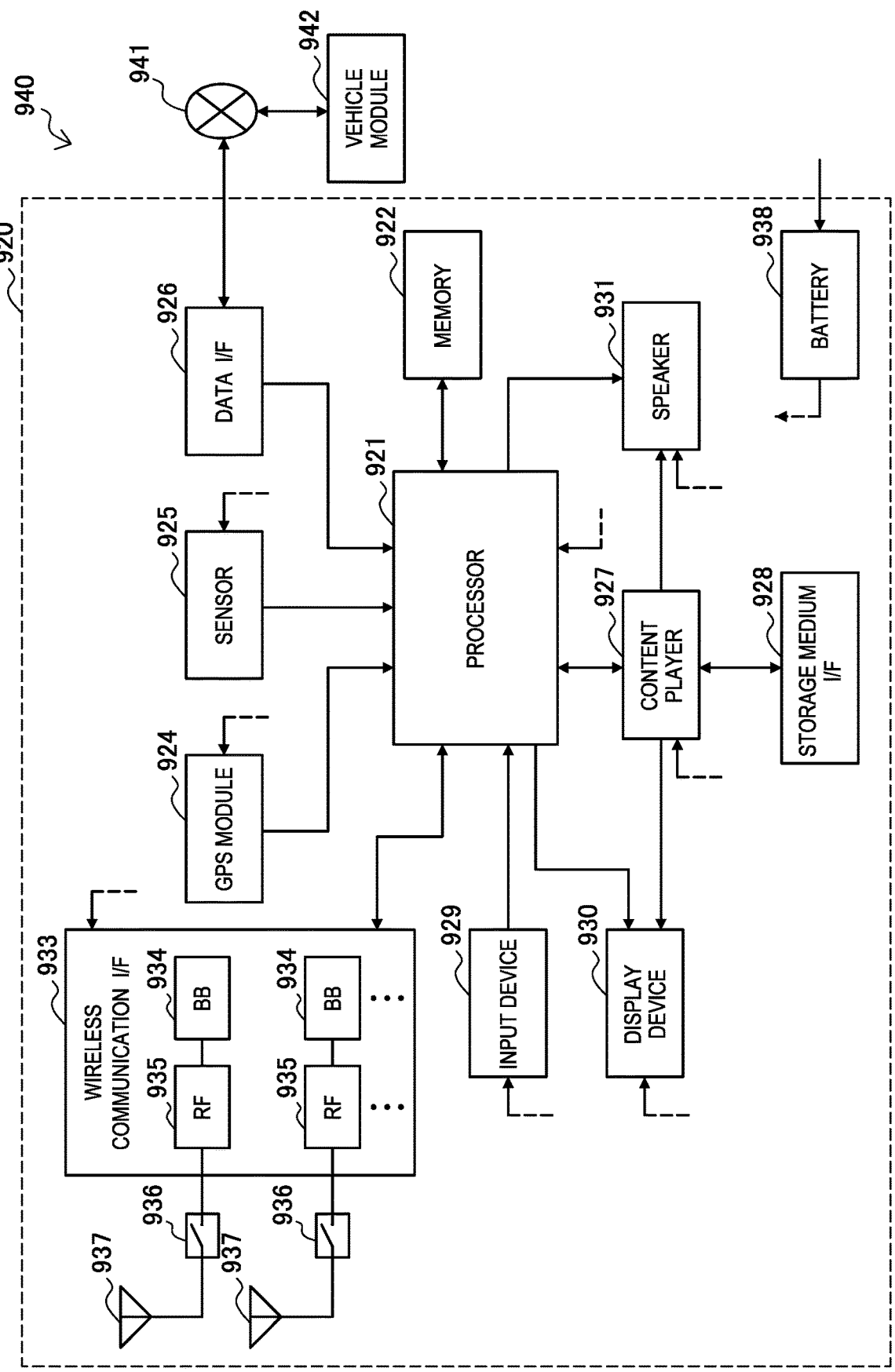
FIG. 18 is a block diagram illustrating an example of a schematic configuration of a car navigation apparatus 920 to which the technology according to the present disclosure may be applied.

FIG. 18 is a block diagram illustrating an example of a schematic configuration of a car navigation apparatus 920 to which the technology according to the present disclosure may be applied. The car navigation apparatus 920 includes a processor 921, a memory 922, a global positioning system (GPS) module 924, a sensor 925, a data interface 926, a content player 927, a storage medium interface 928, an input device 929, a display device 930, a speaker 931, a wireless communication interface 933, one or more antenna switches 936, one or more antennas 937, and a battery 938.

The processor 921 may be, for example, a CPU or an SoC, and controls the navigation function and the other functions of the car navigation apparatus 920. The memory 922 includes a RAM and a ROM, and stores a program executed by the processor 921 and data.

The GPS module 924 uses a GPS signal received from a GPS satellite to measure the position (e.g., latitude, longitude, and altitude) of the car navigation apparatus 920. The sensor 925 may include a sensor group including, for example, a gyro sensor, a geomagnetic sensor, a barometric sensor and the like. The data interface 926 is, for example, connected to an in-vehicle network 941 via a terminal that is not illustrated, and acquires data such as vehicle speed data generated on the vehicle side.

The content player 927 reproduces content stored in a storage medium (e.g., CD or DVD) inserted into the storage medium interface 928. The input device 929 includes, for example, a touch sensor which detects that a screen of the display device 930 is touched, a button, a switch or the like, and accepts operation or information input from a user. The display device 930 includes a screen such as LCDs and OLED displays, and displays an image of the navigation function or the reproduced content. The speaker 931 outputs a sound of the navigation function or the reproduced content.

The wireless communication interface 933 supports a cellular communication system such as LTE or LTE-Advanced, and performs wireless communication. The wireless communication interface 933 may typically include the BB processor 934, the RF circuit 935, and the like. The BB processor 934 may, for example, perform encoding/decoding, modulation/demodulation, multiplexing/demultiplexing, and the like, and performs a variety of types of signal processing for wireless communication. On the other hand, the RF circuit 935 may include a mixer, a filter, an amplifier, and the like, and transmits and receives a wireless signal via the antenna 937. The wireless communication interface 933 may be a one-chip module in which the BB processor 934 and the RF circuit 935 are integrated. The wireless communication interface 933 may include a plurality of BB processors 934 and a plurality of RF circuits 935 as illustrated in FIG. 18. Note that FIG. 18 illustrates an example in which the wireless communication interface 933 includes a plurality of BB processors 934 and a plurality of RF circuits 935, but the wireless communication interface 933 may include a single BB processor 934 or a single RF circuit 935.

Further, the wireless communication interface 933 may support other types of wireless communication system such as a short range wireless communication system, a near field communication system, and a wireless LAN system in addition to the cellular communication system, and in this case, the wireless communication interface 933 may include the BB processor 934 and the RF circuit 935 for each wireless communication system.

Each antenna switch 936 switches a connection destination of the antenna 937 among a plurality of circuits (for example, circuits for different wireless communication systems) included in the wireless communication interface 933.

Each of the antennas 937 includes one or more antenna elements (for example, a plurality of antenna elements constituting a MIMO antenna) and is used for transmission and reception of the wireless signal by the wireless communication interface 933. The car navigation apparatus 920 may include a plurality of antennas 937 as illustrated in FIG. 18. Note that FIG. 18 illustrates an example in which the car navigation apparatus 920 includes a plurality of antennas 937, but the car navigation apparatus 920 may include a single antenna 937.

Further, the car navigation apparatus 920 may include the antenna 937 for each wireless communication system. In this case, the antenna switch 936 may be omitted from a configuration of the car navigation apparatus 920.

The battery 938 supplies electric power to each block of the car navigation apparatus 920 illustrated in FIG. 18 via a feeder line that is partially illustrated in the figure as a dashed line. Further, the battery 938 accumulates the electric power supplied from the vehicle.

The technology of the present disclosure may also be realized as an in-vehicle system (or a vehicle) 940 including one or more blocks of the car navigation apparatus 920, the in-vehicle network 941, and a vehicle module 942. The vehicle module 942 generates vehicle data such as vehicle speed, engine speed, and trouble information, and outputs the generated data to the in-vehicle network 941.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

A terminal device that communicates with a base station device, the terminal device including:

a receiving unit configured to receive a first PDSCH that is transmitted on a basis of a sub frame which is defined by a predetermined number of symbols, and a second PDSCH that is transmitted on a basis of an extended sub frame which has a smaller number of symbols than a number of symbols corresponding to the sub frame; and a transmitting unit configured to transmit a first HARQ-ACK that is a feedback for reception of the first PDSCH after a predetermined sub frame, and transmit a second HARQ-ACK that is a feedback for reception of the second PDSCH after a predetermined extended sub frame.

(2)

The terminal device according to (1), in which the first HARQ-ACK is transmitted through a first PUCCH or a first PUSCH in a sub frame that is a predetermined number after a sub frame in which the first PDSCH is received, and the second HARQ-ACK is transmitted through a second PUCCH or a second PUSCH in an extended sub frame that is a predetermined number after an extended sub frame in which the second PDSCH is received.

(3)

The terminal device according to (1) or (2), in which the second HARQ-ACK is not transmitted in an extended sub frame included in a sub frame in which the first HARQ-ACK is transmitted.

(4)

The terminal device according to (3), in which the receiving unit assumes that the second HARQ-ACK which can be transmitted in the extended sub frame included in the sub frame in which the first HARQ-ACK is transmitted is not received.

(5)

The terminal device according to (3), in which in a case in which the second HARQ-ACK transmitted in the extended sub frame included in the sub frame in which the first HARQ-ACK is transmitted occurs, the transmitting unit drops the second HARQ-ACK.

(6)

The terminal device according to (3), in which in a case in which the second HARQ-ACK transmitted in the extended sub frame included in the sub frame in which the first HARQ-ACK is transmitted occurs, the transmitting unit transmits the second HARQ-ACK through a first PUCCH or a first PUSCH for transmitting the first HARQ-ACK.

(7)

The terminal device according to (1), in which the first HARQ-ACK is not transmitted in a sub frame including an extended sub frame in which the second HARQ-ACK is transmitted.

(8)

The terminal device according to (7), in which the receiving unit assumes that the first HARQ-ACK which can be transmitted in the sub frame including the extended sub frame in which the second HARQ-ACK is transmitted is not received.

(9)

The terminal device according to (7), in which in a case in which the first HARQ-ACK transmitted in the sub frame including the extended sub frame in which the second HARQ-ACK is transmitted occurs, the transmitting unit drops the first HARQ-ACK.

(10)

The terminal device according to (7), in which in a case in which the first HARQ-ACK transmitted in the sub frame including the extended sub frame in which the second HARQ-ACK is transmitted occurs, the transmitting unit transmits the first HARQ-ACK through a second PUCCH or a second PUSCH for transmitting the second HARQ-ACK.

(11)

The terminal device according to any one of (1) to (10), in which the receiving unit receives a first PDCCH for a notification of allocation information of the first PUSCH that is transmitted on the basis of the sub frame, the transmitting unit transmits the first PUSCH on a basis of the allocation information, and the second HARQ-ACK is not transmitted in an extended sub frame included in a sub frame in which the first PUSCH is transmitted.

(12)

The terminal device according to any one of (1) to (10), in which the receiving unit receives a first PDCCH for a notification of allocation information of the first PUSCH that is transmitted on the basis of the sub frame, the transmitting unit transmits the first PUSCH on a basis of the allocation information, and the first PUSCH is not transmitted in a sub frame including an extended sub frame in which the second HARQ-ACK is transmitted.

(13)

The terminal device according to any one of (1) to (10), in which the receiving unit receives a second PDCCH for a notification of allocation information of the second PUSCH that is transmitted on the basis of the extended sub frame, the transmitting unit transmits the second PUSCH on a basis of the allocation information, and the second PUSCH is not transmitted in an extended sub frame included in a sub frame in which the first HARQ-ACK is transmitted.

(14)

The terminal device according to any one of (1) to (10), in which the receiving unit receives a second PDCCH for a notification of allocation information of a second PUSCH that is transmitted on a basis of the extended sub frame, the transmitting unit transmits the second PUSCH on a basis of the allocation information, and the first HARQ-ACK is not transmitted in a sub frame including an extended sub frame in which the second PUSCH is transmitted.

(15)

A base station device that communicates with a terminal device, the base station device including:

a transmitting unit configured to transmit a first PDSCH that is transmitted on a basis of a sub frame which is defined by a predetermined number of symbols, and a second PDSCH that is transmitted on a basis of an extended sub frame which has a smaller number of symbols than a number of symbols corresponding to the sub frame; and a receiving unit configured to receive a first HARQ-ACK that is a feedback for reception of the first PDSCH after a predetermined sub frame, and receive a second HARQ-ACK that is a feedback for reception of the second PDSCH after a predetermined extended sub frame.

(16)

A communication method that is used by a terminal device which communicates with a base station device, the communication method including:

a step of receiving a first PDSCH that is transmitted on a basis of a sub frame which is defined by a predetermined number of symbols, and a second PDSCH that is transmitted on a basis of an extended sub frame which has a smaller number of symbols than a number of symbols corresponding to the sub frame; and a step of transmitting a first HARQ-ACK that is a feedback for reception of the first PDSCH after a predetermined sub frame, and transmitting a second HARQ-ACK that is a feedback for reception of the second PDSCH after a predetermined extended sub frame.

(17)

A communication method that is used by a base station device which communicates with a terminal device, the communication method including:

a step of transmitting a first PDSCH that is transmitted on a basis of a sub frame which is defined by a predetermined number of symbols, and a second PDSCH that is transmitted on a basis of an extended sub frame which has a smaller number of symbols than a number of symbols corresponding to the sub frame; and a step of receiving a first HARQ-ACK that is a feedback for reception of the first PDSCH after a predetermined sub frame, and receiving a second HARQ-ACK that is a feedback for reception of the second PDSCH after a predetermined extended sub frame.

REFERENCE SIGNS LIST 1 base station device
2 terminal device
101, 201 higher layer processing unit
103, 203 control unit
105, 205 receiving unit
107, 207 transmitting unit
109, 209 transceiving antenna
1051, 2051 decoding unit
1053, 2053 demodulating unit
1055, 2055 demultiplexing unit
1057, 2057 wireless receiving unit
1059, 2059 channel measuring unit
1071, 2071 encoding unit
1073, 2073 modulating unit
1075, 2075 multiplexing unit
1077, 2077 wireless transmitting unit
1079 downlink reference signal generating unit
2079 uplink reference signal generating unit

The invention claimed is:

1. A terminal device that communicates with a base station device, the terminal device comprising:

circuitry configured to receive a first physical downlink shared channel (PDSCH) that is transmitted on a basis of a sub frame which is defined by a predetermined number of symbols, and a second PDSCH that is transmitted on a basis of an extended sub frame which has a smaller number of symbols than a number of symbols corresponding to the sub frame; and transmit a first hybrid automatic repeat request acknowledgement (HARQ-ACK) that is a feedback for reception of the first PDSCH in a given sub frame, and transmit a second HARQ-ACK that is a feedback for reception of the second PDSCH in a given extended sub frame, wherein the circuitry transmits the first HARQ-ACK through a first physical uplink control channel (PUCCH), or through a first physical uplink shared channel (PUSCH) in the given sub frame, the given sub frame being a predetermined number sub frames after a sub frame in which the first PDSCH is received, the circuitry transmits the second HARQ-ACK through a second PUCCH, or through a second PUSCH in the given extended sub frame, the given extended sub frame being a predetermined number of extended sub frames after an extended sub frame in which the second PDSCH is received, and in a case that the circuitry is to transmit the first HARQ-ACK in a sub frame including the extended sub frame in which the second HARQ-ACK is transmitted, the circuitry is further configured to either drop the first HARQ-ACK, transmit the first HARQ-ACK through a second PUCCH, or transmit the second PUSCH for transmitting the second HARQ-ACK, so that the first PUCCH or the first PUSCH is not transmitted in a sub frame including an extended sub frame in which the second HARQ-ACK is transmitted.

2. The terminal device according to claim 1, wherein the second HARQ-ACK is not transmitted in an extended sub frame included in a sub frame in which the first HARQ-ACK is transmitted.

3. The terminal device according to claim 2, wherein the circuitry is configured to assume that the second HARQ-ACK which can be transmitted in the extended sub frame included in the sub frame in which the first HARQ-ACK is transmitted is not received.

4. The terminal device according to claim 2, wherein in a case in which the second HARQ-ACK transmitted in the extended sub frame included in the sub frame in which the first HARQ-ACK is transmitted occurs, the circuitry drops the second HARQ-ACK.

5. The terminal device according to claim 2, wherein in a case in which the second HARQ-ACK transmitted in the extended sub frame included in the sub frame in which the first HARQ-ACK is transmitted occurs, the circuitry transmits the second HARQ-ACK through a first PUCCH or a first PUSCH for transmitting the first HARQ-ACK.

6. The terminal device according to claim 1, wherein the first HARQ-ACK is not transmitted in a sub frame including an extended sub frame in which the second HARQ-ACK is transmitted.

7. The terminal device according to claim 6, wherein the circuitry is configured to assume that the first HARQ-ACK which can be transmitted in the sub frame including the extended sub frame in which the second HARQ-ACK is transmitted is not received.

8. The terminal device according to claim 6, wherein in a case in which the first HARQ-ACK transmitted in the sub frame including the extended sub frame in which the second HARQ-ACK is transmitted occurs, the circuitry drops the first HARQ-ACK.

9. The terminal device according to claim 6, wherein in a case in which the first HARQ-ACK transmitted in the sub frame including the extended sub frame in which the second HARQ-ACK is transmitted occurs, the circuitry transmits the first HARQ-ACK through a second PUCCH or a second PUSCH for transmitting the second HARQ-ACK.

10. The terminal device according to claim 1, wherein
the circuitry receives a first physical downlink control channel (PDCCH) for a notification of allocation information of the first PUSCH that is transmitted on the basis of the sub frame,
the circuitry transmits the first PUSCH on a basis of the allocation information, and
the second HARQ-ACK is not transmitted in an extended sub frame included in a sub frame in which the first PUSCH is transmitted.

11. The terminal device according to claim 1, wherein
the circuitry receives a first PDCCH for a notification of allocation information of the first PUSCH that is transmitted on the basis of the sub frame,
the circuitry transmits the first PUSCH on a basis of the allocation information, and
the first PUSCH is not transmitted in a sub frame including an extended sub frame in which the second HARQ-ACK is transmitted.

12. The terminal device according to claim 1, wherein
the circuitry receives a second PDCCH for a notification of allocation information of the second PUSCH that is transmitted on the basis of the extended sub frame,
the circuitry transmits the second PUSCH on a basis of the allocation information, and
the second PUSCH is not transmitted in an extended sub frame included in a sub frame in which the first HARQ-ACK is transmitted.

13. The terminal device according to claim 1, wherein
the circuitry receives a second PDCCH for a notification of allocation information of a second PUSCH that is transmitted on a basis of the extended sub frame,
the circuitry transmits the second PUSCH on a basis of the allocation information, and
the first HARQ-ACK is not transmitted in a sub frame including an extended sub frame in which the second PUSCH is transmitted.

14. A base station device that communicates with a terminal device, the base station device comprising:
circuitry configured to
transmit a first physical downlink shared channel (PDSCH) on a basis of a sub frame which is defined by a predetermined number of symbols, and a second PDSCH on a basis of an extended sub frame which has a smaller number of symbols than a number of symbols corresponding to the sub frame; and
receive a first hybrid automatic repeat request acknowledgement (HARQ-ACK) that is a feedback for reception of the first PDSCH in a given sub frame, and receive a second HARQ-ACK that is a feedback for reception of the second PDSCH in a given extended sub frame, wherein
the circuitry receives the first HARQ-ACK through a first physical uplink control channel (PUCCH), or through a first physical uplink shared channel (PUSCH) in the given sub frame, the given sub frame being a predetermined number sub frames after a sub frame in which the first PDSCH is received,
the circuitry receives the second HARQ-ACK through a second PUCCH, or through a second PUSCH in the given extended sub frame, the given extended sub frame being a predetermined number of extended sub frames after an extended sub frame in which the second PDSCH is received, and
in a case that the circuitry is to receive the first HARQ-ACK in a sub frame including the extended sub frame in which the second HARQ-ACK is received, either
the first HARQ-ACK is dropped,
the first HARQ-ACK is received through a second PUCCH, or
the second PUSCH for receiving the second HARQ-ACK is received, so that the first PUCCH or the first PUSCH is not received in a sub frame including an extended sub frame in which the second HARQ-ACK is received.

15. A communication method that is used by a terminal device which communicates with a base station device, the communication method comprising:

receiving, by circuitry of the terminal device, a first physical downlink shared channel (PDSCH) that is transmitted on a basis of a sub frame which is defined by a predetermined number of symbols, and a second PDSCH that is transmitted on a basis of an extended sub frame which has a smaller number of symbols than a number of symbols corresponding to the sub frame; and transmitting, by the circuitry, a first hybrid automatic repeat request acknowledgement (HARQ-ACK) that is a feedback for reception of the first PDSCH in a given sub frame, and transmitting a second HARQ-ACK that is a feedback for reception of the second PDSCH a given extended sub frame, wherein the transmitting the first HARQ-ACK is through a first physical uplink control channel (PUCCH), or through a first physical uplink shared channel (PUSCH) in the given sub frame, the given sub frame being a predetermined number sub frames after a sub frame in which the first PDSCH is received, the transmitting the second HARQ-ACK is through a second PUCCH, or through a second PUSCH in the given extended sub frame, the given extended sub frame being a predetermined number of extended sub frames after an extended sub frame in which the second PDSCH is received, and in a case that the transmitting is to include transmitting the first HARQ-ACK in a sub frame including the extended sub frame in which the second HARQ-ACK is transmitted, the method further comprises either:

dropping the first HARQ-ACK, transmitting the first HARQ-ACK through a second PUCCH, or transmitting the second PUSCH for transmitting the second HARQ-ACK, so that the first PUCCH or the first PUSCH is not transmitted in a sub frame including an extended sub frame in which the second HARQ-ACK is transmitted.

16. A communication method that is used by a base station device which communicates with a terminal device, the communication method comprising:

transmitting by circuitry of the base station, a first physical downlink shared channel (PDSCH) on a basis of a sub frame which is defined by a predetermined number of symbols, and a second PDSCH on a basis of an extended sub frame which has a smaller number of symbols than a number of symbols corresponding to the sub frame; and receiving a first hybrid automatic repeat request acknowledgement (HARQ-ACK) that is a feedback for reception of the first PDSCH in a given sub frame, and receiving a second HARQ-ACK that is a feedback for reception of the second PDSCH in a given extended sub frame, wherein the receiving the first HARQ-ACK is through a first physical uplink control channel (PUCCH), or through a first physical uplink shared channel (PUSCH) in the given sub frame, the given sub frame being a predetermined number sub frames after a sub frame in which the first PDSCH is received, the receiving the second HARQ-ACK is through a second PUCCH, or through a second PUSCH in the given extended sub frame, the given extended sub frame being a predetermined number of extended sub frames after an extended sub frame in which the second PDSCH is received, and in a case that the receiving is to include receiving the first HARQ-ACK in a sub frame including the extended sub frame in which the second HARQ-ACK is received, either the first HARQ-ACK is dropped, the first HARQ-ACK is received through a second PUCCH, or the second PUSCH for receiving the second HARQ-ACK is received, so that the first PUCCH or the first PUSCH is not received in a sub frame including an extended sub frame in which the second HARQ-ACK is received.

17. The terminal device according to claim 1, wherein in a case that the circuitry is to transmit the second HARQ-ACK in the extended sub frame included in the sub frame in which the first HARQ-ACK is transmitted, the circuitry is further configured to either drop the second HARQ-ACK, transmit the second HARQ-ACK through a first PUCCH, or transmit the first PUSCH for transmitting the first HARQ-ACK, so that the second PUCCH or the second PUSCH is not transmitted in an extended sub frame included in a sub frame in which the first HARQ-ACK is transmitted.

* * * * *